(12) United States Patent
Samji et al.

(10) Patent No.: US 8,117,226 B2
(45) Date of Patent: *Feb. 14, 2012

(54) SYSTEM AND METHOD FOR VIRTUAL FOLDER SHARING INCLUDING UTILIZATION OF STATIC AND DYNAMIC LISTS

(75) Inventors: Mohammed Samji, Bellevue, WA (US); David G. De Vorchik, Seattle, WA (US); Ram Ramasubramanian, Bellevue, WA (US); Chris J. Guzak, Kirkland, WA (US); Timothy P. McKee, Seattle, WA (US); Nathaniel H. Ballou, Kirkland, WA (US); Balan Sethu Raman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/399,562

(22) Filed: Mar. 6, 2009

(65) Prior Publication Data
US 2009/0171983 A1 Jul. 2, 2009

Related U.S. Application Data

(63) Continuation of application No. 10/691,841, filed on Oct. 23, 2003, now Pat. No. 7,526,483, which is a continuation-in-part of application No. 10/403,174, filed on Mar. 27, 2003, now Pat. No. 7,925,682.

(51) Int. Cl.
*G06F 7/00* (2006.01)
*G06F 17/30* (2006.01)
(52) U.S. Cl. ........ 707/769; 707/770; 707/802; 707/803; 707/812; 713/161; 713/166; 713/170
(58) Field of Classification Search ............... 707/769, 707/770, 802, 803, 812; 713/161, 166, 170
See application file for complete search history.

(56) References Cited

U.S. PATENT DOCUMENTS 4,214,141 A 7/1980 Okuda et al.
(Continued)

FOREIGN PATENT DOCUMENTS

EP 1089196 4/2001
(Continued)

OTHER PUBLICATIONS

Vassil Roussev, Prasun Dewan & Vibhor Jain—"Composable Collaboration Infrastructures Based on Programming Patterns"—CSSW '00—Proceedings of the 2000 ACM Conference on Computer Supported Cooperative Work—Dec. 2-6, 2000 (pp. 117-126:1-10).*

(Continued)

*Primary Examiner* — Giovanna Colan
*Assistant Examiner* — Anh Ly
(74) *Attorney, Agent, or Firm* — Shook, Hardy & Bacon L.L.P.

(57) ABSTRACT

A system and method for virtual folder sharing, including utilization of static and dynamic lists. Static and dynamic lists may be created as types of virtual folders. Virtual folders expose regular files and folders to users in different views based on their metadata instead of the actual physical underlying file system structure on the disk. A static list consists of a folder of items that are in a specific order, while a dynamic list gathers a set of items based on a scope and a set of criteria. When a list is shared, the actual list is left in place on the sharer's machine or server, while permission is granted to the sharee to remotely access the list and the referenced items. If the list is changed by adding or removing items, these items are also automatically re-permissioned to allow or disallow the sharee to have access to the items.

18 Claims, 55 Drawing Sheets

U.S. PATENT DOCUMENTS

| | | | |
|---|---|---|---|
| 4,438,505 A | 3/1984 | Yanagiuchi et al. | |
| 4,829,423 A | 5/1989 | Tennant et al. | |
| 4,881,179 A | 11/1989 | Vincent | |
| 4,931,935 A | 6/1990 | Ohira et al. | |
| 5,060,135 A | 10/1991 | Levine et al. | |
| 5,297,250 A | 3/1994 | Leroy et al. | |
| 5,327,529 A | 7/1994 | Fults et al. | |
| 5,333,266 A | 7/1994 | Boaz et al. | |
| 5,418,946 A | 5/1995 | Mori et al. | |
| 5,420,605 A | 5/1995 | Vouri et al. | |
| 5,475,589 A * | 12/1995 | Armitage | 702/13 |
| 5,544,360 A | 8/1996 | Lewak et al. | |
| 5,546,527 A | 8/1996 | Fitzpatrick et al. | |
| 5,550,852 A | 8/1996 | Patel et al. | |
| 5,583,982 A | 12/1996 | Matheny et al. | |
| 5,590,259 A | 12/1996 | Anderson et al. | |
| 5,596,702 A | 1/1997 | Stucka et al. | |
| 5,600,778 A | 2/1997 | Swanson et al. | |
| 5,606,669 A | 2/1997 | Bertin et al. | |
| 5,625,783 A | 4/1997 | Ezekiel et al. | |
| 5,648,795 A | 7/1997 | Vouri | |
| 5,652,876 A | 7/1997 | Ashe et al. | |
| 5,675,520 A | 10/1997 | Pitt, III et al. | |
| 5,675,663 A | 10/1997 | Koerner et al. | |
| 5,696,914 A | 12/1997 | Nahaboo et al. | |
| 5,710,926 A | 1/1998 | Maurer | |
| 5,721,908 A | 2/1998 | Lagarde et al. | |
| 5,760,770 A | 6/1998 | Bliss et al. | |
| 5,787,413 A | 7/1998 | Kauffman et al. | |
| 5,828,376 A | 10/1998 | Solimene et al. | |
| 5,855,446 A | 1/1999 | Disborg | |
| 5,856,745 A * | 1/1999 | Morgan et al. | 324/635 |
| 5,864,844 A | 1/1999 | James et al. | |
| 5,870,088 A | 2/1999 | Washington | |
| 5,875,448 A | 2/1999 | Boys | |
| 5,875,476 A | 2/1999 | Nijboer | |
| 5,886,694 A | 3/1999 | Breinberg et al. | |
| 5,905,973 A | 5/1999 | Yonezawa et al. | |
| 5,907,703 A | 5/1999 | Kronenberg et al. | |
| 5,907,837 A | 5/1999 | Ferrel et al. | |
| 5,909,540 A | 6/1999 | Carter et al. | |
| 5,917,492 A | 6/1999 | Bereiter et al. | |
| 5,924,090 A | 7/1999 | Krellenstein | |
| 5,930,801 A | 7/1999 | Falkenhainer et al. | |
| 5,973,686 A | 10/1999 | Shimogori et al. | |
| 6,016,692 A | 1/2000 | Schaenzer et al. | |
| 6,024,843 A | 2/2000 | Anderson et al. | |
| 6,055,540 A | 4/2000 | Snow et al. | |
| 6,055,543 A | 4/2000 | Christensen et al. | |
| 6,061,059 A | 5/2000 | Taylor et al. | |
| 6,065,012 A | 5/2000 | Balsara et al. | |
| 6,101,509 A | 8/2000 | Hanson et al. | |
| 6,160,552 A | 12/2000 | Wilsher et al. | |
| 6,175,364 B1 | 1/2001 | Wong et al. | |
| 6,182,068 B1 | 1/2001 | Culliss | |
| 6,195,650 B1 | 2/2001 | Gaither et al. | |
| 6,208,985 B1 | 3/2001 | Krehel | |
| 6,216,122 B1 | 4/2001 | Elson | |
| 6,237,004 B1 | 5/2001 | Dodson et al. | |
| 6,240,407 B1 | 5/2001 | Chang et al. | |
| 6,247,020 B1 | 6/2001 | Minard | |
| 6,268,852 B1 | 7/2001 | Lindhorst et al. | |
| 6,271,846 B1 | 8/2001 | Martinez et al. | |
| 6,279,016 B1 | 8/2001 | De Vorchik et al. | |
| 6,301,586 B1 | 10/2001 | Yang et al. | |
| 6,317,777 B1 | 11/2001 | Skarbo et al. | |
| 6,326,953 B1 | 12/2001 | Wana | |
| 6,330,007 B1 | 12/2001 | Isreal et al. | |
| 6,342,907 B1 | 1/2002 | Petty et al. | |
| 6,347,260 B1 | 2/2002 | Graushar et al. | |
| 6,356,863 B1 | 3/2002 | Sayle | |
| 6,356,908 B1 | 3/2002 | Brown et al. | |
| 6,356,915 B1 | 3/2002 | Chtchetkine et al. | |
| 6,369,840 B1 | 4/2002 | Barnett et al. | |
| 6,370,518 B1 | 4/2002 | Payne et al. | |
| 6,377,283 B1 | 4/2002 | Thomas et al. | |
| 6,385,641 B1 | 5/2002 | Jiang et al. | |
| 6,393,429 B1 | 5/2002 | Yagi et al. | |
| 6,405,265 B1 | 6/2002 | Kronenberg et al. | |
| 6,408,298 B1 | 6/2002 | Van et al. | |
| 6,425,120 B1 | 7/2002 | Morganelli et al. | |
| 6,425,121 B1 | 7/2002 | Phillips et al. | |
| 6,430,575 B1 | 8/2002 | Dourish et al. | |
| 6,430,835 B1 | 8/2002 | Ranucci et al. | |
| 6,438,590 B1 | 8/2002 | Gartner et al. | |
| 6,462,762 B1 | 10/2002 | Ku et al. | |
| 6,466,228 B1 | 10/2002 | Ulrich et al. | |
| 6,470,344 B1 | 10/2002 | Kothuri et al. | |
| 6,473,100 B1 | 10/2002 | Beaumont et al. | |
| 6,483,525 B1 | 11/2002 | Tange | |
| 6,484,205 B1 | 11/2002 | Byford | |
| 6,519,612 B1 | 2/2003 | Howard et al. | |
| 6,544,295 B1 | 4/2003 | Bodnar et al. | |
| 6,571,245 B2 * | 5/2003 | Huang et al. | 707/999.01 |
| 6,636,250 B1 | 10/2003 | Gasser et al. | |
| 6,638,313 B1 | 10/2003 | Freeman et al. | |
| 6,658,406 B1 | 12/2003 | Mazner | |
| 6,721,760 B1 | 4/2004 | Ono et al. | |
| 6,725,227 B1 | 4/2004 | Li | |
| 6,745,207 B2 * | 6/2004 | Reuter et al. | 707/999.1 |
| 6,751,611 B2 | 6/2004 | Krupin et al. | |
| 6,751,626 B2 | 6/2004 | Brown et al. | |
| 6,760,721 B1 | 7/2004 | Chasen et al. | |
| 6,762,777 B2 | 7/2004 | Carroll | |
| 6,763,777 B1 | 7/2004 | Rosenberg | |
| 6,784,925 B1 | 8/2004 | Tomat et al. | |
| 6,801,909 B2 | 10/2004 | Delgado et al. | |
| 6,810,404 B1 | 10/2004 | Ferguson et al. | |
| 6,813,474 B2 | 11/2004 | Robinson et al. | |
| 6,820,083 B1 | 11/2004 | Nagy et al. | |
| 6,826,443 B2 | 11/2004 | Makinen | |
| 6,869,018 B2 | 3/2005 | Fifield | |
| 6,876,900 B2 | 4/2005 | Takeda et al. | |
| 6,885,860 B2 | 4/2005 | Bahl | |
| 6,910,049 B2 | 6/2005 | Fenton et al. | |
| 6,925,608 B1 | 8/2005 | Neale et al. | |
| 6,948,120 B1 | 9/2005 | Delgobbo et al. | |
| 6,950,989 B2 | 9/2005 | Rosenzweig et al. | |
| 6,952,714 B2 | 10/2005 | Peart | |
| 6,952,724 B2 | 10/2005 | Prust | |
| 6,973,618 B2 | 12/2005 | Shaughnessy et al. | |
| 6,983,424 B1 | 1/2006 | Dutta | |
| 7,024,427 B2 | 4/2006 | Bobbitt et al. | |
| 7,028,262 B2 | 4/2006 | Estrada et al. | |
| 7,043,472 B2 | 5/2006 | Aridor et al. | |
| 7,047,498 B2 | 5/2006 | Lui et al. | |
| 7,058,891 B2 | 6/2006 | O'Neal et al. | |
| 7,062,500 B1 | 6/2006 | Hall et al. | |
| 7,062,718 B2 | 6/2006 | Kodosky et al. | |
| 7,100,150 B2 | 8/2006 | Polk | |
| 7,106,843 B1 | 9/2006 | Gainsboro | |
| 7,130,879 B1 | 10/2006 | Dayon | |
| 7,149,729 B2 | 12/2006 | Kaasten et al. | |
| 7,162,466 B2 | 1/2007 | Kaasten et al. | |
| 7,168,051 B2 | 1/2007 | Robinson et al. | |
| 7,171,468 B2 | 1/2007 | Yeung et al. | |
| 7,191,195 B2 | 3/2007 | Koyama et al. | |
| 7,194,743 B2 | 3/2007 | Hayton et al. | |
| 7,216,289 B2 | 5/2007 | Kagle et al. | |
| 7,216,301 B2 | 5/2007 | Moehrle | |
| 7,219,302 B1 | 5/2007 | O'Shaughnessy et al. | |
| 7,240,292 B2 | 7/2007 | Hally et al. | |
| 7,243,334 B1 | 7/2007 | Berger et al. | |
| 7,275,063 B2 | 9/2007 | Horn | |
| 7,278,106 B1 | 10/2007 | Mason | |
| 7,290,245 B2 | 10/2007 | Skjolsvold | |
| 7,293,031 B1 | 11/2007 | Dusker et al. | |
| 7,383,494 B2 | 6/2008 | Krolczyk et al. | |
| 7,409,382 B2 | 8/2008 | Kido | |
| 7,409,644 B2 | 8/2008 | Moore et al. | |
| 7,415,484 B1 | 8/2008 | Tulkoff et al. | |
| 7,484,183 B2 | 1/2009 | Look et al. | |
| 7,499,925 B2 | 3/2009 | Moore et al. | |
| 7,512,586 B2 | 3/2009 | Kaasten et al. | |
| 7,526,483 B2 * | 4/2009 | Samji et al. | 707/999.104 |
| 7,536,386 B2 | 5/2009 | Samji et al. | |
| 7,536,410 B2 | 5/2009 | Wong | |

| | | |
|---|---|---|
| 7,587,411 B2 | 9/2009 | De Vorchik |
| 7,590,625 B1 | 9/2009 | Tennican et al. |
| 7,614,016 B2 | 11/2009 | Wong |
| 7,627,552 B2 | 12/2009 | Moore et al. |
| 7,650,575 B2 | 1/2010 | Cummins |
| 7,692,807 B1 | 4/2010 | Sanders et al. |
| 7,853,890 B2 | 12/2010 | Miner et al. |
| 7,890,543 B2 * | 2/2011 | Hunt et al. ............. 707/803 |
| 7,917,538 B2 * | 3/2011 | Gurevich ............. 707/802 |
| 2001/0034733 A1 | 10/2001 | Prompt et al. |
| 2002/0010736 A1 | 1/2002 | Marques et al. |
| 2002/0021828 A1 | 2/2002 | Papier et al. |
| 2002/0046209 A1 | 4/2002 | De Bellis |
| 2002/0049777 A1 | 4/2002 | Terayama et al. |
| 2002/0059288 A1 | 5/2002 | Yagi |
| 2002/0063734 A1 | 5/2002 | Khalfay et al. |
| 2002/0070965 A1 | 6/2002 | Austin |
| 2002/0078035 A1 | 6/2002 | Frank et al. |
| 2002/0087652 A1 | 7/2002 | Davis et al. |
| 2002/0091674 A1 | 7/2002 | Azuma |
| 2002/0100039 A1 | 7/2002 | Iatropoulos et al. |
| 2002/0105548 A1 | 8/2002 | Hayton |
| 2002/0111942 A1 | 8/2002 | Campbell et al. |
| 2002/0120604 A1 | 8/2002 | Labarge et al. |
| 2002/0129033 A1 * | 9/2002 | Hoxie et al. ............. 707/101 |
| 2002/0138582 A1 * | 9/2002 | Chandra et al. ............. 709/206 |
| 2002/0144155 A1 | 10/2002 | Bate et al. |
| 2002/0149888 A1 | 10/2002 | Motonishi et al. |
| 2002/0156756 A1 | 10/2002 | Stanley et al. |
| 2002/0156792 A1 | 10/2002 | Gombocz |
| 2002/0174329 A1 | 11/2002 | Bowler et al. |
| 2002/0181398 A1 | 12/2002 | Szlam |
| 2002/0188621 A1 | 12/2002 | Flank et al. |
| 2003/0001964 A1 | 1/2003 | Masukura et al. |
| 2003/0028610 A1 * | 2/2003 | Pearson ............. 709/213 |
| 2003/0033367 A1 | 2/2003 | Itoh |
| 2003/0046011 A1 | 3/2003 | Friedman |
| 2003/0050927 A1 | 3/2003 | Hussam |
| 2003/0063124 A1 | 4/2003 | Melhem et al. |
| 2003/0069893 A1 | 4/2003 | Kanai et al. |
| 2003/0076322 A1 | 4/2003 | Ouzts et al. |
| 2003/0079038 A1 | 4/2003 | Robbin et al. |
| 2003/0081002 A1 | 5/2003 | De Vorchik et al. |
| 2003/0085918 A1 | 5/2003 | Beaumont et al. |
| 2003/0093321 A1 | 5/2003 | Bodmer et al. |
| 2003/0097361 A1 * | 5/2003 | Huang et al. ............. 707/10 |
| 2003/0098881 A1 | 5/2003 | Nolte et al. |
| 2003/0098893 A1 | 5/2003 | Makinen et al. |
| 2003/0098894 A1 | 5/2003 | Sheldon |
| 2003/0107597 A1 | 6/2003 | Jameson |
| 2003/0110188 A1 * | 6/2003 | Howard et al. ............. 707/200 |
| 2003/0110397 A1 * | 6/2003 | Supramaniam et al. ...... 713/166 |
| 2003/0120678 A1 | 6/2003 | Hill |
| 2003/0135513 A1 | 7/2003 | Quinn et al. |
| 2003/0195950 A1 | 10/2003 | Huang et al. |
| 2003/0212664 A1 | 11/2003 | Breining et al. |
| 2003/0227480 A1 | 12/2003 | Polk |
| 2004/0004638 A1 | 1/2004 | Babaria |
| 2004/0006549 A1 | 1/2004 | Mullins et al. |
| 2004/0019875 A1 | 1/2004 | Welch |
| 2004/0056894 A1 | 3/2004 | Zaika et al. |
| 2004/0073705 A1 | 4/2004 | Madril, Jr. et al. |
| 2004/0103073 A1 | 5/2004 | Blake et al. |
| 2004/0105127 A1 | 6/2004 | Cudd et al. |
| 2004/0117405 A1 | 6/2004 | Short et al. |
| 2004/0128322 A1 | 7/2004 | Nagy |
| 2004/0133845 A1 | 7/2004 | Forstall et al. |
| 2004/0142749 A1 | 7/2004 | Ishimaru et al. |
| 2004/0143349 A1 | 7/2004 | Roberts et al. |
| 2004/0146272 A1 | 7/2004 | Kessel et al. |
| 2004/0162838 A1 | 8/2004 | Murayama et al. |
| 2004/0168118 A1 | 8/2004 | Wong et al. |
| 2004/0174396 A1 | 9/2004 | Jobs et al. |
| 2004/0181516 A1 | 9/2004 | Ellwanger et al. |
| 2004/0189694 A1 | 9/2004 | Kurtz et al. |
| 2004/0193594 A1 | 9/2004 | Moore et al. |
| 2004/0193599 A1 | 9/2004 | Liu et al. |
| 2004/0233235 A1 | 11/2004 | Rubin et al. |
| 2004/0243597 A1 | 12/2004 | Jensen et al. |
| 2004/0255048 A1 | 12/2004 | Lev Ran et al. |
| 2004/0257169 A1 | 12/2004 | Nelson |
| 2005/0022132 A1 | 1/2005 | Herzberg et al. |
| 2005/0071355 A1 | 3/2005 | Cameron et al. |
| 2005/0091612 A1 | 4/2005 | Stabb et al. |
| 2005/0114330 A1 | 5/2005 | Chau |
| 2005/0131760 A1 | 6/2005 | Manning et al. |
| 2005/0131905 A1 | 6/2005 | Margolus et al. |
| 2005/0138567 A1 | 6/2005 | Smith et al. |
| 2005/0165753 A1 | 7/2005 | Chen et al. |
| 2005/0166189 A1 | 7/2005 | Ma |
| 2005/0188174 A1 | 8/2005 | Guzak |
| 2005/0240880 A1 | 10/2005 | Banks |
| 2005/0246643 A1 | 11/2005 | Gusmorino et al. |
| 2005/0246648 A1 | 11/2005 | Miner |
| 2005/0283742 A1 | 12/2005 | Gusmorino |
| 2006/0004739 A1 | 1/2006 | Anthony et al. |
| 2006/0053066 A1 | 3/2006 | Sherr |
| 2006/0053388 A1 | 3/2006 | Michelman |
| 2006/0059204 A1 | 3/2006 | Borthakur et al. |
| 2006/0200455 A1 | 9/2006 | Wilson |
| 2006/0242122 A1 | 10/2006 | De Vorchik |
| 2006/0242164 A1 | 10/2006 | Evans |
| 2006/0242585 A1 | 10/2006 | Cutsinger |
| 2006/0242591 A1 | 10/2006 | Van Dok |
| 2006/0242604 A1 | 10/2006 | Wong |
| 2006/0277432 A1 | 12/2006 | Patel |
| 2007/0088672 A1 | 4/2007 | Kaasten et al. |
| 2007/0129977 A1 | 6/2007 | Forney |
| 2007/0130170 A1 | 6/2007 | Forney |
| 2007/0130182 A1 | 6/2007 | Forney |
| 2007/0168885 A1 | 7/2007 | Muller |
| 2007/0168886 A1 | 7/2007 | Hally |
| 2007/0180432 A1 | 8/2007 | Gassner et al. |
| 2007/0186183 A1 | 8/2007 | Hudson, Jr. |
| 2008/0208927 A1 | 8/2008 | Chikusa et al. |
| 2008/0222547 A1 | 9/2008 | Wong |
| 2009/0171983 A1 | 3/2009 | Samji et al. |

FOREIGN PATENT DOCUMENTS

| | | |
|---|---|---|
| EP | 1235137 | 8/2002 |
| JP | 2004362745 | 12/1992 |
| JP | 05-089173 | 9/1993 |
| JP | 07-129448 | 5/1995 |
| JP | 09244940 | 9/1997 |
| JP | 11-212842 | 8/1999 |
| JP | 2000-242655 | 9/2000 |
| JP | 2000348049 | 12/2000 |
| JP | 2001067250 | 3/2001 |
| JP | 2001142766 | 5/2001 |
| JP | 2001154831 | 6/2001 |
| JP | 2001188702 | 7/2001 |
| JP | 2001-297022 | 10/2001 |
| JP | 2002140216 | 5/2002 |
| JP | 2002182953 | 6/2002 |
| JP | 2002269145 | 9/2002 |
| JP | 2004133796 | 10/2002 |
| JP | 2002334103 | 11/2002 |
| JP | 2004046870 | 2/2004 |
| RU | 2195016 C2 | 12/2002 |
| RU | 2347258 | 2/2009 |
| WO | WO9322738 | 11/1993 |
| WO | WO9412944 | 6/1994 |
| WO | WO9414281 | 6/1994 |
| WO | WO9949663 | 9/1999 |
| WO | WO0051021 | 8/2000 |
| WO | WO0157867 | 8/2001 |
| WO | WO0167668 | 9/2001 |
| WO | WO03001720 | 1/2003 |
| WO | WO2004097680 | 11/2004 |

OTHER PUBLICATIONS

Vijayan Sugumaran, Mohan Tannira & Veda C. Storey—"Identifying Software Components from Process Requirements Using Domain Model and Object Libraries"—ICIS '99 Proceedings of the 20$^{th}$ International Conference on Information Systems, 1999 ACM (pp. 65-81:1-17).*

Kenji Domoto et al., "The Power of Fast Full Text Search," Nikkei Byte, No. 156, pp. 142-167, Nikkei Business Publications, Inc., Japan, Sep. 22, 1996 (Previously delivered.) Reference Literature: Cited Reference 2 in Final Notice of Rejection (Japan).

Yuji Tanaka, "Utilization Report, Introduction of "Convenient Techniques" Which Are Unexpectedly Unknown, Advanced Techniques for "Compression and Decompression," "Nikkei PC 21, vol. 7, No. 21, pp. 100-105, Nikkei Business Publications, Inc., Japan, Nov. 1, 2002, Cited Reference 3 in Final Notice of Rejection (Japan).

Hhideya Takane, et al., "Control of Access to Folders and Files," Windows NT World, vol. 5, No. 5, pp. 160-165, IDG Japan, Inc., Japan, May 1, 2000, Cited Reference 4 in Final Notice of Rejection (Japan).

Makoto Nishimasa, "Easily Creating a Network by Using Standard Features, Home Network Easily Realized Using Windows 2000, "Windows 2000 World, vol. 6, No. 2, pp. 126-133, IDG Japan, Inc., Japan, Feb. 1, 2001, Cited Reference 5 in Final Notice of Rejection (Japan).

Microsoft, Windows XP Professional, Screen Shots 1-8, copyright (1985-2001).

Russionovich, Mark, "Internal Structure of NTFS4.0," Aug. 1, 2001, pp. 176-182, NIKKEI Windows 2000, vol. 2, No. 53, Nikkei Business Publications, Inc., Japan.

Halvorson, Michael, et al, "Microsoft Office XP, Professional Office Manual," Jul. 23, 2001, pp. 78-80, first edition, Nikkei BP Soft Press.

Australian Search Report for SG 200301757-1, Dec. 1, 2004.

Cohen, J. "The Unofficial Guide to the Workplace Shell," Apr. 5, 1992, 45 pages, http://www.verfasser.de/web/web.nsf/c5.

Cooper, A., "About Face the Essentials of User Interface Design," IDG Books, 1995, p. 141.

Campbell, David, "Extending the Windows Explorer with Name Space Extensions," Microsoft Systems Journal, Microsoft Corporation, vol. 5, No. 6, Jul. 1996, pp. 89-96.

Bott, Ed et al., "Master Your Music Library," May 5, 2003, 7 pages, www.microsoft.com/windowsxp/using/windowsmediaplayer/expert/bott_03may05.mspx.

English translation of Office Action for CN03801850.0 dated Aug. 10, 2007.

Revelle, "A Visual Search Tool for Early Elementary Science Students", Mar. 2002, Journal of Science Education and Technology, vol. 11, pp. 49-57.

Microsoft Corporation, "Windows 98 Step by Step," 1998, p. 63, Microsoft Press.

Tony Northrup et al., "Plus! Party Mode: Mix Audio and Video in Playlists," www.microsoft.com/windowsxp/using/windowsmediaplayer/expert/northrup_03march17.mspx, Mar. 17, 2003, 6 pages.

Dourish, Paul, et al., "Presto: An Experimental Architecture for Fluid Interactive Document Spaces," ACM Transactions on Computer—Human Interaction (TOCHI) Jun. 1999, pp. 133-161, vol, 6, Issue 2, ACM.

International Search Report for WO2004/097638 A1 (McKee, et al.) dated Nov. 11, 2004.

Microsoft Windows XP Version 2002 Screen Dumps.

International Search Report and Written Opinion of PCT/US04/25931 dated Apr. 3, 2007.

Sellen, Abigail J. et al., "How Knowledge Workers Use the Web," Proceedings of the SIGCHI Conference on Human Factors in Computing Systems: Changing Our World, Changing Ourselves, ACM, 2002, pp. 227-234.

International Search Report and Written Opinion of PCT/US05/26655, Mar. 21, 2006.

International Search Report for PCT Application Serial No. PCT/US05/13589, Dec. 7, 2005, 5 pages.

International Search Report for EP 03007786, Aug. 6, 2004.

International Search Report of EP 0315717, Aug. 26, 2003.

International Search Report of EP 03007909, Jun. 13, 2006.

International Search Report of PCT/US03/15625, Aug. 8, 2003.

International Search Report of PCT/US05/13589, Apr. 22, 2005.

International Search Report of PCT/US05/27258, Aug. 1, 2005.

Jamsa, K., "1001 Windows 98 Tips," 1998, 2 pages, Jamsa Press.

Sekiguchi,Kumko, "Visual Basic Q&A," MSDN Magazine 2001, No. 16, Jul. 18, 2001, pp. 97-103, ASCII Inc., Japan.

Capretz, Luiz F. et al. "Component-Based Software Development," Nov. 2001, pp. 1834-1837, IECON 01, The 27th Annual Conference of the IEEE Industrial Electronics Society.

"How Easy! Introduction to 'Storage Idea,'" NIKKEI PC 21, vol. 6, No. 1, pp. 46-53, Nikkei Business Publications, Inc., Japan, Jan. 1, 2001.

Andy Rathbone, Windows XP for Dummies, 2001, Wiley Publishing, Inc., pp. 145, 203, 204.

Esposito, D., "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Grosky, et al., "Using Metadata for Intelligent Browsing of Structured Media Objects", Dec. 1994, Sigmond Record, vol. 23, No. 4, pp. 49-56.

Microsoft Windows XP Professional, 1985-2001.

Mozilla.Org, "Mozilla Firebird's Features", Dec. 4, 2003, Section—Find as you Type.

Netscape Corporation, "Mozilla.org Find As You Type," Sep. 12, 2003, pp. 1-4.

Olivie, et al., "A Generic Metadata Query Tool", 1999, pp. 1-8—Dup of Verhoeven.

Pogue, David, "Windows XP Home Edition: The Missing Manual", O'Reilly, 2001.

Verhoeven et al., A Generic Metadata Tool, 10-19999, pp. 1-8.

Official Decision to Grant from the Patent Office of the Russian Federation on Mar. 27, 2009, with Translation. (citing references considered by the Russian Patent Office) (The U.S. counterpart application to JP 2001331518 is U.S. Pat. No. 7130879, which is cited above.).

* cited by examiner

SYSTEM AND METHOD FOR VIRTUAL FOLDER SHARING INCLUDING UTILIZATION OF STATIC AND DYNAMIC LISTS

CROSS-REFERENCE(S) TO RELATED APPLICATION(S)

This application is a continuation of and claims benefit of priority to U.S. application Ser. No. 10/691,841, filed Oct. 23, 2003, now U.S. Pat. No. 7,526,483 which application is a continuation-in-part of U.S. patent application Ser. No. 10/403,174, filed Mar. 27, 2003, now U.S. Pat. No. 7,925,682 priority from the filing date of which is hereby claimed. Both of which applications are herein incorporated by reference.

FIELD OF THE INVENTION

The present invention relates to file systems, and more particularly, to a system and method for sharing virtual folders.

BACKGROUND OF THE INVENTION

The sharing of files and folders has always been a difficult task. In known systems, users are often limited to just sharing out entire folders. Users typically do not have the ability to share out individual files or items. In order to share files, a user has typically had to create a folder, organize the desired files in the folder, and then share the folder.

The sharing of files has further been complicated by the fact that users also have to deal with files being in different locations, such as on different devices, on other PCs, or online. Files coming from different locations are often organized differently, and not kept in the same fashion or place. As another example, files stored on a corporate network may inherently be separated from files a user has on a current machine. Users also have to keep track not only of what file data is stored, but where it is stored. For example, for music files, users are forced to keep copies on various systems and to try to track which music files are located where. This can make files difficult to locate, even when they are locally stored.

The sharing of files is also complicated by the fact that it is also sometimes difficult to find and return to files that a user has. A user may find it difficult to recall where and how they stored certain files. Given a set of folders and even a group of similar files, users often find it difficult to quickly find the one that they are looking for. For files stored in a difficult place to find, it is that much more complex to locate. It is also sometimes difficult for users to find or return to files on a network. Users typically have to memorize or map the various sites and names that they need for finding and sharing files on a network.

Organizing and sharing files is also complicated by the fact that name spaces may vary, which can cause confusion to the user as to what is "correct." This is particularly true on a network where there are different naming conventions, limitations, and so on. For example, certain operating systems may require short names with no spaces in order for them to be visible. Programs also often save files to their own directory or other name spaces, which can make it difficult for users to find their way back to the files. Programs often have default directories and places they save documents. A user often has to search through their hard disk and make guesses about where a file is stored. Related items are also often stored in separate places. Related files that a user has may be stored on different parts of the hard disk, etc. This problem becomes more common with the developments of digital media services that have multiple content types (e.g., pictures, music, video).

The present invention is directed to providing a system and method that overcome the foregoing and other disadvantages. More specifically, the present invention is directed to a system and method for virtual folder sharing.

SUMMARY OF THE INVENTION

A system and method for virtual folder sharing, including utilization of static and dynamic lists is provided. The static and dynamic lists may be created as types of virtual folders. In accordance with one aspect of the present invention, a user is able to construct a query, find items, and then share the items with other users. The user is provided with the option to share just the items that were located by the query (a static list) or else to share the located items plus other items that meet the criteria in the future (a dynamic list). These types of lists utilize properties of virtual folders which expose items to users in different views based on their metadata instead of the actual physical underlying file system structure on the disk.

In accordance with another aspect of the invention, a static list comprises a folder of items that are in a specific order and that can optionally have annotations placed on each item. These annotations are not part of the item, but belong to the actual list. Some examples of a static list are a shopping list, a music play list, and a slide show of pictures. In accordance with the present invention, a user is able to share the static list with other users. When the static list is shared, the actual static list is left in place on the sharer's machine or server, while permission is granted to the sharees to access the list and referenced items. The permissions that are granted are determined by what the sharer specifies at the sharing time. For example, the sharer can decide to share out the list to the sharee with just read or read-write access, etc. In the case that the sharer cannot grant permission to the items (since the sharer does not have permission themselves to do this operation) then the sharer is notified at the sharing time that the sharee may not be able to access that item. At the conclusion of the process, the sharee is able to remotely access the list and its referenced items from the sharer's computer. If the sharer later changes the list by adding or removing items, these items are also automatically repermissioned to allow or disallow the sharee's access to the items. In one embodiment, it is also possible to dynamically repermission items as they come and go from the static list, since the actual definition of the static list lives in the database which can be monitored as it changes.

In accordance with another aspect of the invention, a dynamic list comprises a set of items based on a scope plus a set of criteria. For example, a user may create a query with a scope defined as all of the data storage on a local machine, and a criteria of author=X. Once the user has a dynamic list, it can be shared out. When the user shares a dynamic list, the following operations are carried out. An initial determination is made as to whether the user wants to share just the items that are currently in the dynamic list at that time, or else any items that come and go from the dynamic list in the future. If the user wants to share just the items that currently exist in the dynamic list, then a static list representing what is in the dynamic list is generated and that static list is shared. If the user instead wants to share out the true dynamic list, then all of the items that meet the criteria of the dynamic list are shared. This means the items are left in place on the machine where the sharing is occurring and the items are permissioned to allow the sharee to have access to the items. In the case that the sharer cannot grant permission to the items (e.g., the sharer does not have permission themselves to do this operation) then the sharer is notified at the time of the sharing that the sharee may not be able to access the items. At the conclusion of the process, the sharee is able to remotely access the list and its referenced items from the sharer's computer. If any items in the dynamic list have their properties changed such that they no longer meet the criteria of the dynamic list, then these items are appropriately re-permissioned. In the same way, if any items that do not belong to the dynamic list change such that they fall into the scope and meet the criteria of the dynamic list, they are also re-permissioned to grant access to the users with which the dynamic list is shared.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

A system and method for virtual folder sharing, including utilization of static and dynamic lists is provided. The static and dynamic lists may be created as types of virtual folders. Virtual folders utilize the same or similar user interfaces that are currently used for file systems. Virtual folders expose regular files and folders (also known as directories) to users in different views based on their metadata instead of the actual physical underlying file system structure on the disk. Location-independent views are created which allow users to manipulate their files and folders utilizing similar controls as those presently used for managing file systems. In general, this means that users can organize and rearrange their files based on inherent properties in the files themselves, instead of the managing and organization being done as a separate part of the system. Virtual folders may represent files or items from different physical locations, such as from multiple disk drives within the same computer, between multiple computers, or different network locations, such that one view of files or items can expose files or items sitting at different physical locations. In one embodiment, the different items or files need only be connected via an IP network in order to be included.

The virtual folder modeling is also able to be used for traditionally non-file entities. An application of this is to have a set of user interfaces similar to files and folders (that is, objects and containers) to show traditionally non-file entities. One example of such non-file entities would be e-mails, while another would be contact information from a contact database. In this manner, virtual folders provide for a location-independent, metadata-based view system that works regardless of whether the data being shown is from files or non-file entities. In general, these aspects allow more flexibility in terms of letting users manipulate their files and data, using both common user interface techniques (drag and drop, double-click, etc.) as well as leveraging the rich integration of various data types.

Figure 1:
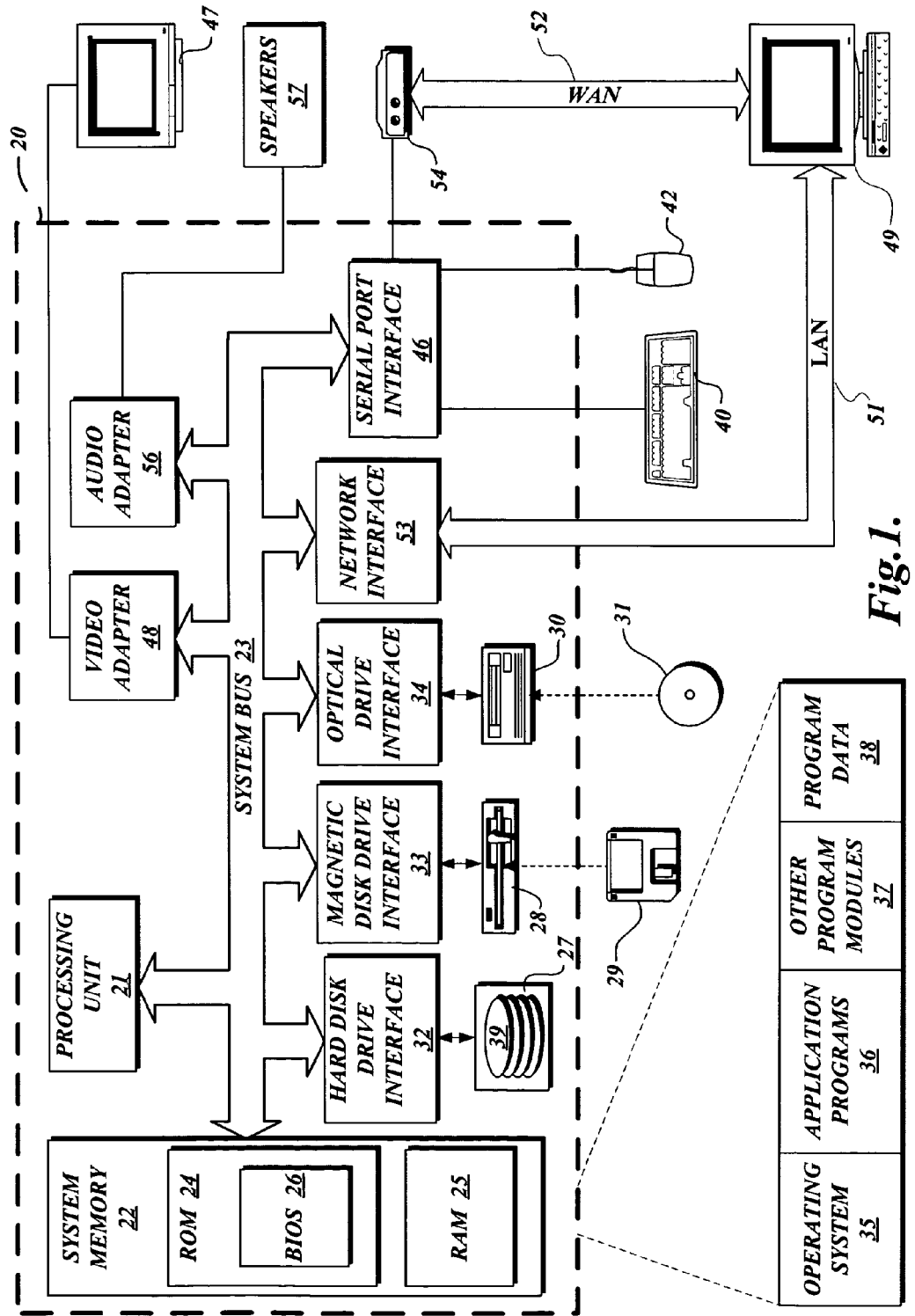
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

As implemented on a system of the type illustrated in FIG. 1, the present invention utilizes virtual folders which make it easier for users to share files and to perform basic tasks around file manipulation and folder navigation (browsing) and to provide higher level storage capabilities which can be leveraged in new features. The virtual folders expose files and items to users in different views based on their metadata instead of the actual physical underlying file system structure on the disk.

Figure 2:
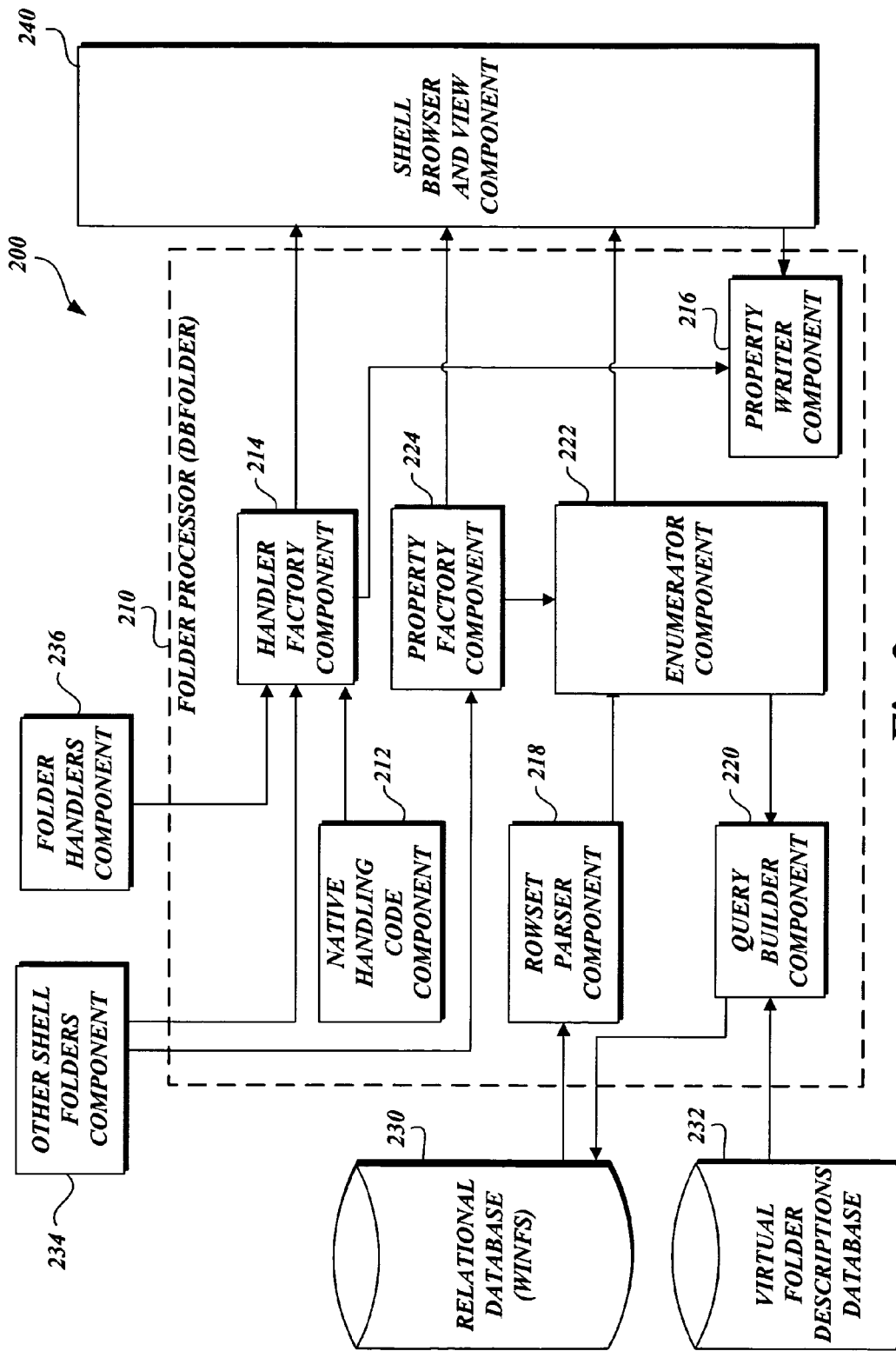
FIG. 2 is a block diagram of a virtual folder system in accordance with the present invention.

FIG. 2 is a block diagram of a virtual folder system 200 in accordance with the present invention. As will be described in more detail below, the virtual folders allow a user to change the "pivot" which controls the way the data is viewed. As an example, a user could view their music as a flat list of all the songs, which can be grouped by album. Alternatively, the user could switch the view to show only the genres or artists or years, etc. The user can tailor the view to see only the objects suited to the task at hand. This allows an improved browsing experience that negates the need for further navigation through folders (both down and back up). The same lessons and capabilities apply to modeling other data-types not stored as files. Contacts, for example, can be exposed to the user in this way, giving them familiar interface capabilities, as well as richer infrastructure for manipulating them than is provided by a flat address book.

As illustrated in FIG. 2, the virtual folder system 200 includes a folder processor 210, a relational database 230, a virtual folder descriptions database 232, an other shell folders component 234, a folder handler's component 236, and a shell browser and view component 240. The folder processor 210 includes a native handling code component 212, a handler factory component 214, a property writer component 216, a rowset parser component 218, a query builder component 220, an enumerator component 222, and a property factory component 224.

The relational database 230 stores properties about all files in the system. It also stores some items, like contacts (i.e., non-file items), entirely. In general, it stores metadata about the types of files and items that it contains. The relational database 230 receives SQL queries from the query builder 220. The relational database 230 also sends SQL rowsets to the rowset parser component 218, with one row per item, columns being the item properties.

The virtual folder descriptions database 232 includes the virtual folder descriptions. The virtual folder descriptions database 232 sends data to the query builder component 220, including a list of types to display in the folder, the initial filter, and the physical locations to show results from (the scopes).

With regard to the other shell folders component 234, the folder processor 210 delegates to existing shell folders from many types of items, including all files, for handlers or properties. The other shell folders component 234 sends properties from other folders to the property factory 224. The other shell folders component also sends handlers to the handler factory 214.

The folder handlers component 236 provides code behavior for the items that exist only in the database, like contacts. This is what allows non-file items to behave akin to files. The folder handlers component 236 sends handlers to the handler factory 214.

For the native handling code component 212, the folder processor 210 directly implements certain handlers based on the properties of the items. The native handling code component 212 sends handlers to the handler factory 214. For the native handling code component 212 and the folder handlers component 236, like all namespaces, virtual folders have to provide a set of handlers (context menu, icon, thumbnail, infotip, . . . ) for their items. For most of these (infotip, data object, drag-drop handler, background context menu . . . ) the virtual folder provides a common (native) handler for all the types it holds. However there are others which the author of the type has to provide (context menu on the item itself, writable property store, . . . ). The default handler can also be overridden. Virtual folders reuse this for files and allow non-file items do the same.

The handler factory 214 takes ID lists and produces code behaviors that provide context menus, icons, etc. In general, the folder processor 210 may use native handlers, external handlers, or delegate to other shell folders to get handlers, as described above with respect to the native handling code component 212, the other shell folders component 234, and the folder handlers component 236. The handler factory component 214 sends handlers to the shell browser in view 240, as requested by the view. The handler factory component 214 sends a property handler to the property writer 216.

The property writer 216 converts user intentions such as cut, copy, and paste into property rights to the file or item. A shell browser and view component 240 sends data to the property writer 216, including direct manipulation (cut/copy/paste) or editing of metadata. In general, since virtual folders present an organization based on the properties of an item, operations such as move and copy (drag-drop) become an edit on those properties. For example, moving a document, in a view stacked by author, from Author 1 to Author 2, means changing the author. The property writer component 216 implements this function.

The rowset parser 218 takes database rowsets and stores all item properties into a shell ID list structure. A rowset takes the piecewise definition of the virtual folder and builds a SQL string which can then be issued to the database. The rowset parser component 218 sends ID lists to the enumerator component 222. As described above, the rowset parser component 218 also receives data from the relational database 230, including SQL rowsets, with one row per item, the columns being item properties.

The query builder component 220 builds SQL queries. The query builder component 220 receives data from the enumerator component 222, including new filters from the navigation. The query builder component 220 also receives data from the virtual folder descriptions database 232, including a list of the types to display in the folder, the initial filter, and the physical location to show results from (the scopes). The query builder component 220 sends the SQL queries to the relational database 230.

In general, the query builder component 220 includes a set of rows (in other words a table). This is what running the query yields. The rowset parser component 218 takes each row and using the column names transforms the row into an ID list. An ID list is a well-known shell structure which is used to reference items in a namespace. Doing this allows virtual folders to be just like any other namespace to the rest of the shell. Also caching this data helps keep database access, which can be costly, to a minimum.

The enumerator component 222 operates in response to a navigation to a virtual folder. As described above, the enumerator component 222 receives ID lists from the rowset parser component 218, and sends new filters from the navigation to the query builder component 220. The enumerator 222 also sends data to the shell browser and view component 240, including ID lists that are returned to be inserted into the view after a navigation.

The property factory component 224 takes ID lists and property identifiers and returns values for those properties. The property factory component 224 receives data from the handler factory component 214 including the property handler. As described above, the property factory component 224 also receives data from the other shell folders component 234, including properties from other folders. The property factory component 224 also sends data to the shell browser and view component 240, including item properties, as requested by the view.

The shell browser and view component 240 displays the contents of a folder in a window, and handles all the user interaction with the displayed files or items, such as clicking, dragging, and navigating. Thus, the shell browser and view component 240 receives the user actions. The shell browser and view component 240 also gets the data regarding the code behaviors that it needs from the folder, in this case the folder processor 210.

As described above, the virtual folders expose regular files and folders (also known as directories) to users in different views based on their metadata instead of the actual physical underlying file system structure on the disk. Thus, the system is able to take a property that is stored in the database and represent it as a container that is like a folder. Since users are already familiar with working with folders, by presenting the virtual folders in a similar manner, users can adapt to the new system more quickly.

Figure 3:
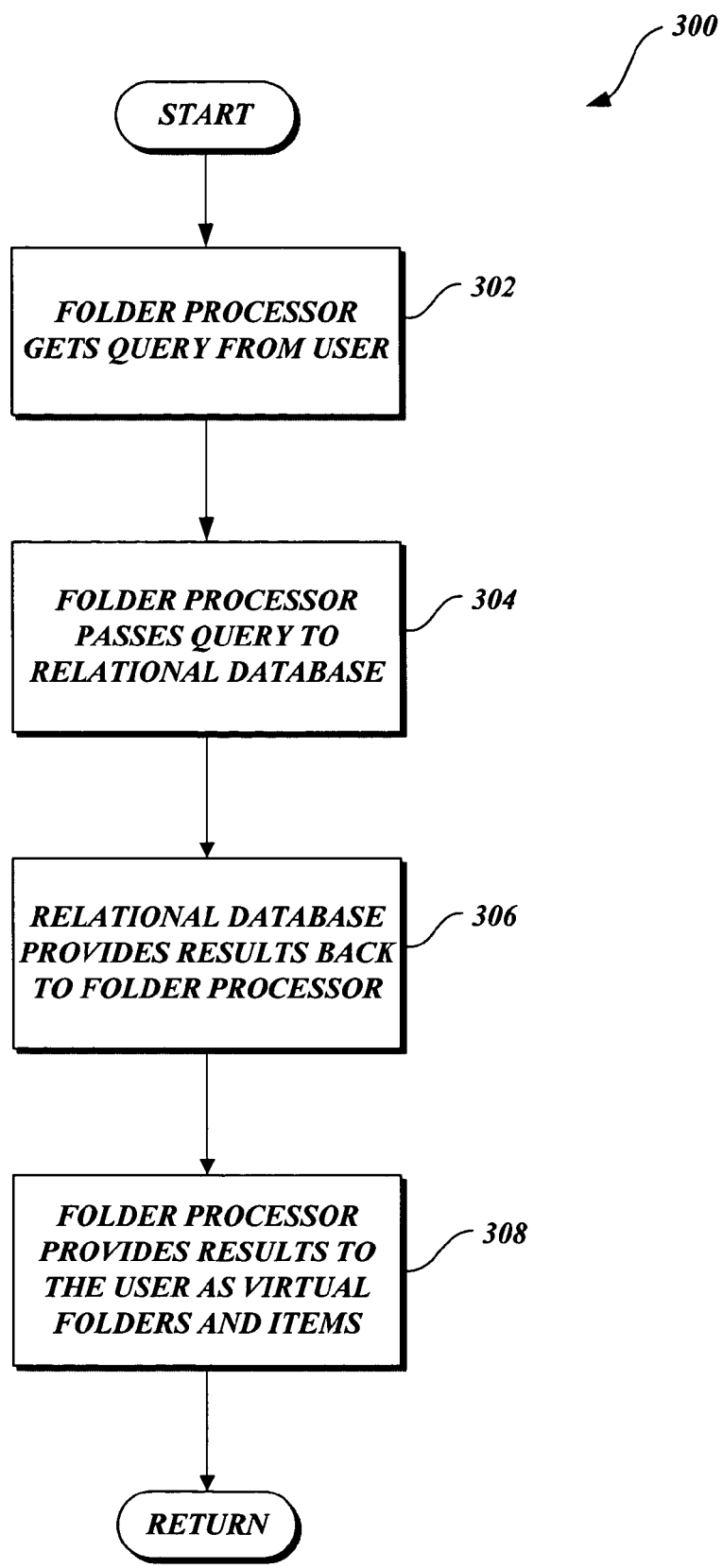
FIG. 3 is a flow diagram illustrative of a routine by which a user provides a query that draws back selected files and folders.

FIG. 3 is a flow diagram illustrative of a routine 300 by which a user provides a query that draws back selected items. At a block 302, the folder processor gets a query from the user. In a block 304, the folder processor passes the query to the relational database. At a block 306, the relational database provides the results back to the folder processor. At block 308, the folder processor provides the results to the user in the form of virtual folders and items.

Figure 4:
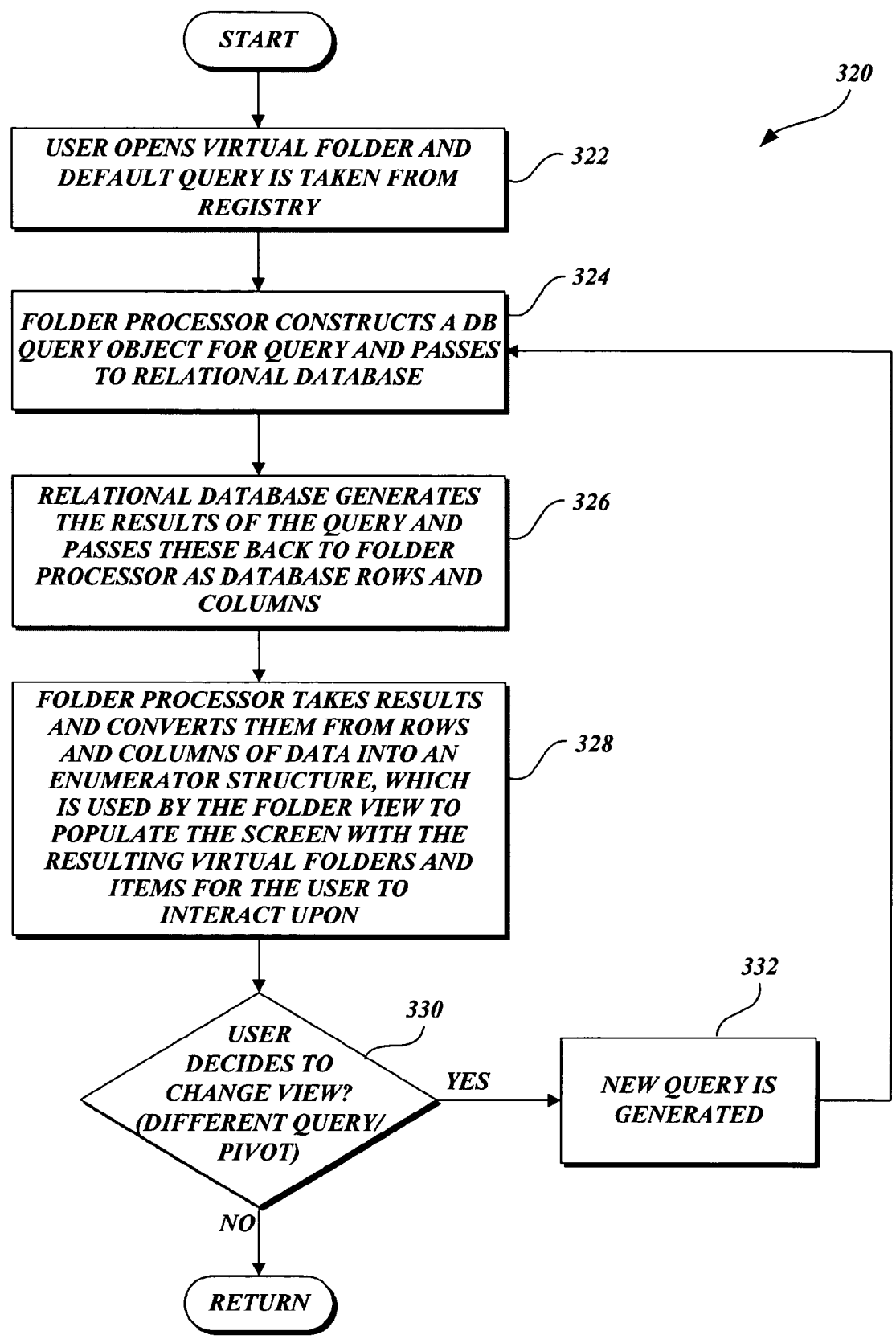
FIG. 4 is a flow diagram illustrative of a routine by which virtual folders are constructed and displayed on the screen in accordance with either a default query or a query from the user.

FIG. 4 is a flow diagram illustrative of a routine 320 by which virtual folders are constructed and displayed on the screen in accordance with either a default query or a query from the user. At a block 322, when a user first opens the virtual folder, a default query is used. This default query is taken from the registry. For example, the default query for a music library could be to show all the songs grouped by album. At a block 324, the folder processor constructs a query object for this query, and then passes this query to the relational database. At a block 326, the relational database generates the results of the query and passes these back to the folder processor as database rows and columns.

At a block 328, the folder processor takes these results and converts them from the rows and columns of data into an enumerator structure, which is used by the folder view to populate the screen with the resulting virtual folders and items for the user to interact upon. At a decision block 330, a user decides whether to change the view (by issuing a different query or "pivot"). For example, a user could issue a "show all artists" pivot. If the user does want to change the view, then the routine returns to block 324 where the folder processor passes this new query to the relational database, and receives back new rows and columns of results, and constructs a new enumerator structure. The process then continues as described above, as the folder view clears and updates, using the enumerator to draw the "artist" objects to the screen.

In one example, album objects are provided that represent containers that users can navigate into. For example, double-clicking the "Beatles" albums will navigate the view to see all of the Beatles' songs. The folder processor issues the "show all Beatles' songs" query to the relational database, which hands back the rows and columns of data for those songs. The folder processor creates an enumerator of all these songs, which then get drawn to the screen.

The user can also choose the view at any point while browsing virtual folders. From the above example, after narrowing down to just show Beatles songs, a user can change the view to only show the songs as albums. The process of changing the view of items into another representation is called "stacking". This is because the items are conceptually arranged into "stacks" based on that representation. In this case, the songs are rearranged into stacks for each of the various albums. Users can then navigate into one of these stacks, only seeing the songs from that particular album. Again, the user can rearrange the view of these remaining songs into stacks based on a property (e.g., a rating, for example). If the rating property were selected, the songs from that Beatles album would be shown in stacks for a one-, two-, or a three-star rating.

The results of each query depend on which physical locations are included in the scope. For example, the scope may be made to include only the folders in the user's "my documents" folder. Alternatively, the scope could include all folders on the computer, or even all folders on multiple network connected computers. The user is able to view and change the scope through a scope property sheet. In one example, the scope property sheet could be exposed by right-clicking on the virtual folder and choosing "properties." The user could add new folders to the scope, or remove folders that were previously added.

One group of users for which virtual folders will provide particular utility is knowledge workers. Virtual folders allow knowledge workers to easily switch between viewing documents by file type, project, case number, author, etc. Since knowledge workers each tend to have a different method for organizing documents, virtual folders can be used to accommodate these different preferences.

Figure 5:
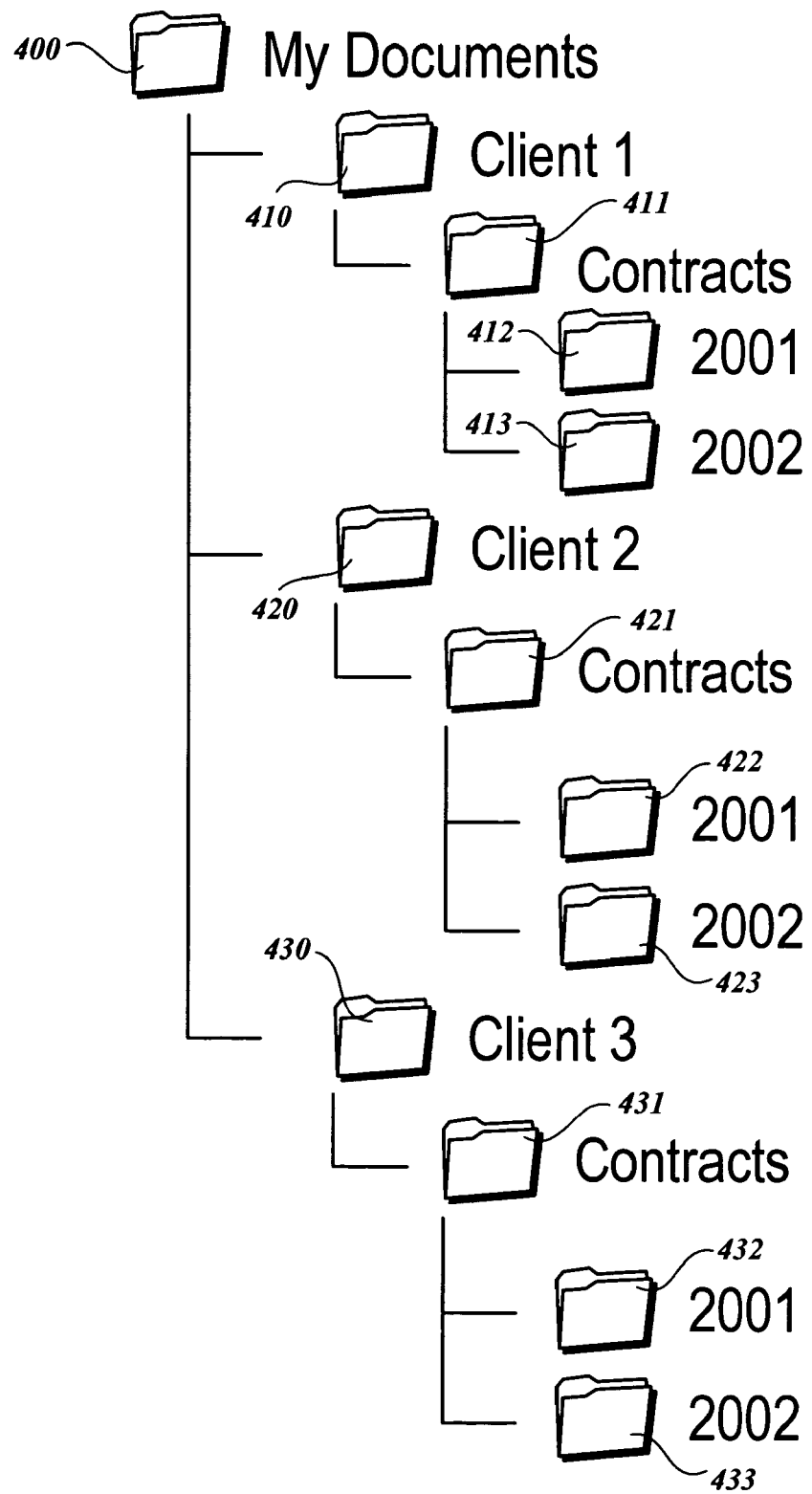
FIG. 5 is a tree diagram of a folder structure in accordance with a physical folder arrangement on a hard drive.

FIG. 5 is a tree diagram of a folder structure in accordance with a physical folder arrangement on a hard drive. This physical folder arrangement is based on the traditional implementation of folders, which may be based on NTFS or other existing file systems. Such folders are referred to as physical folders because their structuring is based on the actual physical underlying file system structure on the disk. As will be described in more detail below, this is in contrast to virtual folders, which create location-independent views that allow users to manipulate files and folders in ways that are similar to those currently used for manipulating physical folders.

As illustrated in FIG. 5, a folder 400 is a "my documents" folder. At a first level, the folder 400 includes folders 410, 420, and 430, corresponding to Clients 1, 2, and 3, respectively. At a second level, each of the folders 410, 420, and 430 contain a folder 411, 421, and 431, respectively, which each correspond to the contracts for the selected client. At a third level, each of the folders 411, 421, and 431 contains a folder 412, 422, and 432, respectively, each corresponding to the year 2001. At the third level, each of the folders 411, 421, and 431 also contains a folder 413, 423, and 433, respectively, each corresponding to the year 2002.

It will be appreciated that a number of obstacles are presented to a user who wishes to navigate a physical folder file structure such as that illustrated in FIG. 5. For example, if the user wishes to work with all of the contracts that the user has produced, the user will first need to navigate to the folder 411 to work with the contracts for Client 1, and then will have to renavigate to the folder 421 to reach the contracts for Client 2, and will again have to renavigate to the folder 431 for the contracts for Client 3. This arrangement makes it difficult for the user to access all of the contracts, and in general prevents simultaneous viewing and manipulation of all of the contracts. Similarly, if the user wishes to view all of the contracts produced in the year 2001, the user will have to navigate and renavigate to the folders 412, 422, and 432, respectively. As will be described in more detail below, the virtual folders of the present invention provide an improved file system structure.

Figure 6:
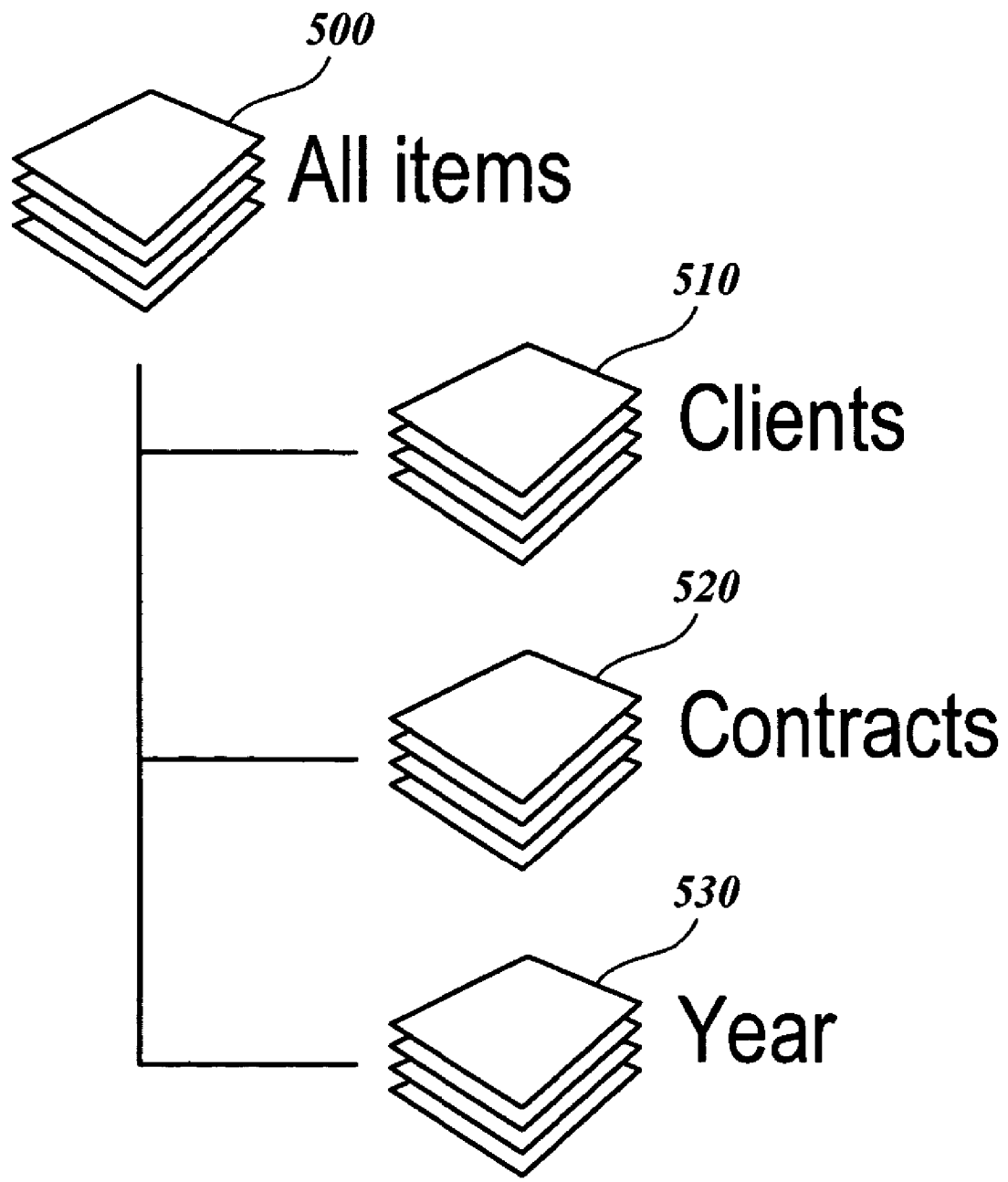
FIG. 6 is a tree diagram of a virtual folder structure.

FIG. 6 is a tree diagram of a virtual folder structure. As will be described in more detail below, virtual folders create location-independent views that allow users to manipulate their files and folders in convenient ways. As shown in FIG. 6, the virtual folders are represented as stacks. A virtual folder 500 is an "all items" folder. At a first level, the virtual folder 500 contains virtual folders 510, 520, and 530, corresponding to clients, contracts, and year, respectively. As will be described in more detail below, this structure allows a user to access files according to a desired parameter.

Figure 7:
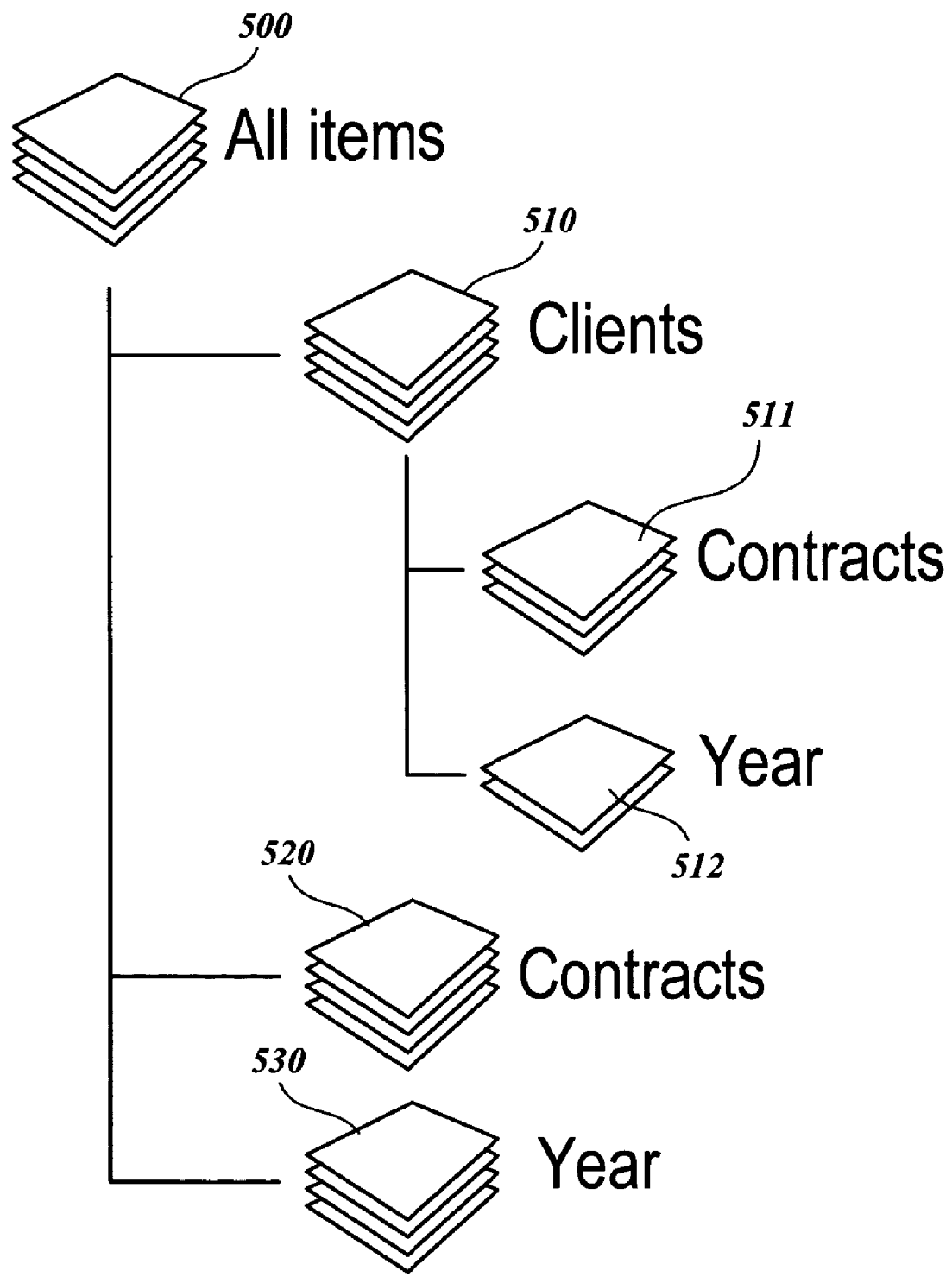
FIG. 7 is a tree diagram of the virtual folder structure of FIG. 6, wherein the clients stack is further filtered by contracts and year.

FIG. 7 is a tree diagram of the virtual folder structure of FIG. 6, wherein at a second level, the virtual folder 510 further includes virtual folders 511 and 512, which correspond to contracts and year, respectively. In other words, the clients stack of virtual folder 510 is further filtered by contracts and year. The process for determining which files and items are contained in each of the virtual folders will be described in more detail below.

Figure 8:
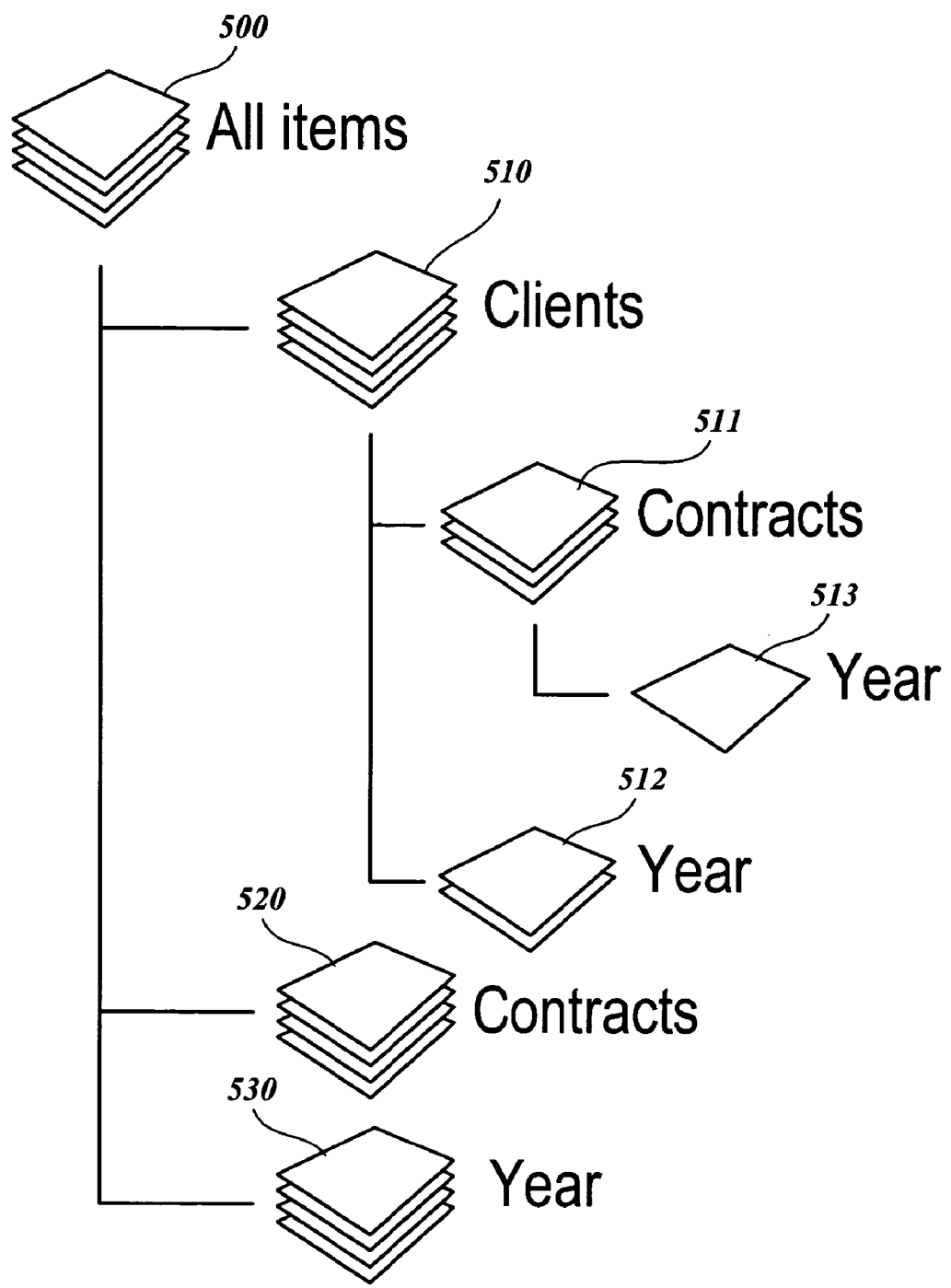
FIG. 8 is a tree diagram of the virtual folder structure of FIG. 7, wherein the contracts of the clients stack are further filtered by year.

FIG. 8 is a tree diagram of the virtual folder structure of FIG. 7, wherein at a third level, the virtual folder 511 contains a virtual folder 513, which corresponds to a year. In other words, the contracts stack of virtual folder 511 is further filtered by year. While the virtual folder structure for the virtual folders 510, 511, and 513 have been structured according to clients, contracts, and year, it will be appreciated that the virtual folders allow for other structuring sequences to occur, as will be described in more detail below with reference to FIG. 9.

Figure 9:
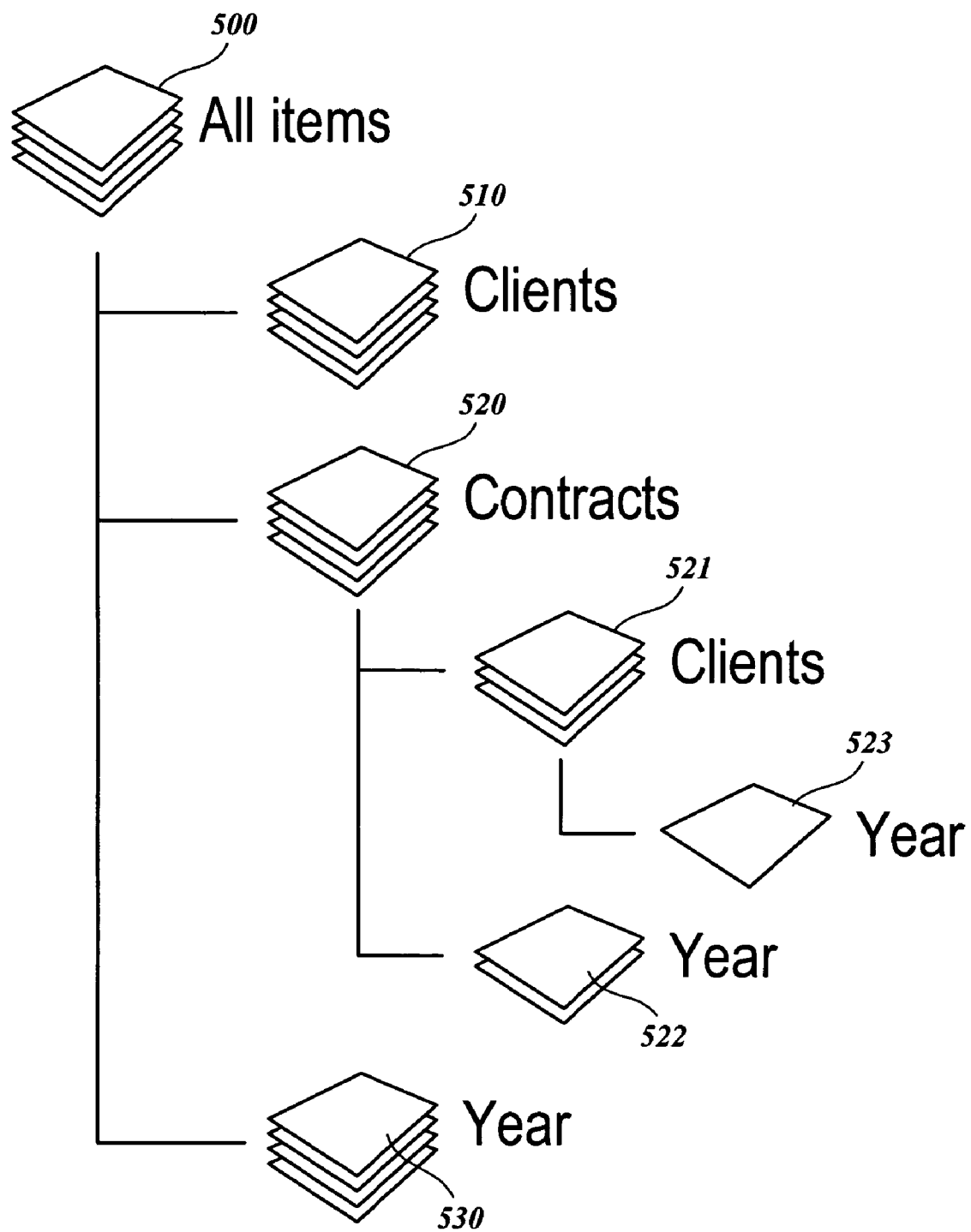
FIG. 9 is a tree diagram of the virtual folder structure of FIG. 6, wherein the contracts stack is further filtered by clients and year, of which the clients are still further filtered by year.

FIG. 9 is a tree diagram of the virtual folder structure of FIG. 6, wherein at a second level, the virtual folder 520 has been further filtered into virtual folders 521 and 522, corresponding to clients and year. At a third level, the virtual folder 521 has further been filtered to a virtual folder 523, corresponding to a year. The contrast between the organizational structures of FIGS. 8 and 9 helps illustrate the flexibility of the virtual folder system. In other words, in a virtual folder system, a user is able to navigate the virtual folders according to desired parameters, as opposed to being dependent on the location-dependent views of a physical file structure such as that illustrated in FIG. 5.

Figure 10:
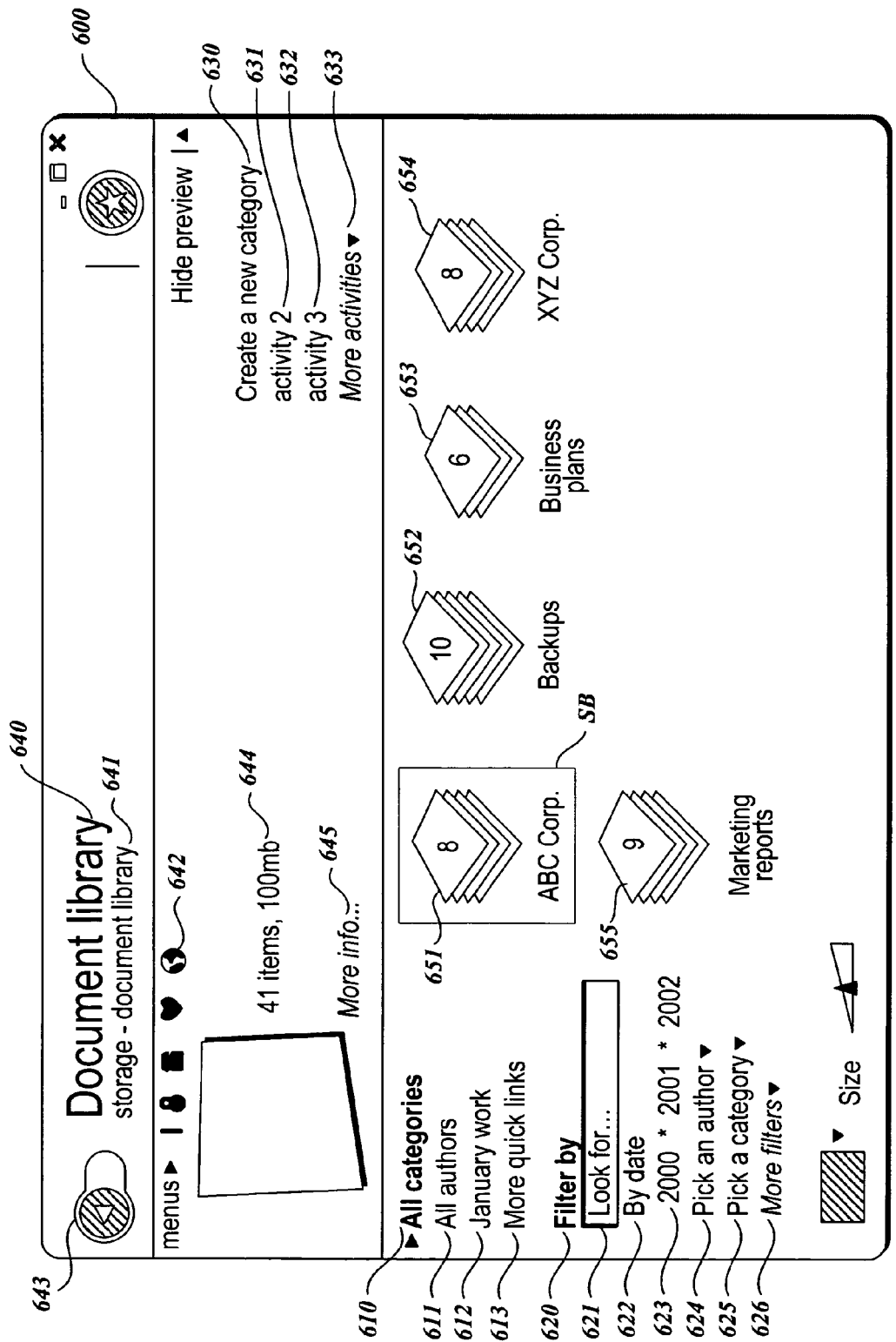
FIG. 10 is a diagram illustrative of a screen display showing the stacks of a document library.

FIG. 10 is a diagram illustrative of a screen display 600 showing the stacks of a document library. As noted above, stacks can be used to represent a type of virtual folder. As will be described in more detail below, the screen display 600 includes quick link elements 610-613, filter elements 620-626, activity elements 630-633, information and control elements 640-645, and virtual folder stacks 651-655.

The quick link elements include an "all categories" quick link 610, on "all authors" quick link 611, a "January work" quick link 612, and a selection for displaying additional quick links 613. As will be described in more detail below, quick links can be selected by a user to perform desired navigations of the virtual folders. Quick links may be provided by the system, and some quick links may be created and saved by a user.

The filter elements include a "filter by" indicator 620, an entry blank 621, a "by date" indicator 622, a "year" selector 623, a "pick an author" selector 624, a "pick a category" selector 625, and a "more filters" selector 626. The "filter by" indicator 620 directs a user to the fact that the items below can be used to filter the virtual folders or items. The entry blank 621 provides an area in which a user can type a desired new filter term. The "by date" indicator 622 directs a user to the fact that by selecting a date from the "year" selector 623, the virtual folders or items can be filtered by the selected year. The "pick an author" selector 624 allows a user to filter according to a specific author. The "pick a category" selector 625 allows a user to filter according to a selected category. The "more filters" selector 626 allows a user to pull up additional filters on the display.

The activity selectors include a "create a new category" selector 630, "activity" selectors 631 and 632, and a "more activities" selector 633. As will be described in more detail below, the activities that are presented may be for generally desirable functions, or may more specifically be directed to activities useful for the type of virtual folders that are currently being displayed. For example, the "create a new category" selector 630 can be selected by the user to create a new category which will be represented by a new stack.

As noted above, the activity selectors 631 and 632 may be more specifically directed to the type of folders or items that are being displayed. For example, the present display is of a document library, for which the "activity" selectors 631 and 632 may be directed to activities specifically tailored for documents, such as editing or creating attachments. If the present library had been a photo library, the "activity" selector 631 and 632 could be for activities specifically directed to photos, such as forming photo albums or sharing photos with other users.

The information and control elements include information lines 640 and 641, a control line 642, a backspace control 643, and information lines 644 and 645. The information lines 640 and 641 provide information as to the current navigation of the virtual folders or items. In the present example, the information line 640 indicates that the current navigation is to a document library, while the information line 641 indicates the more complete navigation, showing that the document library is within the storage area. The control line 642 provides a number of standard controls, and the backspace button 643 allows a user to back up through a navigation. The information line 644 provides numerical information about the contents of the present navigation. In the present example, the information line 644 indicates that there are 41 items which take up 100 MB in the stacks of the document library. The information line 645 is available to provide additional information, such as additional information about a file that is selected.

The stacks of the document library include an "ABC Corp." stack 651, a "backups stack" 652, a "business plans" stack 653, an "XYZ Corp." stack 654, and a "marketing reports" stack 655. The numbers on top of each of the stacks indicate how many items are in each stack. For example, the "ABC Corp." stack 651 is shown to include 8 items. The total number of items of the stacks adds up to the number of items indicated in the information line 644, which as described above is 41 in the present example. A selection box SB is provided which can be utilized by a user to select a desired item. The selection of the "ABC Corp." stack 651 yields a view of the items of that stack, as will be described below with respect to FIG. 11.

Figure 11:
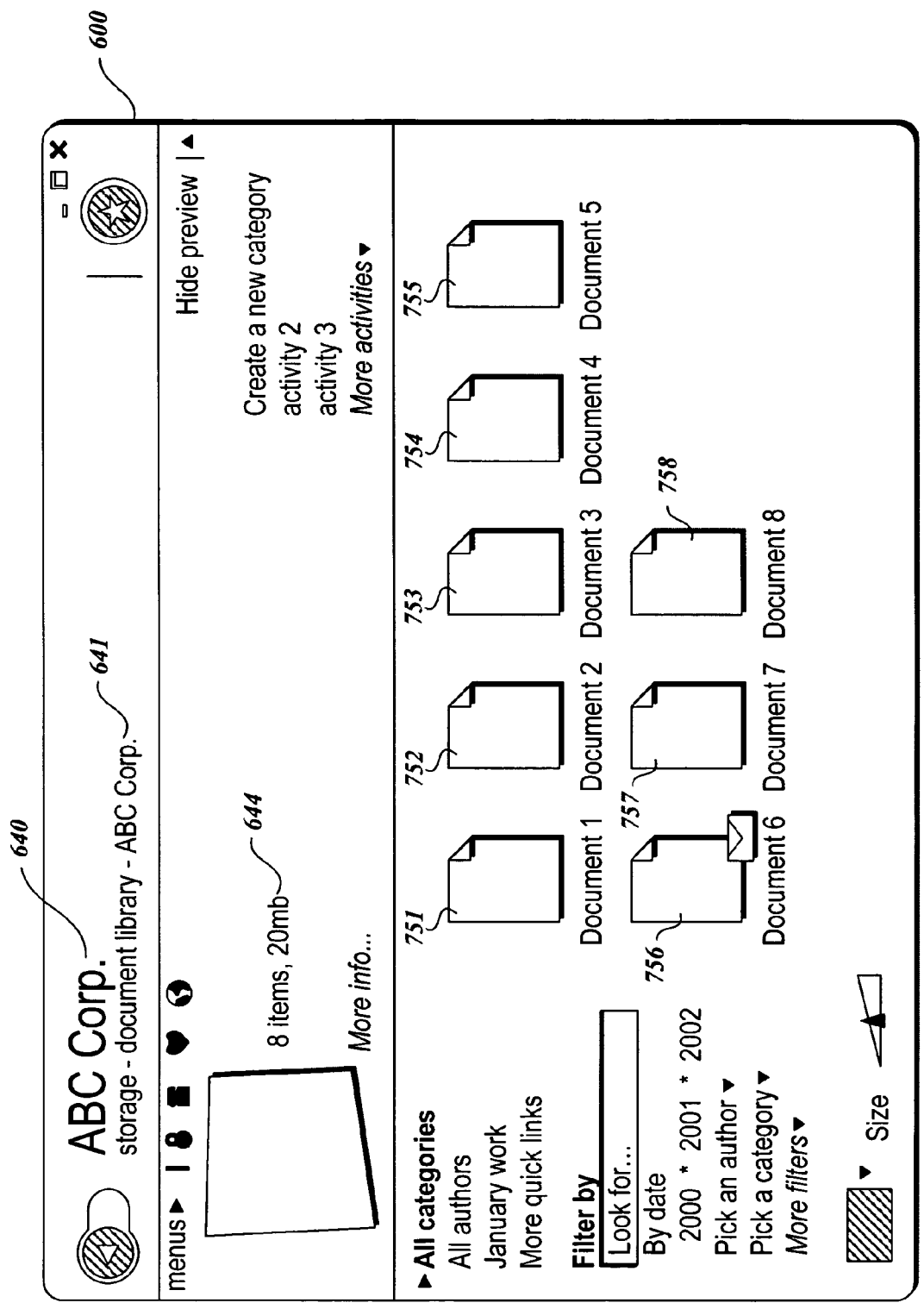
FIG. 11 is a diagram illustrative of a screen display showing the documents in the ABC Corp. stack of FIG. 10.

FIG. 11 is a diagram illustrative of a screen display showing the items in the "ABC Corp." stack 651 of FIG. 10. It should be noted that the information lines 640 and 641 now indicate that the present navigation is showing the "ABC Corp." stack. The "ABC Corp." stack 651 is shown to include 8 documents 751-758, corresponding to documents 1-8, respectively. The information line 644 correspondingly indicates that there are 8 items which take up 20 MB of memory. Documents of FIG. 11 may be further arranged into stacks within the ABC Corp. stack. In other words, within the virtual folder represented by the ABC Corp. stack 651, additional virtual folders may be organized to hold the documents, as will be described below with respect to FIGS. 12-16.

Figure 12:
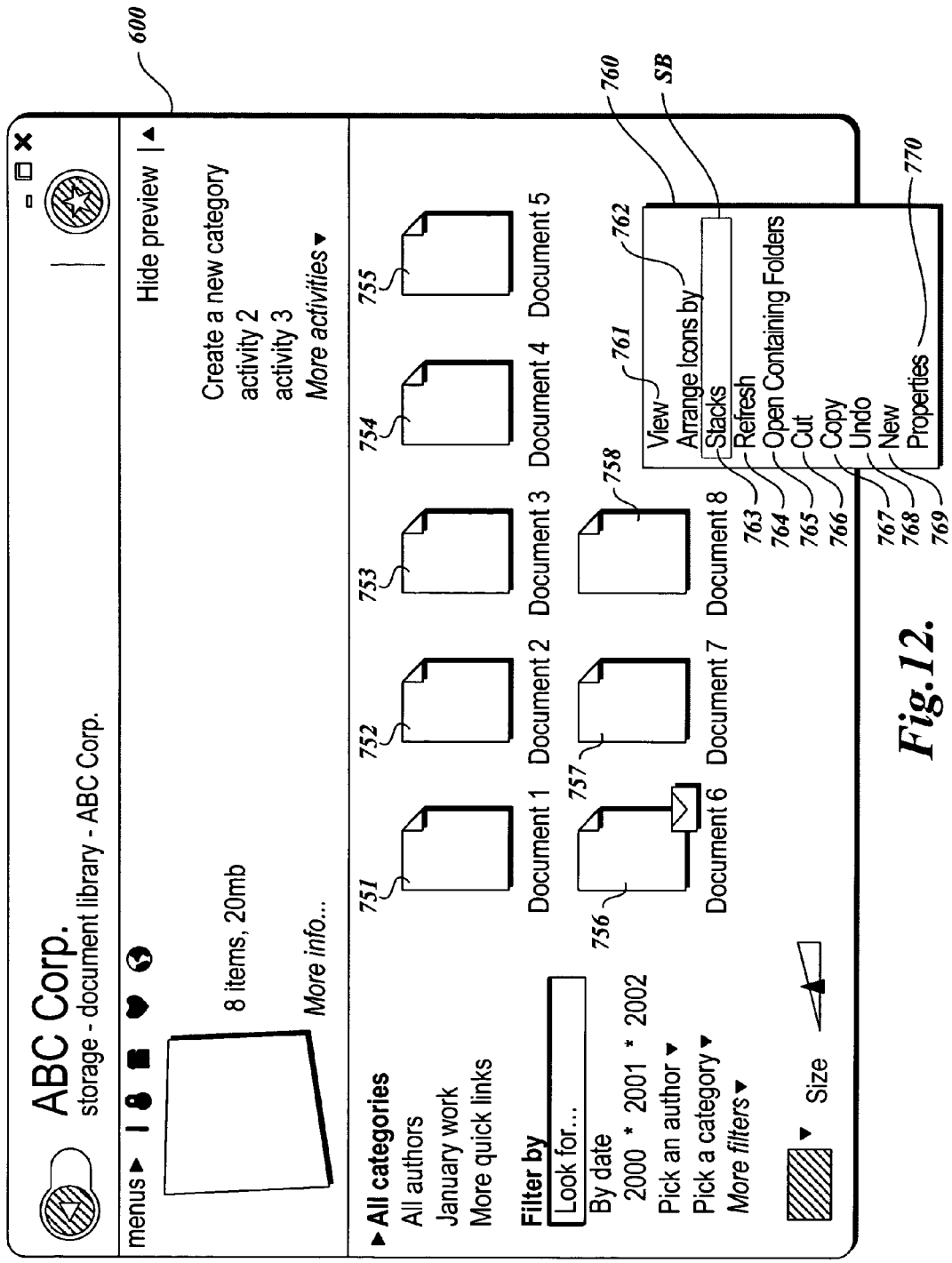
FIG. 12 is a diagram illustrative of a screen display in which a stacking function is selected for the documents of FIG. 11.

FIG. 12 is a diagram illustrative of a screen display in which a stacking function is selected for the documents of FIG. 11. As shown in FIG. 12, the user is able to pull up a function box 760. The function box 760 includes a "view" selection 761, an "arrange icons by" selection 762, a "stacks" selection 763, a "refresh" selection 764, an "open containing folders" selection 765, a "cut" selection 766, a "copy" selection 767, an "undo" selection 768, a "new" selection 769, and a "properties" selection 770. The selection box SB is shown to be around the "stacks" selection 763.

Figure 13:
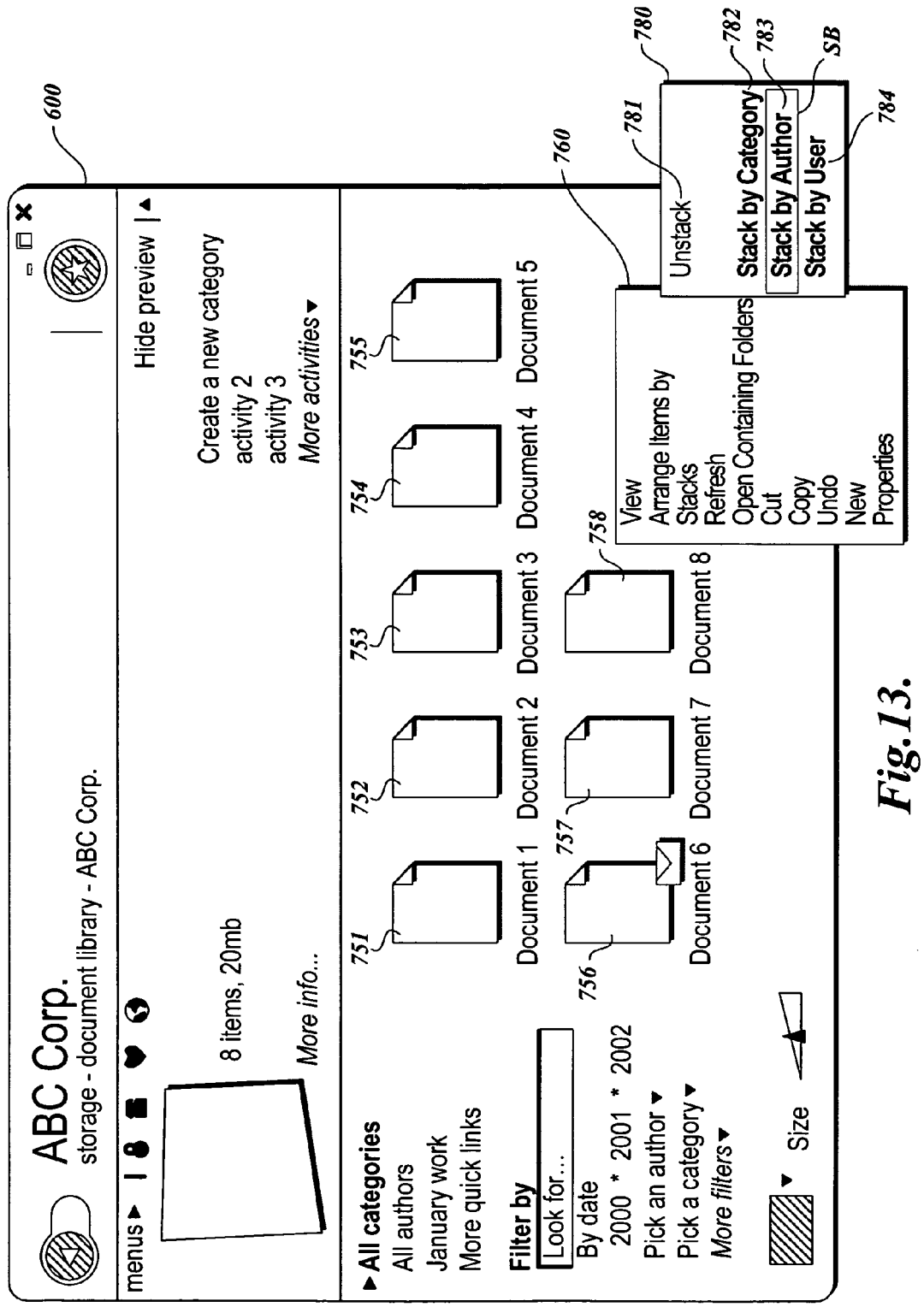
FIG. 13 is a diagram illustrative of a screen display in which a "stack by author" parameter is selected for the stacking function of FIG. 12.

FIG. 13 is a diagram illustrative of a screen display in which a "stack by author" parameter is selected for the stacking function of FIG. 12. As shown in FIG. 13, a box 780 is displayed which presents various stacking options. The stacking options include an "unstack" option 781, a "stack by category" option 782, a "stack by author" option 783, and a "stack by a user" option 784. The selection box SB is shown to be around the "stack by author" option 783.

Figure 14:
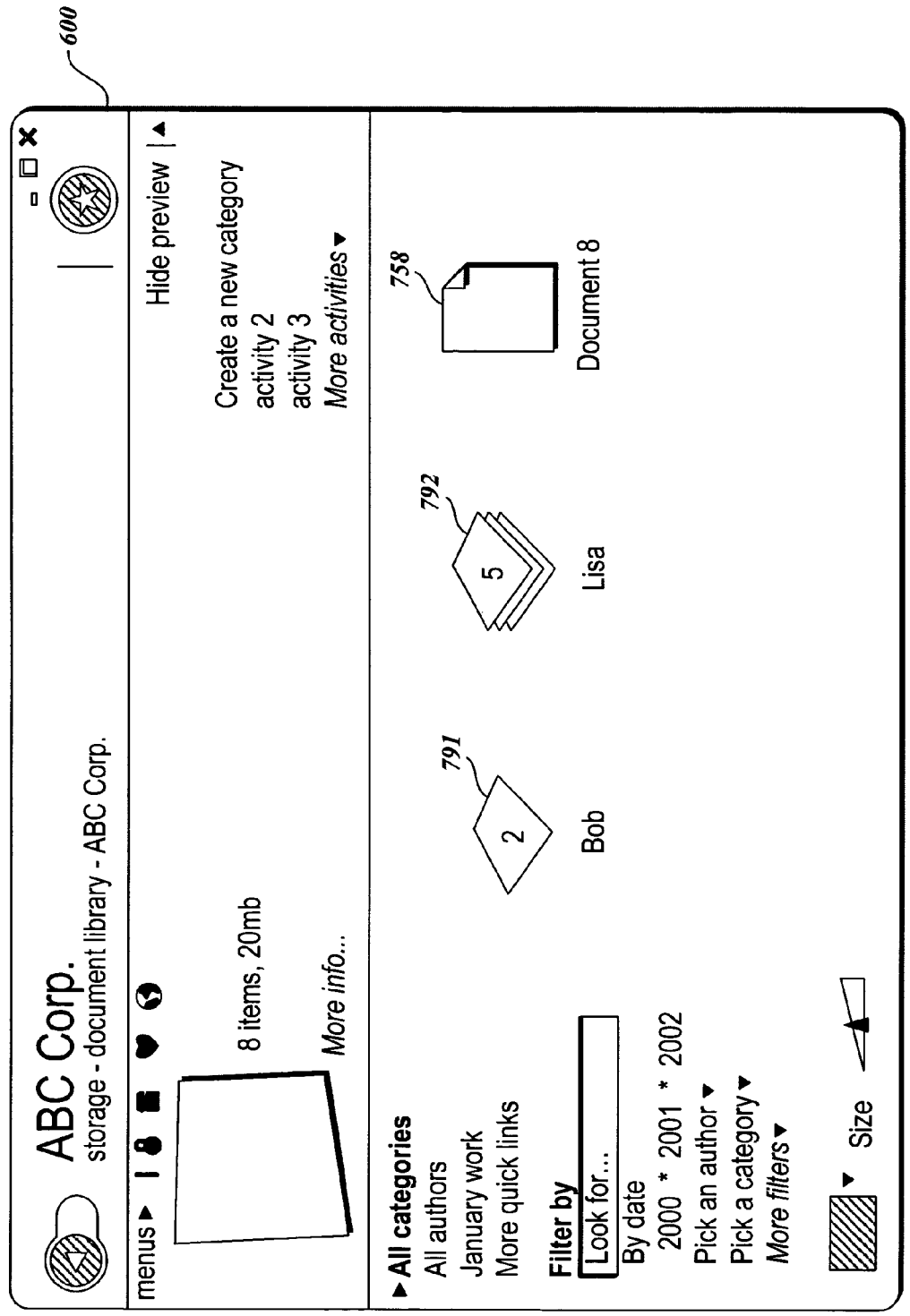
FIG. 14 is a diagram illustrative of a screen display in which the files of FIG. 13 have been stacked by author.

FIG. 14 is a diagram illustrative of a screen display in which the files of FIG. 13 have been stacked by author. As shown in FIG. 14, stacks 791 and 792 correspond to authors Bob and Lisa, respectively. As indicated by the numbers on top of each of the stacks, the Bob stack 791 includes two items, while the Lisa stack 792 includes five items. The item 758 (corresponding to document 8) did not have an author, and so is not included in an "author" stack. The stacks 791 and 792 illustrate that stacks may be organized at multiple levels, such as within the "ABC Corp." stack 651. Thus, the virtual folders may be formed at multiple levels, such as the "Lisa" stack 792 being within the "ABC Corp." stack 651 which is within the document library.

Figure 15:
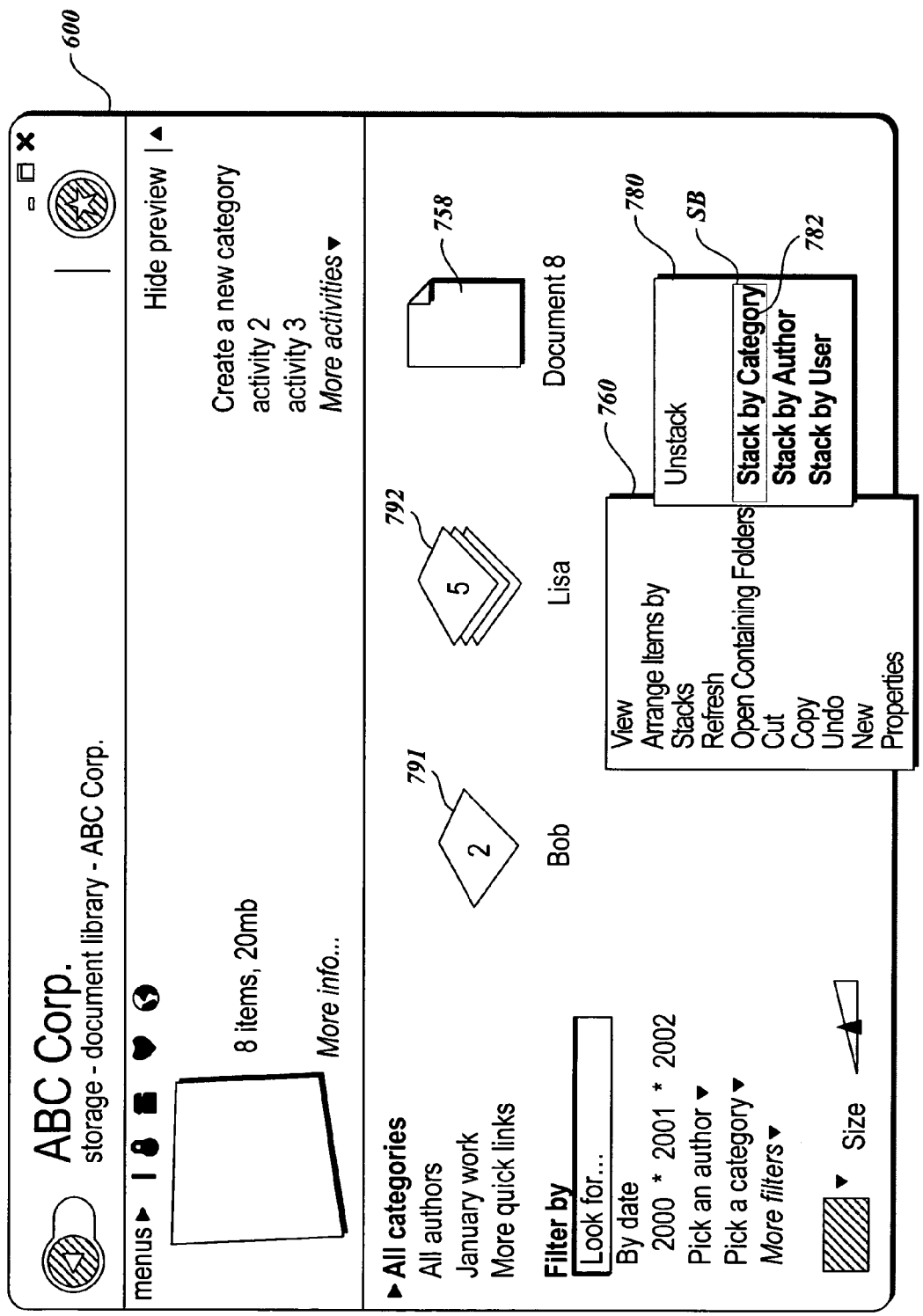
FIG. 15 is a diagram illustrative of a screen display in which a stacking function is selected and a "stack by category" option is further selected for restacking the files of FIG. 14.

FIG. 15 is a diagram illustrative of a screen display in which a "stack by category" option is further selected for restacking the files of FIG. 14. As shown in FIG. 15, the selection box SB is around the "stack by category" option 782. Since some of the items are already stacked in the stacks 791 and 792, the selection of the "stack by category" option 782 will restack the items, as will be described in more detail below with reference to FIG. 16.

Figure 16:
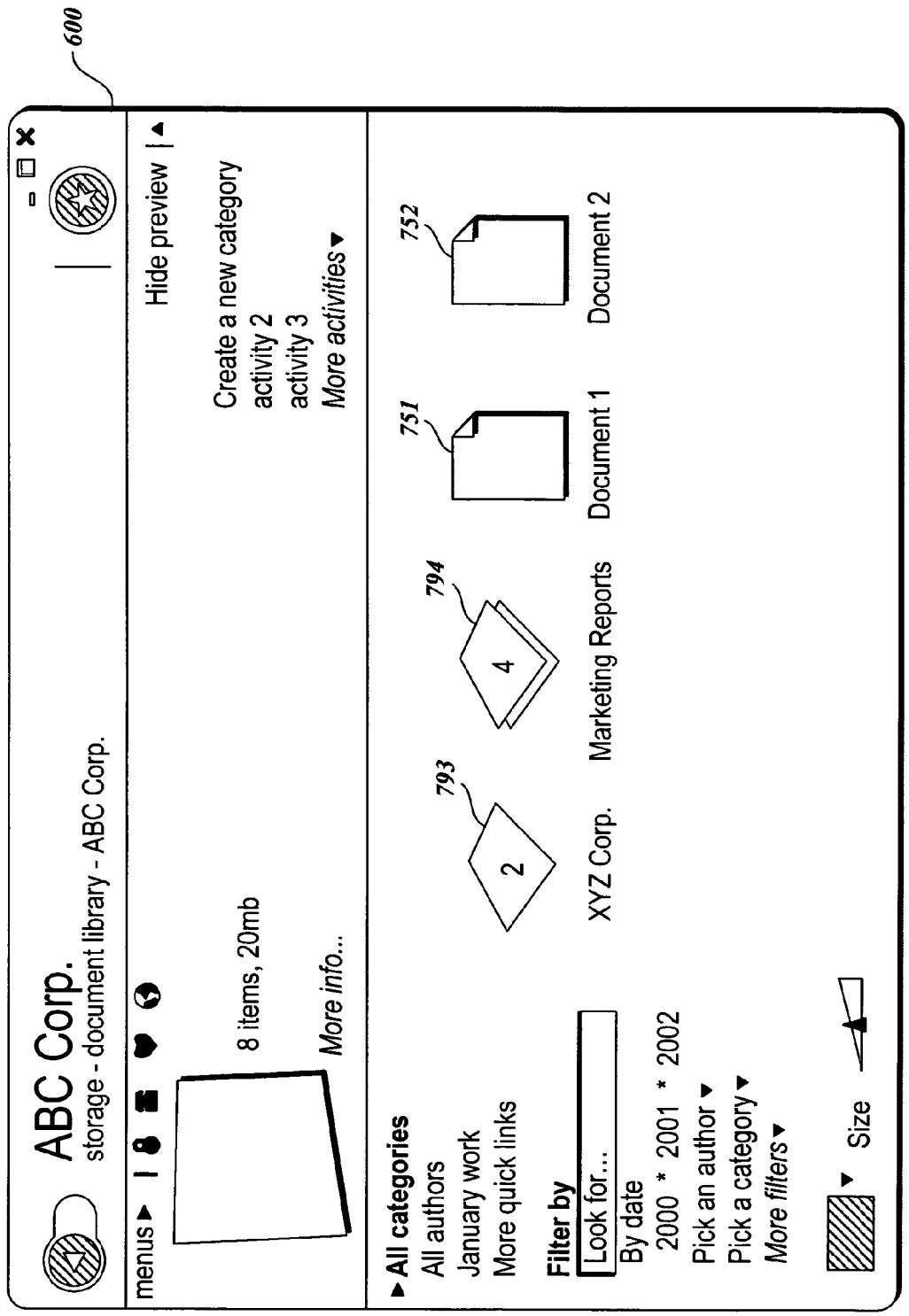
FIG. 16 is a diagram illustrative of a screen display in which the files of FIG. 14 have been restacked by category.

FIG. 16 is a diagram illustrative of a screen display in which the files of FIG. 14 are restacked by category. As shown in FIG. 16, the stacks 793 and 794 correspond to the "XYZ Corp." and "marketing reports" categories, respectively. The items 751 and 752, corresponding to documents 1 and 2, were not designated for any additional categories, and thus did not fall into any of the other category stacks.

Figure 17:
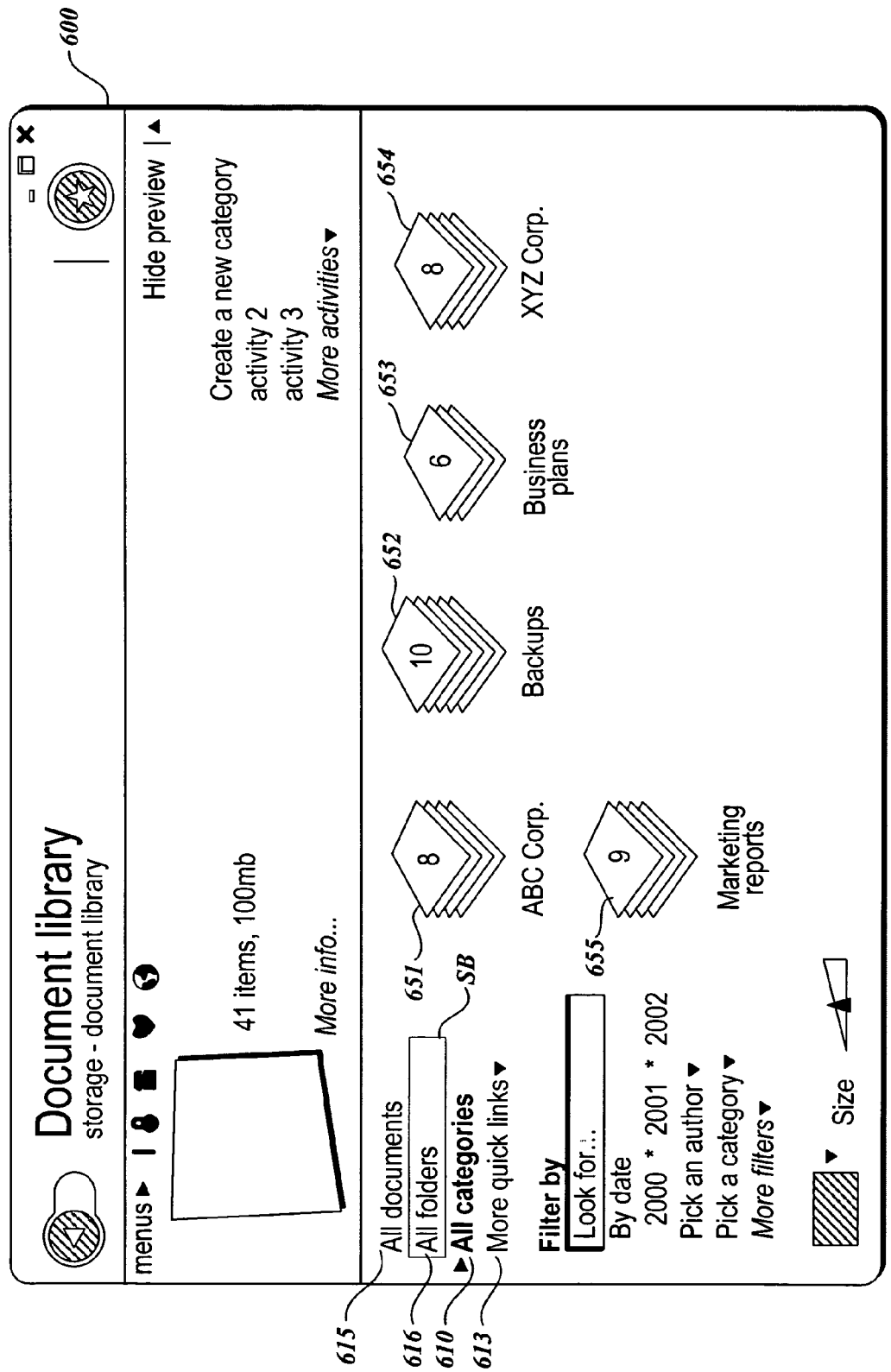
FIG. 17 is a diagram illustrative of a screen display in which a quick link for showing physical folders is selected.

FIG. 17 is a diagram illustrative of a screen display in which a quick link for physical folders is selected. The selection box SB is shown to be around the "all folders" quick link 616. As will be described in more detail below with respect to FIG. 18, the "all folders" quick link 616 provides for switching to a view of physical folders.

Figure 18:
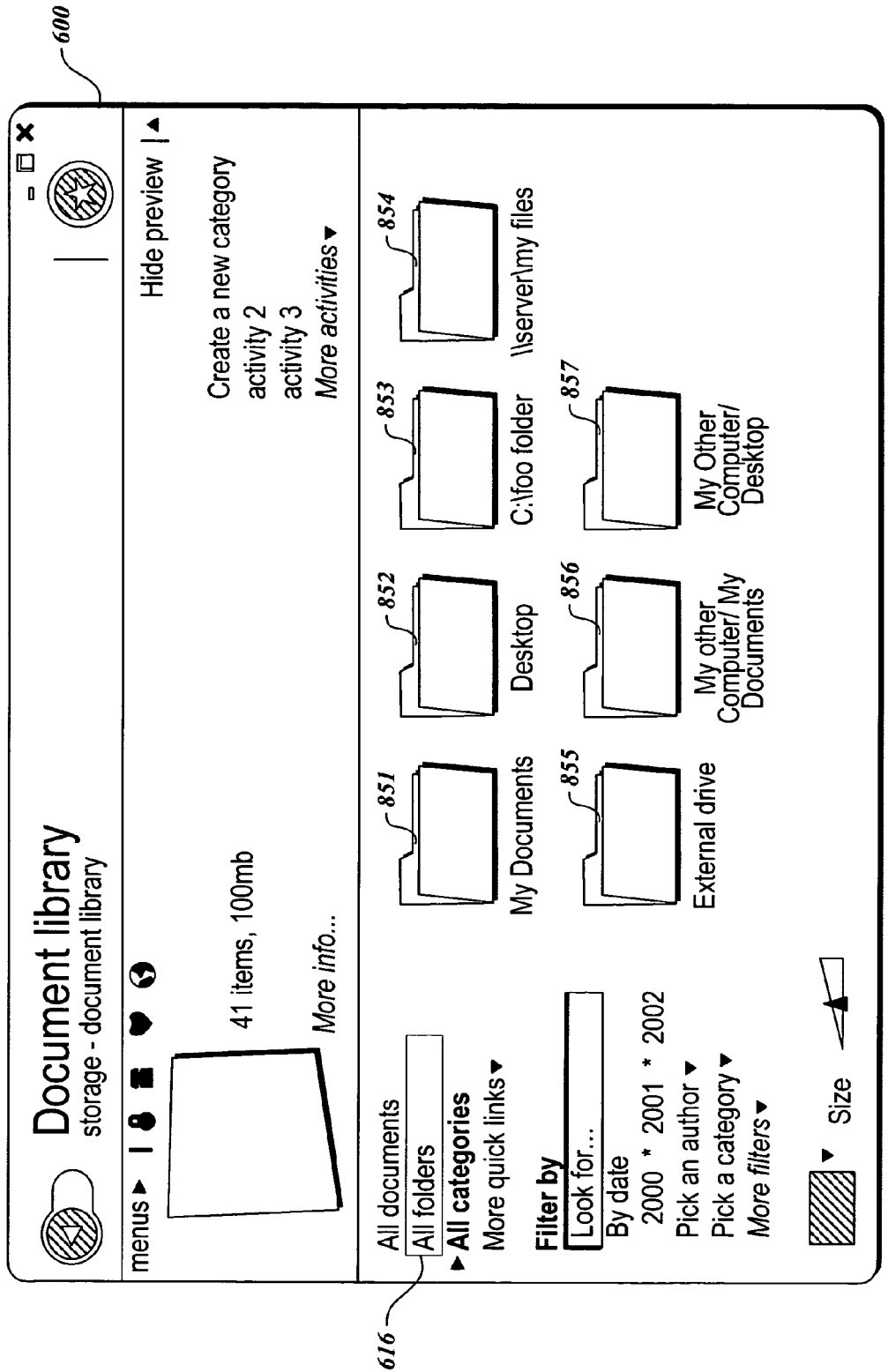
FIG. 18 is a diagram illustrative of a screen display in which the physical folders are shown which contain the files of the virtual folder stacks of FIG. 17.

FIG. 18 is a diagram illustrative of a screen display showing physical folders. The physical folders that are shown contain the files of the virtual folder stacks of FIG. 17. In other words, the items contained within the stacks 651-655 of FIG. 17 are also contained in certain physical folders in the system. These are shown in FIG. 18 as a "My Documents" folder 851 that is located on the present computer, a "Desktop" folder 852 that is located on the present computer, a "Foo" folder 853 that is located on the hard drive C:, a "My Files" folder 854 that is located on a server, an "External Drive" folder 855 that is located on an external drive, a "My Documents" folder 856 that is located on another computer, and a "Desktop" folder 857 that is located on another computer.

As shown in FIG. 18, a user is able to switch from the virtual files representation of FIG. 17 to the physical file representation of FIG. 18. This allows a user to toggle between virtual file representations and physical file representations, depending on which is desired for a current task. The different locations of the physical folders 851-857 also illustrate that the scope of the virtual file system may be relatively broad, as will be described in more detail below.

Figure 19:
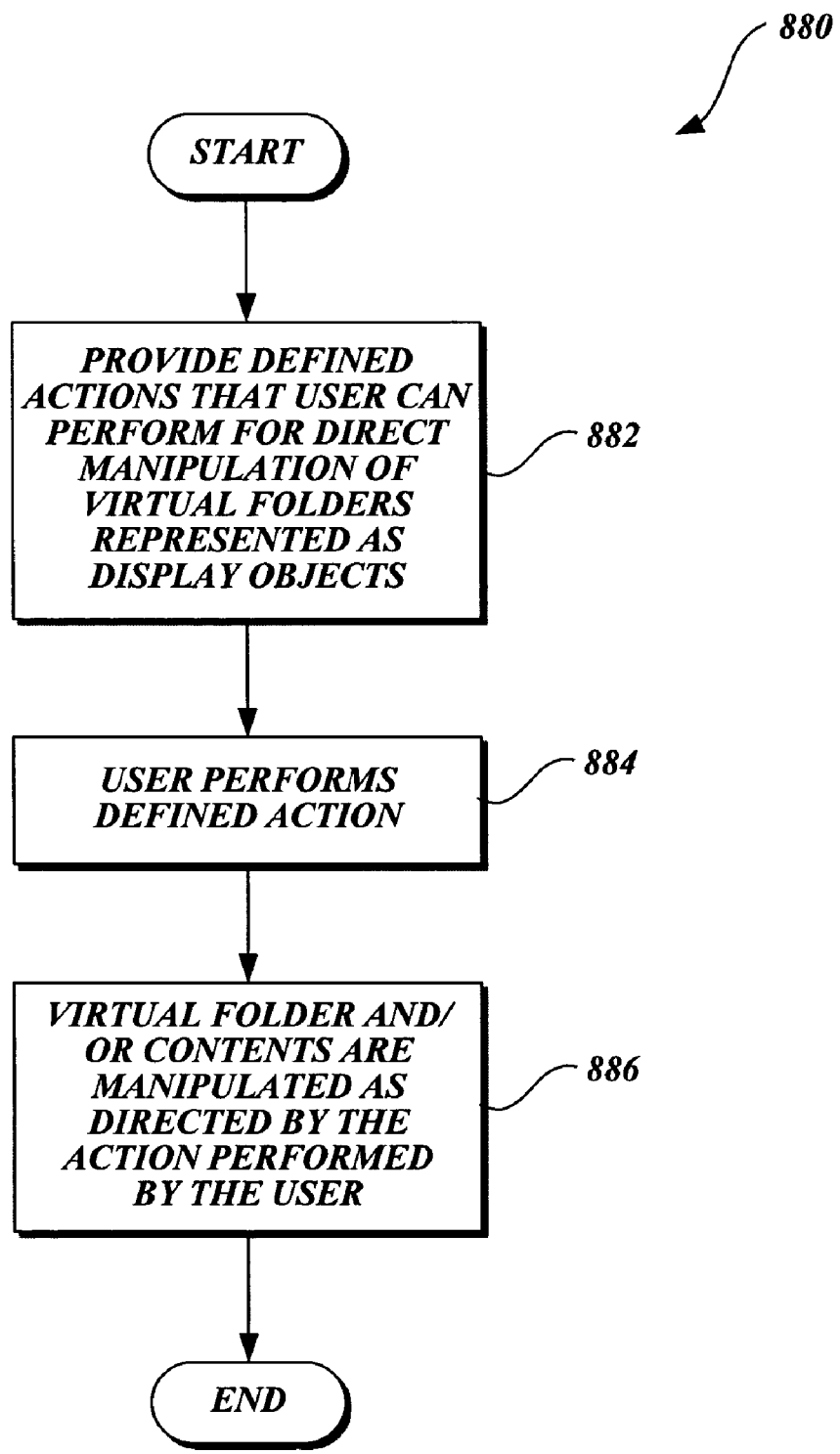
FIG. 19 is a flow diagram illustrative of a routine by which a user can directly manipulate virtual folders.

FIG. 19 is a flow diagram illustrative of a routine 880 by which a user can directly manipulate virtual folders. As will be described in more detail below, the mechanisms that are provided for manipulating the virtual folders are similar to those that are currently used for manipulating regular folders (e.g., clicking and dragging, copying, pasting, etc.). As shown in FIG. 19, at a block 882, the system provides defined actions that the user can perform for direct manipulation of the virtual folders that are represented as display objects. At a block 884, the user performs a defined action. As noted above, one example of this might be a user clicking and dragging a virtual folder to copy its contents to another virtual folder. At a block 886, the virtual folder and/or contents are manipulated as directed by the action performed by the user.

Figure 20:
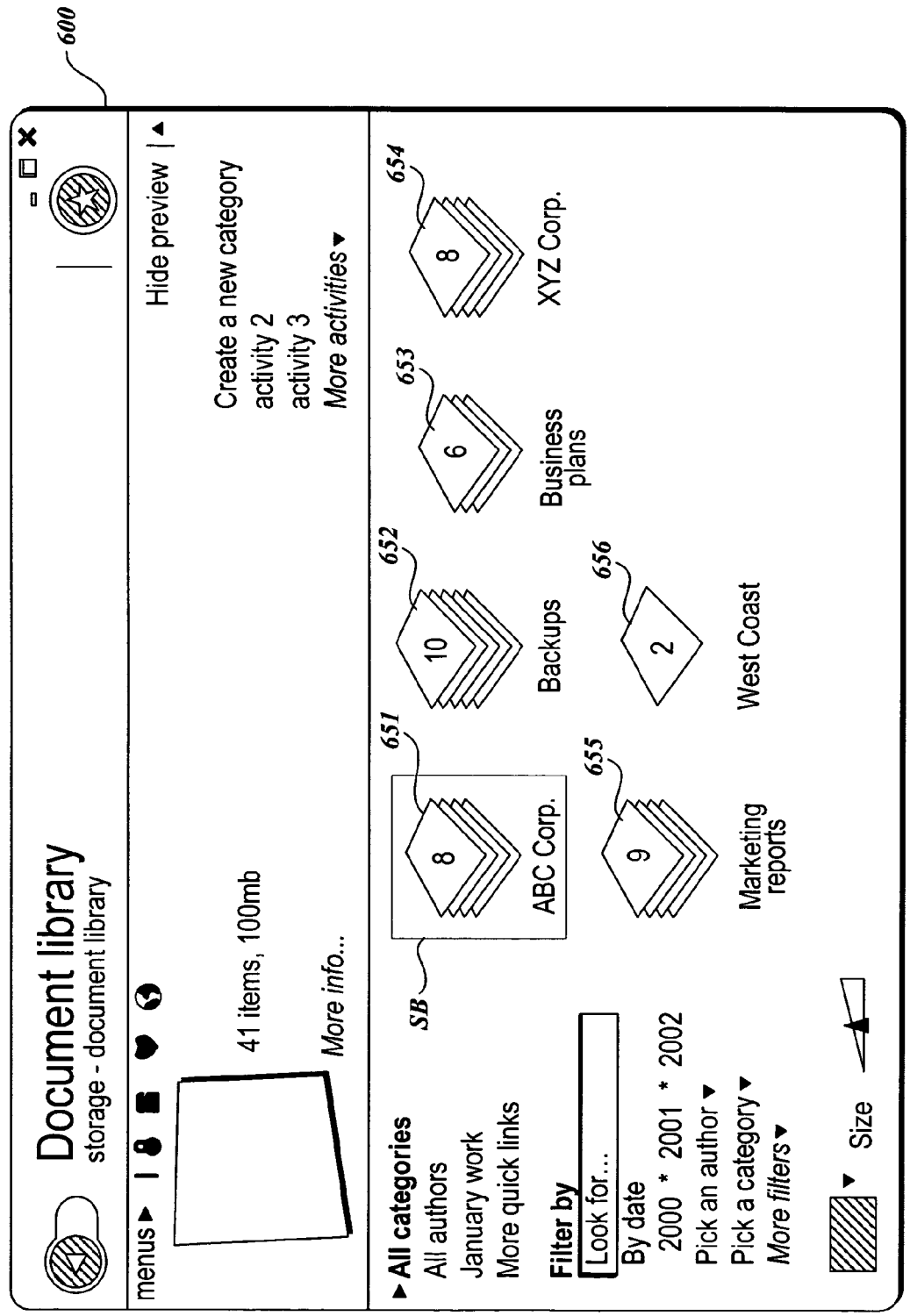
FIG. 20 is a diagram illustrative of a screen display in which a new "West Coast" stack has been added to the stacks of FIG. 10.

FIG. 20 is a diagram illustrative of a screen display in which a new West Coast stack 656 has been added to the stacks of FIG. 10. The West Coast stack 656 was formed by a user creating a new category of "West Coast." Upon its initial creation, the new West Coast stack 656 would be empty and have zero items. In the embodiment of FIG. 20, two items have been added to the West Coast stack 656. One method for adding items to a stack is to select a particular item, and either modify or add additional categories to the category metadata for the item, such as adding the category "West Coast" to two items as was done in the embodiment of FIG. 20. This process illustrates that the category data is a metadata property for an item that is a type of ad-hoc property. In other words, a property of this type does not have any implicit meaning, and can be assigned an arbitrary value by the user. For example, the category "property" can have any value whereas the "author" property should be the name of a person. As will be described in more detail below with reference to FIG. 21, items may also be clicked and dragged to be copied from other stacks to the West Coast stack 656 (in which case the categories of the items are automatically updated to include "West Coast"). In this regard, FIG. 20 shows that the selection box SB is around the ABC Corp. stack 651, in preparation for its contents being copied.

Figure 21:
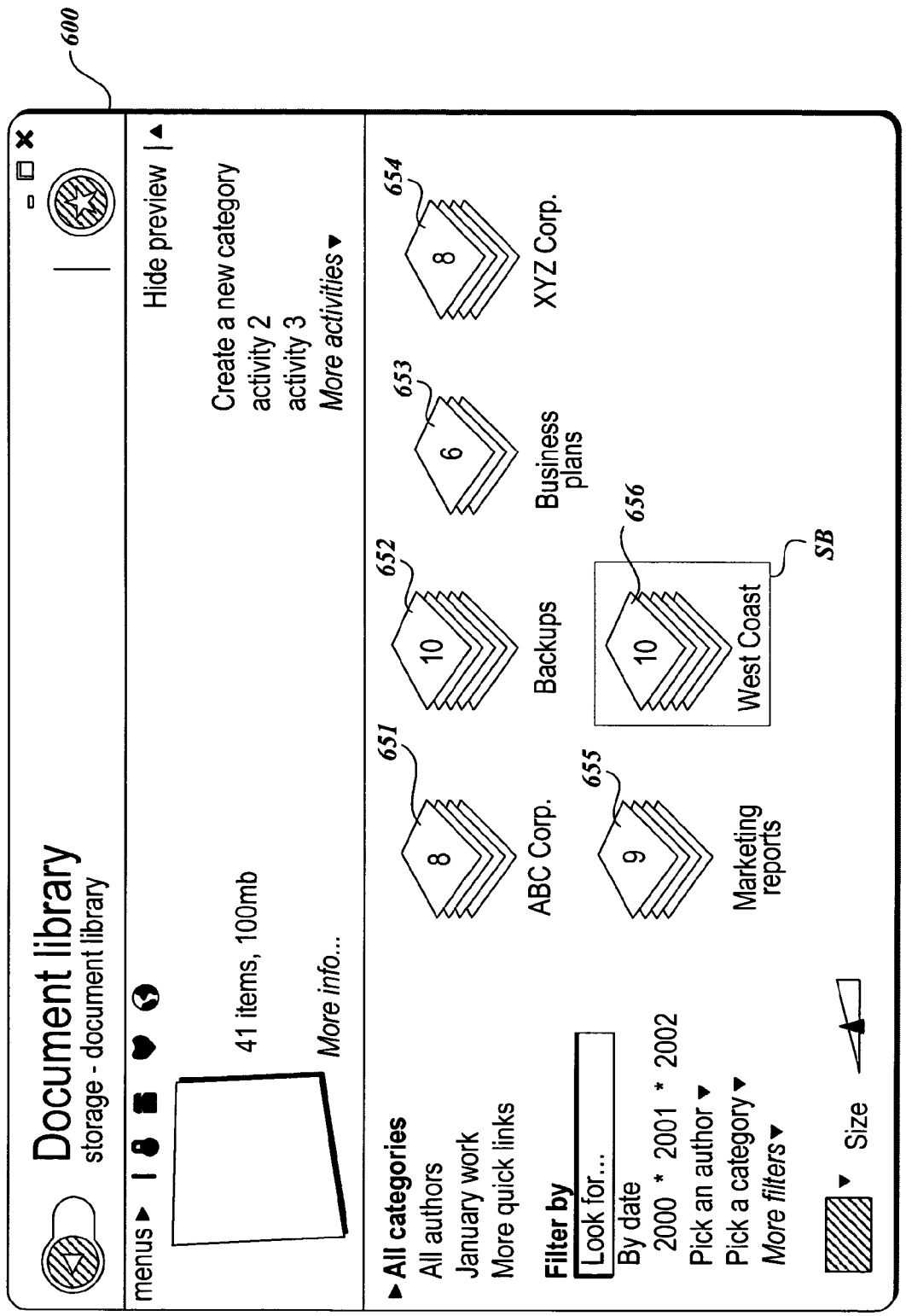
FIG. 21 is a diagram illustrative of a screen display in which direct manipulation is used for copying the files from the "ABC Corp." stack to the "West Coast" stack of FIG. 20.

FIG. 21 is a diagram illustrative of a screen display in which direct manipulation is used for copying the files from the ABC Corp. stack 651 to the West Coast stack 656. In other words, as shown in FIG. 20, the user selected the ABC Corp. stack 651, and then as shown in FIG. 21 the user has clicked and dragged the stack to be copied to the West Coast stack 656. Thus, the West Coast stack 656 which had two items in FIG. 20, is now shown to include a total of ten items, including the additional eight items from the ABC Corp. stack 651. When the items from the ABC Corp. stack 651 were copied to the West Coast stack 656, this was accomplished by modifying the category descriptions of the eight items to also include the "West Coast" category in addition to including the original "ABC Corp." category. This illustrates one type of direct manipulation that may be performed.

Another example of direct manipulation is right clicking an item and selecting delete. In one embodiment, when a deleting function is selected by a user, the user is queried whether the item should be deleted all together, or simply removed from the present virtual folder. If the item is just to be removed from a present virtual folder category stack as noted above, this can be accomplished by removing the desired category from the metadata for the item. In other words, if one of the items that had been copied from the ABC Corp. stack 651 to the West Coast stack 656 was then to be removed from the West Coast stack 656, this could be accomplished by modifying the category data for the particular file to no longer include the "West Coast" category.

Figure 22:
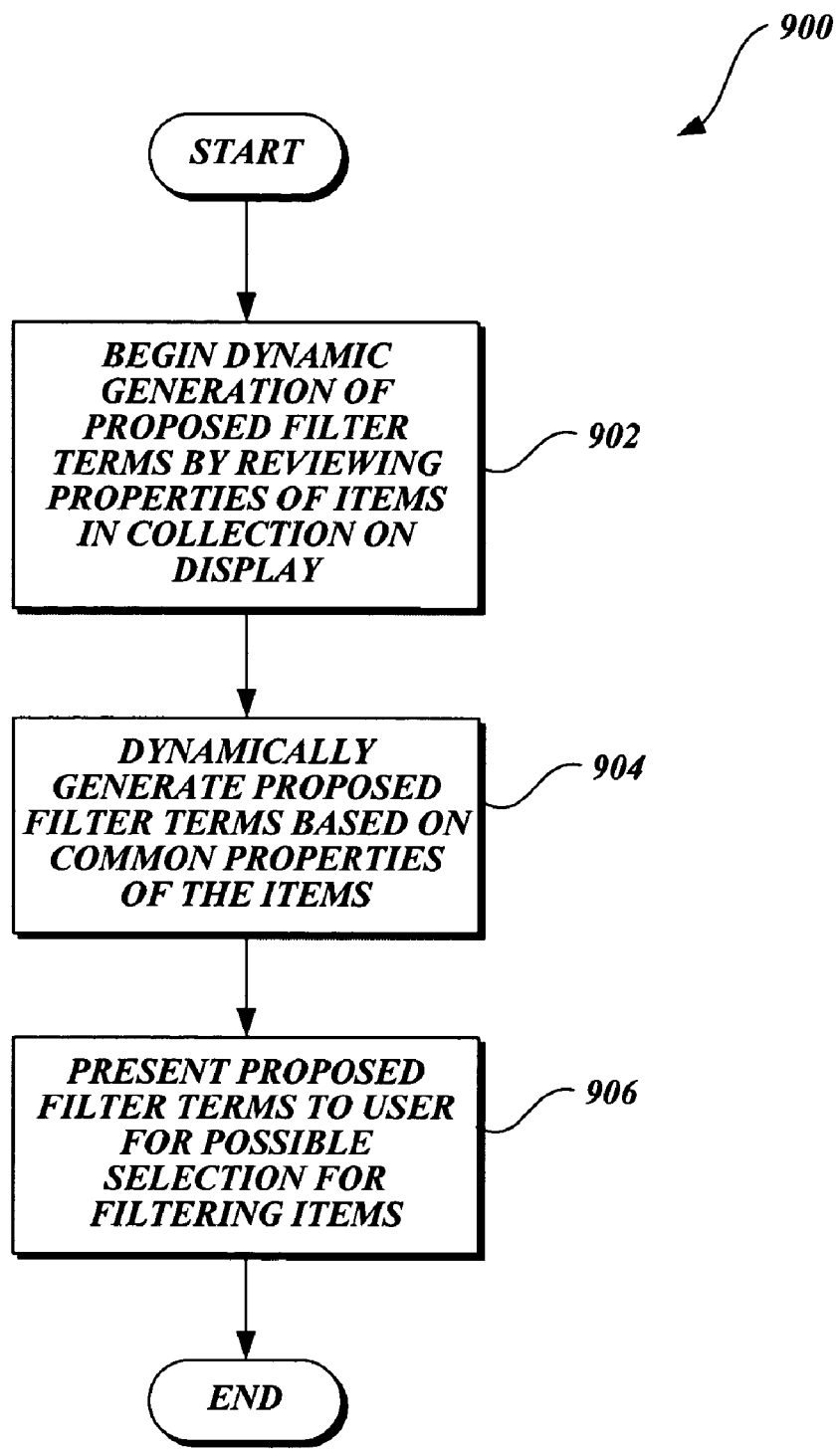
FIG. 22 is a flow diagram illustrative of a routine for the system dynamically generating new filter terms.

FIG. 22 is a flow diagram illustrative of a routine 900 for the system dynamically generating new filter terms. Filter terms are utilized for manipulating the virtual folders. The filtering terms are essentially utilized as a set of tools for narrowing down a set of items. In one embodiment, filters consist of metadata categories and their values (presented to the user in the user interface as clickable links or drop-down menus). The user clicks on a filter term in order to filter down the current results set of items on the display.

FIG. 22 illustrates how filters may be dynamically generated. As shown in FIG. 22, at a block 902, the properties (from the metadata) of the items in a collection on the present display are reviewed. In a block 904, proposed filter terms are dynamically generated based on common properties of the items. At a block 906, the proposed filter terms are presented to the user for possible selection for filtering items. As an example of this process, the system may review the properties of a set of items, and if the items generally have "Authors" as a property, the filter can provide a list of the authors to filter by. Then, by clicking on a particular Author, the items that don't have that Author are removed from the set on the display. This filtering process provides the user with a mechanism for narrowing the set of items on the display.

Figure 23:
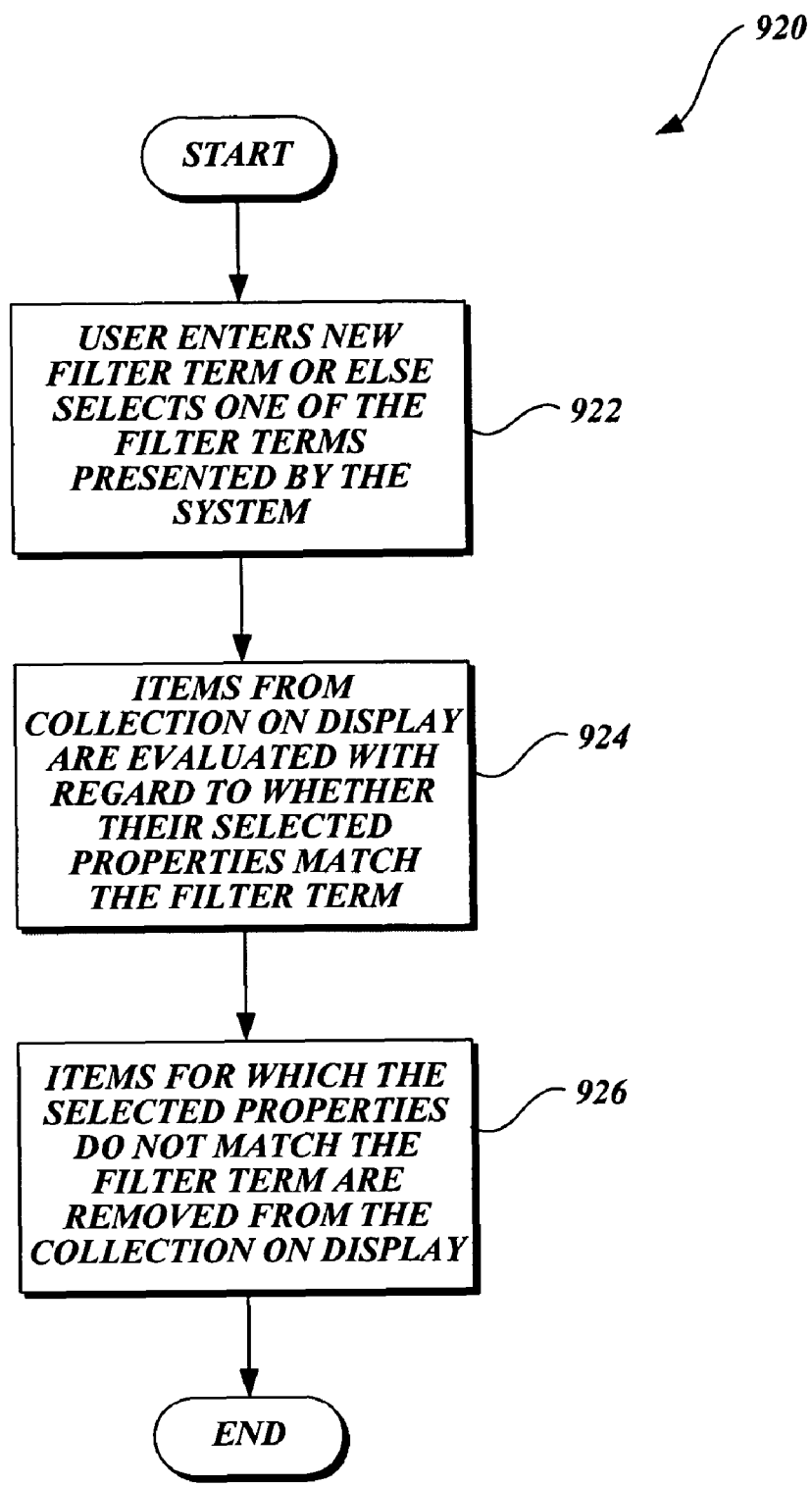
FIG. 23 is a flow diagram illustrative of a routine for the system filtering items based on the selection of a filter term.

FIG. 23 is a flow diagram illustrative of a routine 920 for the system filtering items based on the selection of a filter term. At a block 922, the user either enters a new filter term or else selects one of the filter terms that have been presented by the system. As noted above, the filter terms may be dynamically generated by the system, or they may be preset. At a block 924, the items from the collection on the display are evaluated with regard to whether their selected properties match the filter term. For example, if the filter term is for items that were authored by "Bob," then the items are evaluated in accordance with whether their author property includes "Bob". At block 926, the items for which the selected properties do not match the filter term are removed from the collection on the display.

Figure 24:
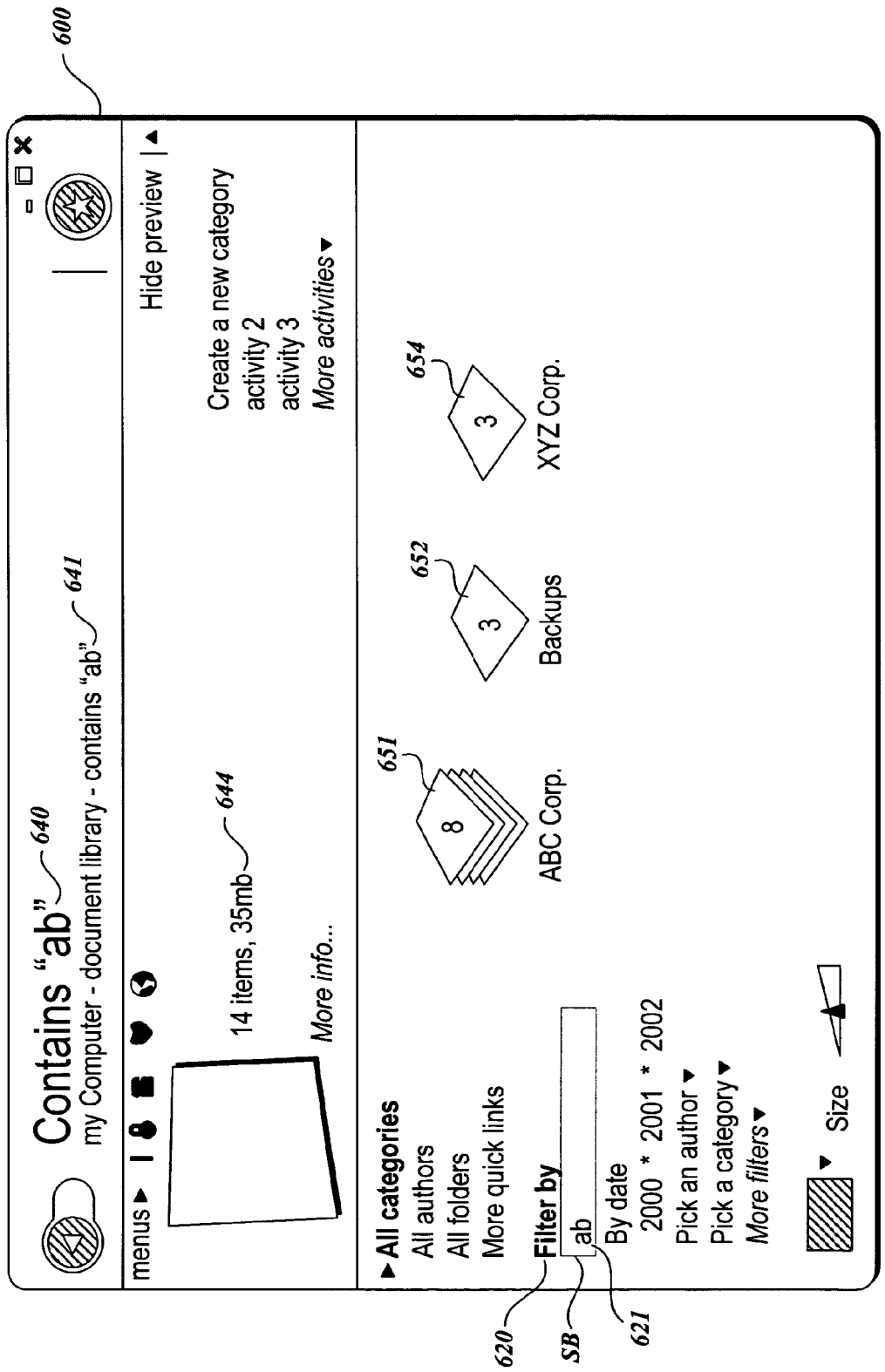
FIG. 24 is a diagram illustrative of a screen display in which the stacks of FIG. 10 have been filtered by the term "AB"

FIG. 24 is a diagram illustrative of a screen display in which the stacks of FIG. 10 have been filtered by the term "AB". As shown, in the filter area 621, the term "AB" has been typed by a user. The information lines 640 and 641 indicate that the items in the display are now those that have been filtered by the term "AB". As shown, the ABC Corp. stack 651 still contains eight items, while the Backups stack 652 now contains three items, and the XYZ Corp. stack 654 also contains three items. The information line 644 thus indicates that there are a total of 14 items, taking up a total of 35 MB of memory.

Figure 25:
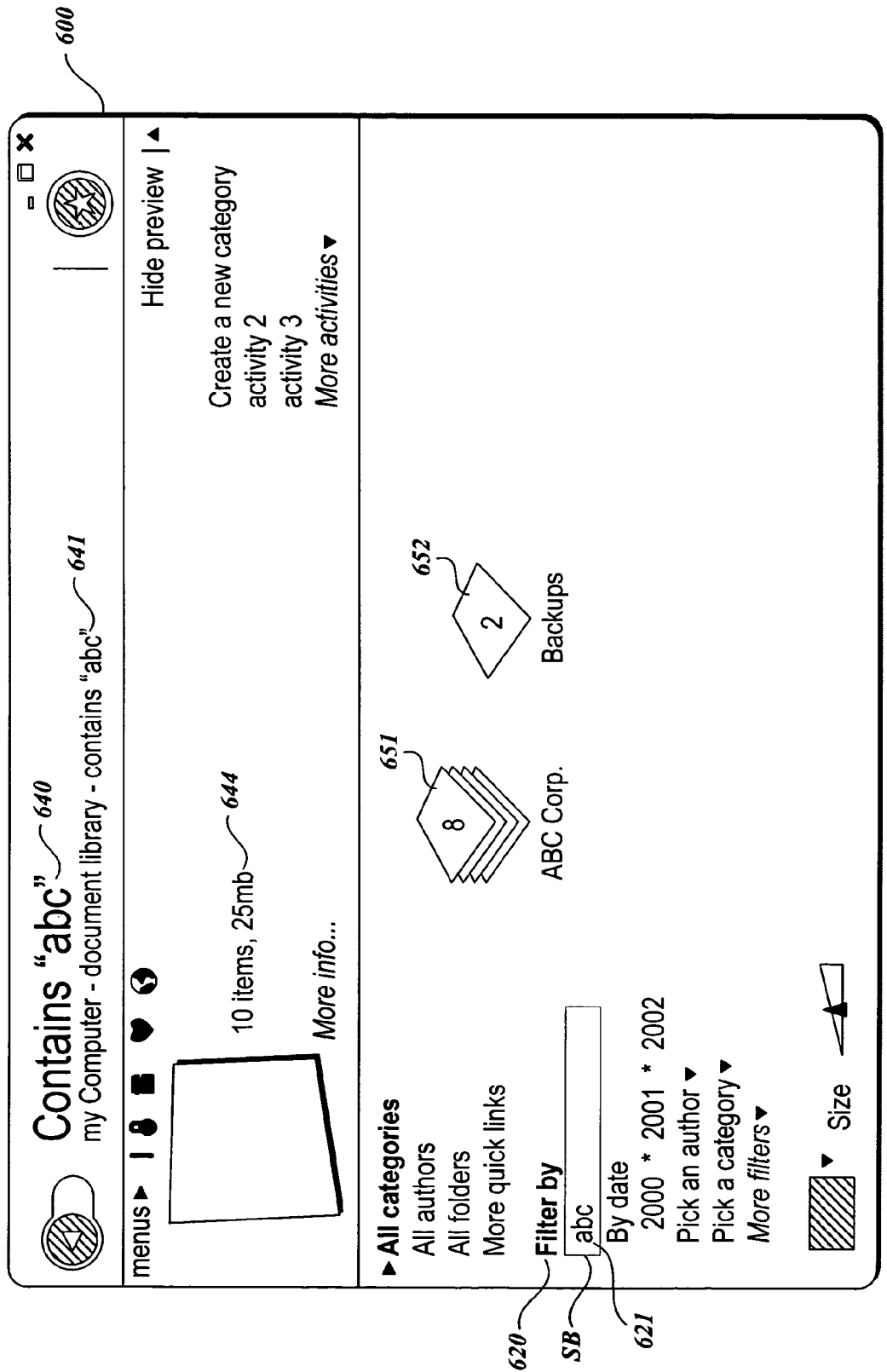
FIG. 25 is a diagram illustrative of a screen display in which the stacks of FIG. 10 have been filtered by the term "ABC"

FIG. 25 is a diagram illustrative of a screen display in which the stacks of FIG. 10 have been filtered by the term "ABC". With regard to the filter term "AB" of FIG. 24, the user has simply typed the additional letter "C" to make the total filter term "ABC". As shown in FIG. 25, the information lines 640 and 641 now indicate that the items on the display are those that contain the term "ABC". The ABC Corp. stack 651 is still shown to contain eight items, while the Backups stack 652 now contains only two items. The information line 644 now indicates that there are a total of 10 items in the stacks on the display, which take up a total of 25 MB of memory. FIGS. 24 and 25 thus provide examples of how a user may enter new filter terms, and how those filter terms are then used to filter the items that are shown on the display.

Figure 26:
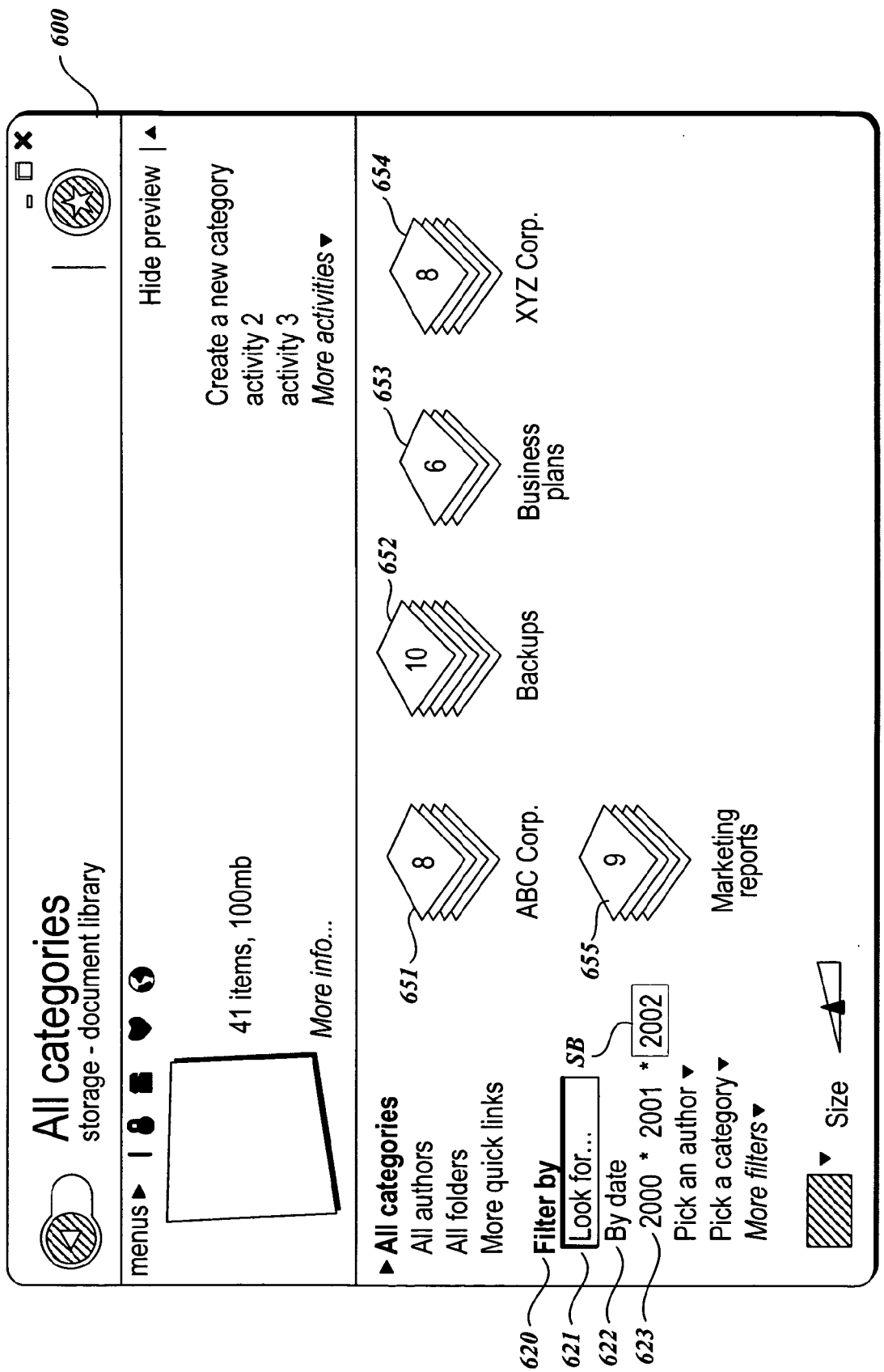
FIG. 26 is a diagram illustrative of a screen display in which the filter term "year 2002" is selected for the stacks of FIG. 10.

FIG. 26 is a diagram illustrative of a screen display in which the system provided filter term "year 2002" is selected. As noted above, under the by date indicator 622, the year selections 623 include the years 2000, 2001, or 2002. The selection box SB is shown to be around the year 2002, indicating that the user is selecting that as the desired filter term.

Figure 27:
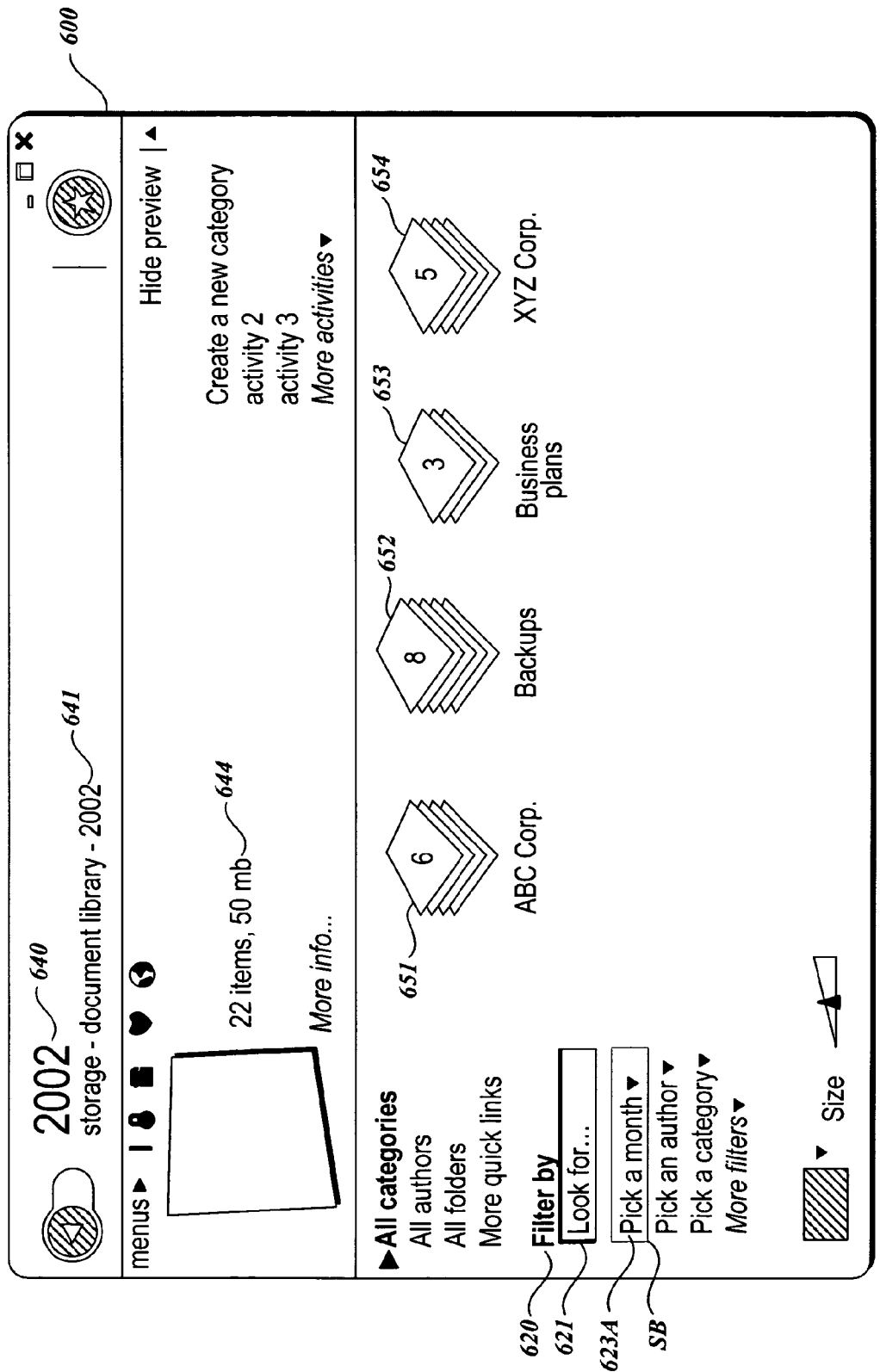
FIG. 27 is a diagram illustrative of a screen display in which the stacks of FIG. 10 have been filtered by the "year 2002" and the further selection of the filter term "month"

FIG. 27 is a diagram illustrative of a screen display in which the filter term "2002" has been applied. Also shown is the further selection of the "pick a month" selector 623A. As shown in FIG. 27, after applying the filter term "2002", the number of items in the stacks have been reduced. More specifically, the ABC Corp. stack 651 now contains six items, the Backups stack 652 now contains eight items, the Business Plans stack 653 now contains three items, and the XYZ Corp. stack 654 now contains five items. The information line 644 now indicates a total of 22 items, taking up a total of 50 MB of memory. The information lines 640 and 641 now indicate that the items shown on the display are those that have been filtered to contain the filter term "2002".

Figure 28:
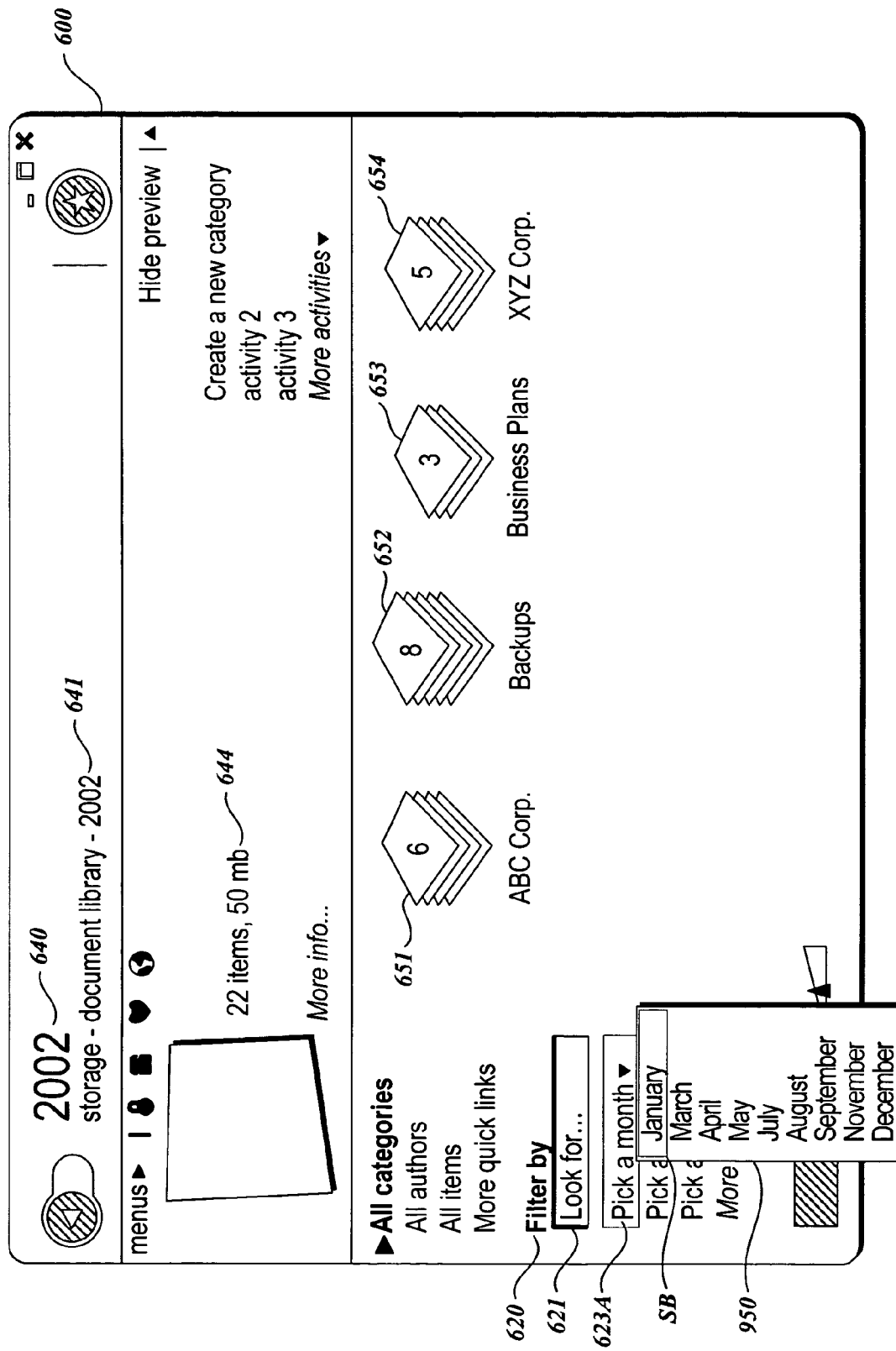
FIG. 28 is a diagram illustrative of a screen display in which a list is presented for selecting a month for filtering.

FIG. 28 is a diagram illustrative of a screen display in which a list is presented for selecting a month for filtering. A box 950 is provided which includes the list of the months. The box 950 has been provided on the display due to the user selecting the "pick a month" selector 623A. The selection box SB is shown to be around the month of January.

Figure 29:
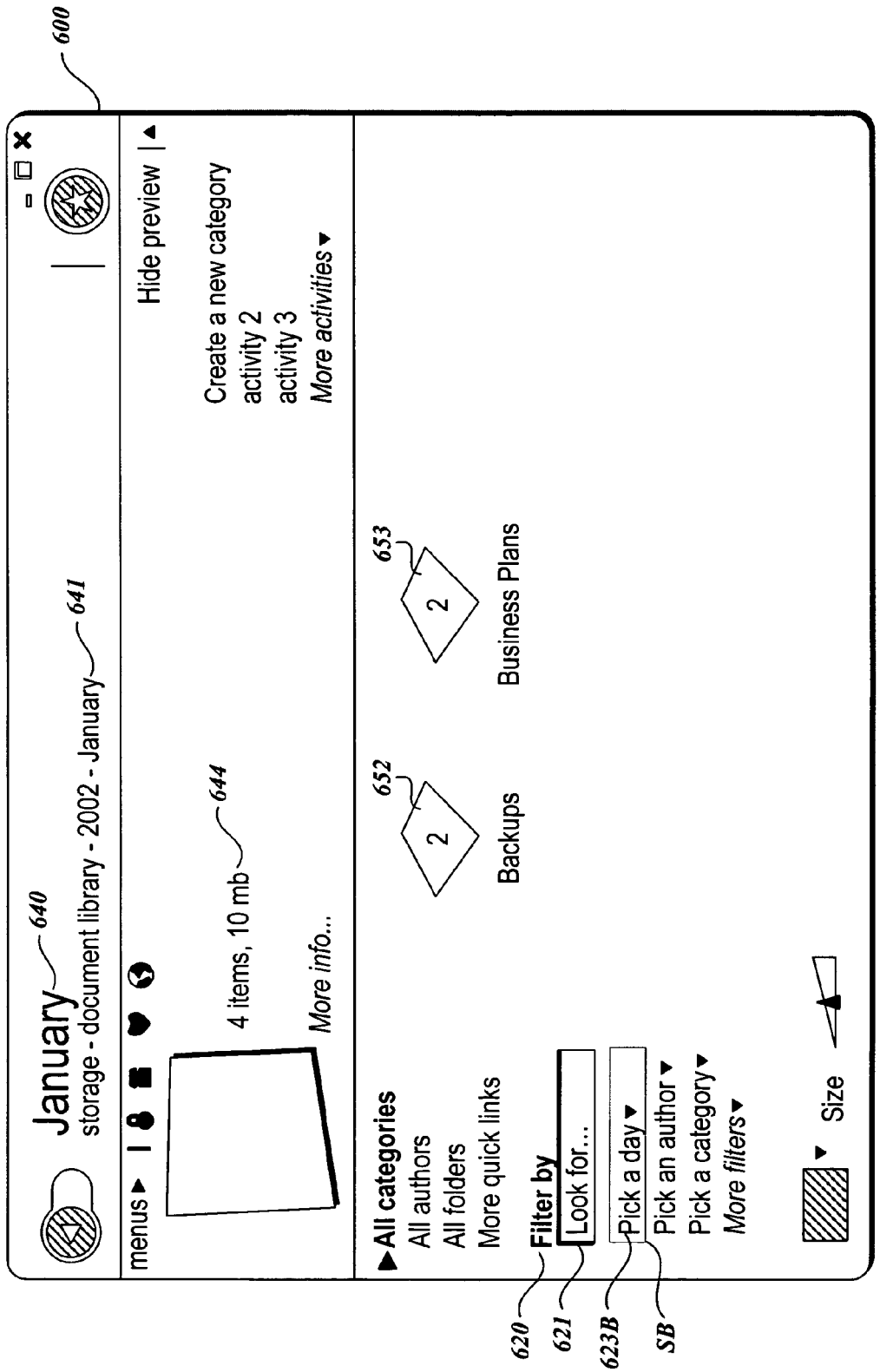
FIG. 29 is a diagram illustrative of a screen display wherein the stacks of FIG. 10 have been further filtered by the month of January, and further showing a filter term of "day"

FIG. 29 is a diagram illustrative of a screen display wherein the stacks of FIG. 28 have been further filtered by the month of January, and further showing a filter term of "day". As shown in FIG. 29, the information lines 640 and 641 now indicate that the items on the display are those that have been filtered by the term "January". The Backups stack 652 is now shown to contain two items, while the Business Plans stack 653 is also shown to contain two items. The information line 644 indicates that there are a total of four items on the display, which take up a total of 10 MB of memory. A "pick by day" selector 623B is provided, should the user wish to further filter the results to a specific day.

Figure 30:
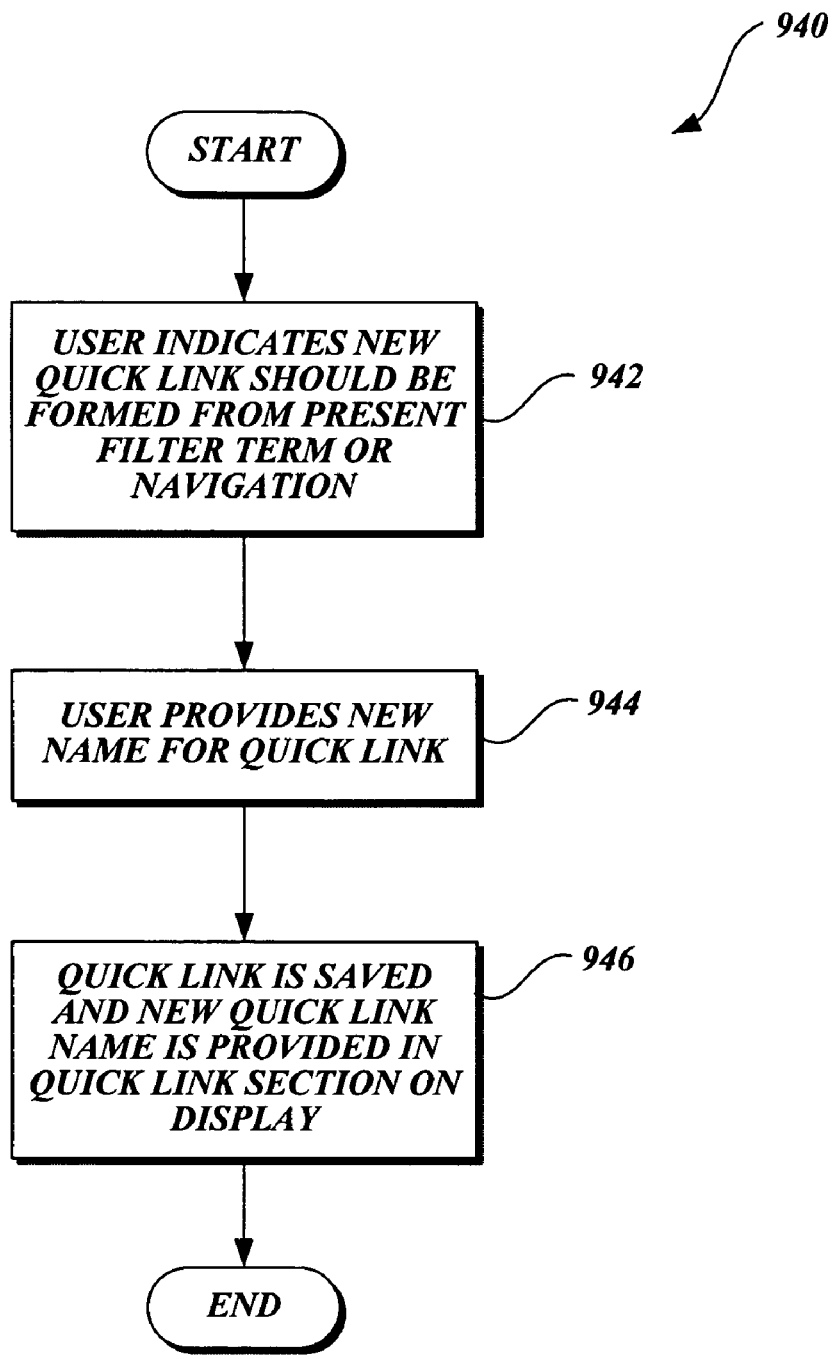
FIG. 30 is a flow diagram illustrative of a routine for creating a new quick link.

FIG. 30 is a flow diagram illustrative of a routine 940 for creating a new quick link. As will be described in more detail below, quick links are predefined links that can be clicked on by a user to create user selected views of the sets of items. In one embodiment, a quick link may be thought of as a type of pivot. Quick links provide a mechanism for retrieving a virtual folder. Clicking a quick link can take a user to a desired folder (in the same way that clicking a "favorites" may take a user to a Web site. The quick links can be predefined by the system, or can be set by a user. For example, clicking on "all authors" could return a view stacked by authors. Clicking on "all documents" may return a flat view for all of the documents for all of the storage areas. Users can also create their own quick links.

As shown in FIG. 30, at a block 942, a user makes a selection on the display to indicate that a new quick link should be formed from the present filter term or navigation. At a block 944, the user provides a new name for the new quick link. At a block 946, the new quick link is saved and the new quick link name is provided in the quick link section on the display.

Figure 31:
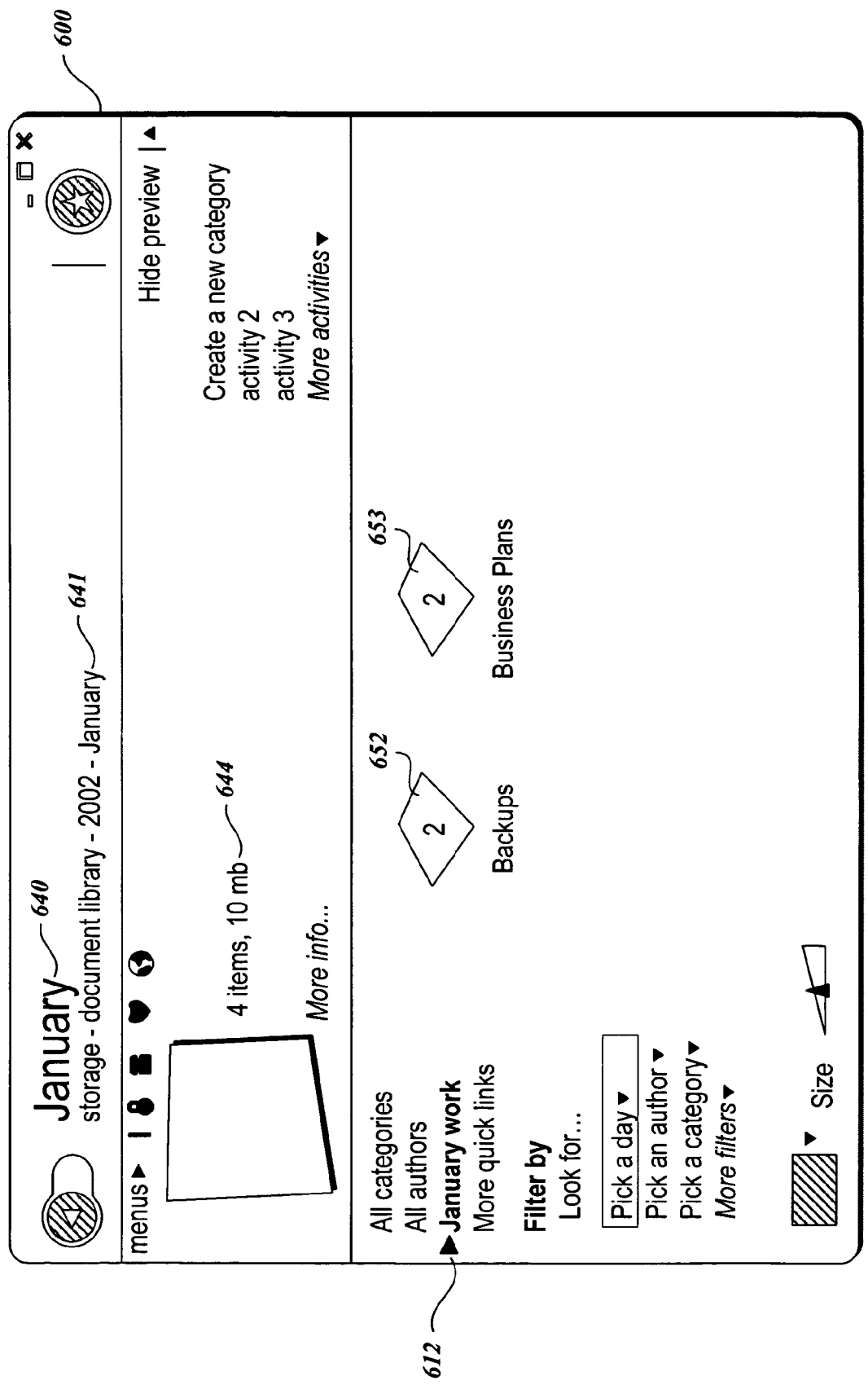
FIG. 31 is a diagram illustrative of a screen display for creating a new quick link called "January Work" based on the filtering of FIG. 29.

FIG. 31 is a diagram illustrative of a screen display for creating a new quick link called "January Work" based on the filtering of FIG. 29. As described above, in FIG. 29, the stacks have been filtered by the month of January. In FIG. 31, the user has indicated that the filtering of FIG. 29 should be saved as a new quick link, and has named the new quick link "January work". Thus, the new January work quick link 612 is shown in the quick links section of the display. With regard to forming new quick links, the user is generally provided with an option such as "save this collection as a quick link".

Figure 32:
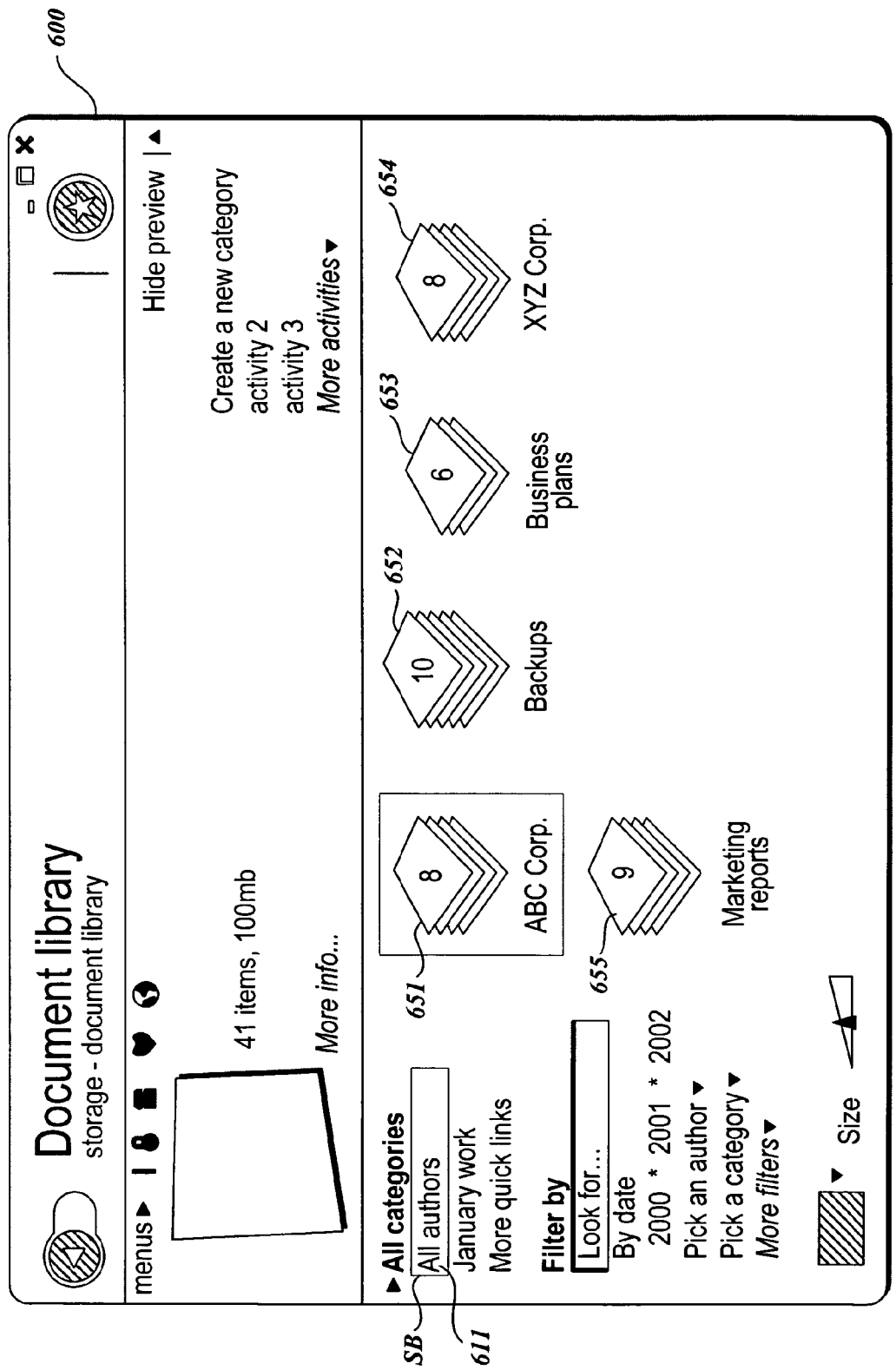
FIG. 32 is a diagram illustrative of a screen display in which a quick link of "All Authors" is selected.

FIG. 32 is a diagram illustrative of a screen display in which a quick link of "All Authors" is selected. As shown in FIG. 32, the selection box SB is shown around the All Authors selection 611. Other examples of collections that might be accessible by quick links include "all authors", "recent documents", "all documents I've shared", "all documents I've authored", "all documents not authored by me", "desktop", and "all types".

Figure 33:
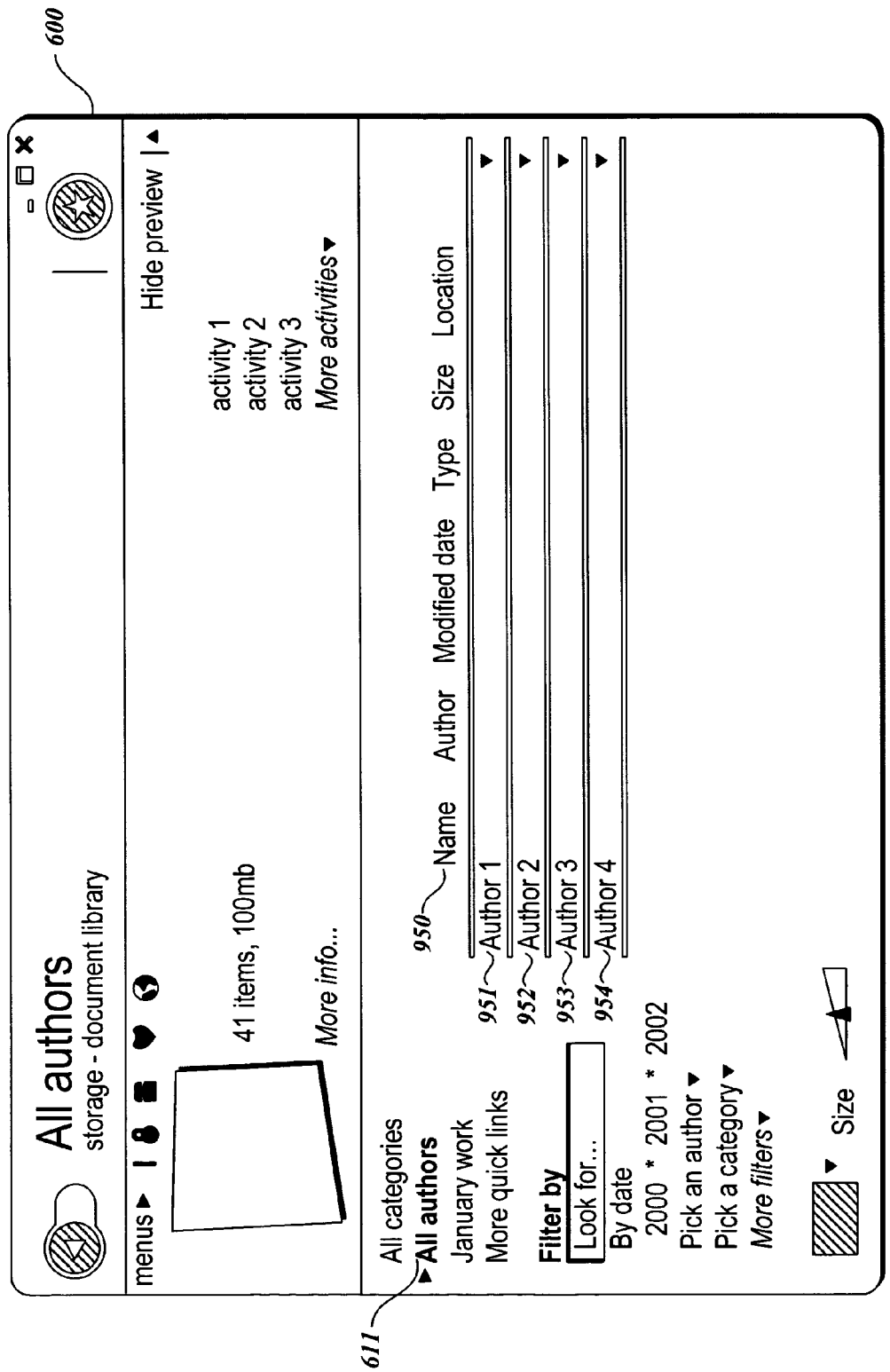
FIG. 33 is a diagram illustrative of a screen display in which a list of all of the authors of FIG. 32 is presented.

FIG. 33 is a diagram illustrative of a screen display in which a list of all of the authors of the items of FIG. 32 is presented. As shown in FIG. 33, an information line 950 is provided, which indicates columns for showing the name of an item, the author, the modified date, the type, the size, and the location of an item. A list of Authors 951-954 are shown, corresponding to Authors 1-4, respectively.

Figure 34:
FIG. 34 is a diagram illustrative of a screen display in which "Author 1" has been selected from the list of FIG. 33 and all of the Author 1's documents are shown.

FIG. 34 is a diagram illustrative of a screen display in which "Author 1" has been selected from the list of FIG. 33. The Author 1's documents include documents 951A and 951B, corresponding to documents 1 and 2, respectively. The document 951A is shown to have been authored by Author 1, was modified on 11 Jul. 2001, is a Microsoft Excel file, takes up 282 Kb of memory, and was obtained from the location \\server1\folder2. The document 951B is shown to have been authored by Author 1, was modified on 22 Dec. 2002, is a Microsoft Word file, takes up 206 kilobytes of memory, and is physically stored in the location My Documents\folder1. The locations of the documents 951A and 951B also illustrate that the virtual folders of the present invention may contain items from different physical locations, as will be described in more detail below.

Figure 35:
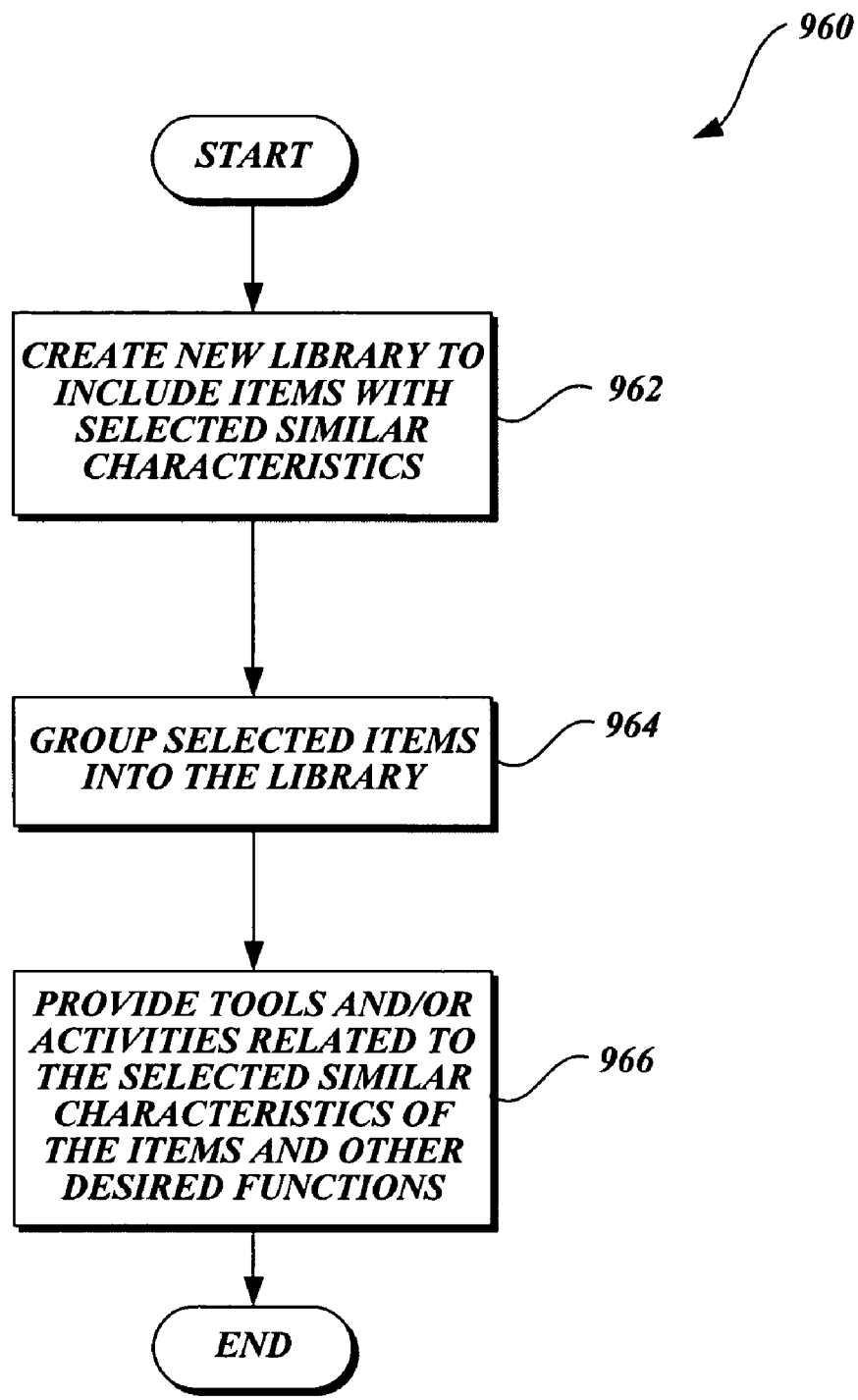
FIG. 35 is a flow diagram illustrative of a routine for creating a new library.

FIG. 35 is a flow diagram illustrative of a routine 960 for creating a new library. One example of a library is the documents library described above with reference to FIG. 10. In general, libraries consist of large groups of usable types of files that can be associated together. For example, photos may be one library, music may be another, and documents may be another. Libraries may provide tools and activities that are related to the particular types of items. For example, in the photo library, there may be tools and filters that relate to manipulating photos, such as for creating slide shows or sharing pictures. As shown in FIG. 35, at a block 962, a new library is created which is to include items with selected characteristics. At a block 964, the selected items are grouped into the library. At a block 966, the tools and/or activities related to the selected characteristics of the items or to other desired functions are provided.

Figure 36:
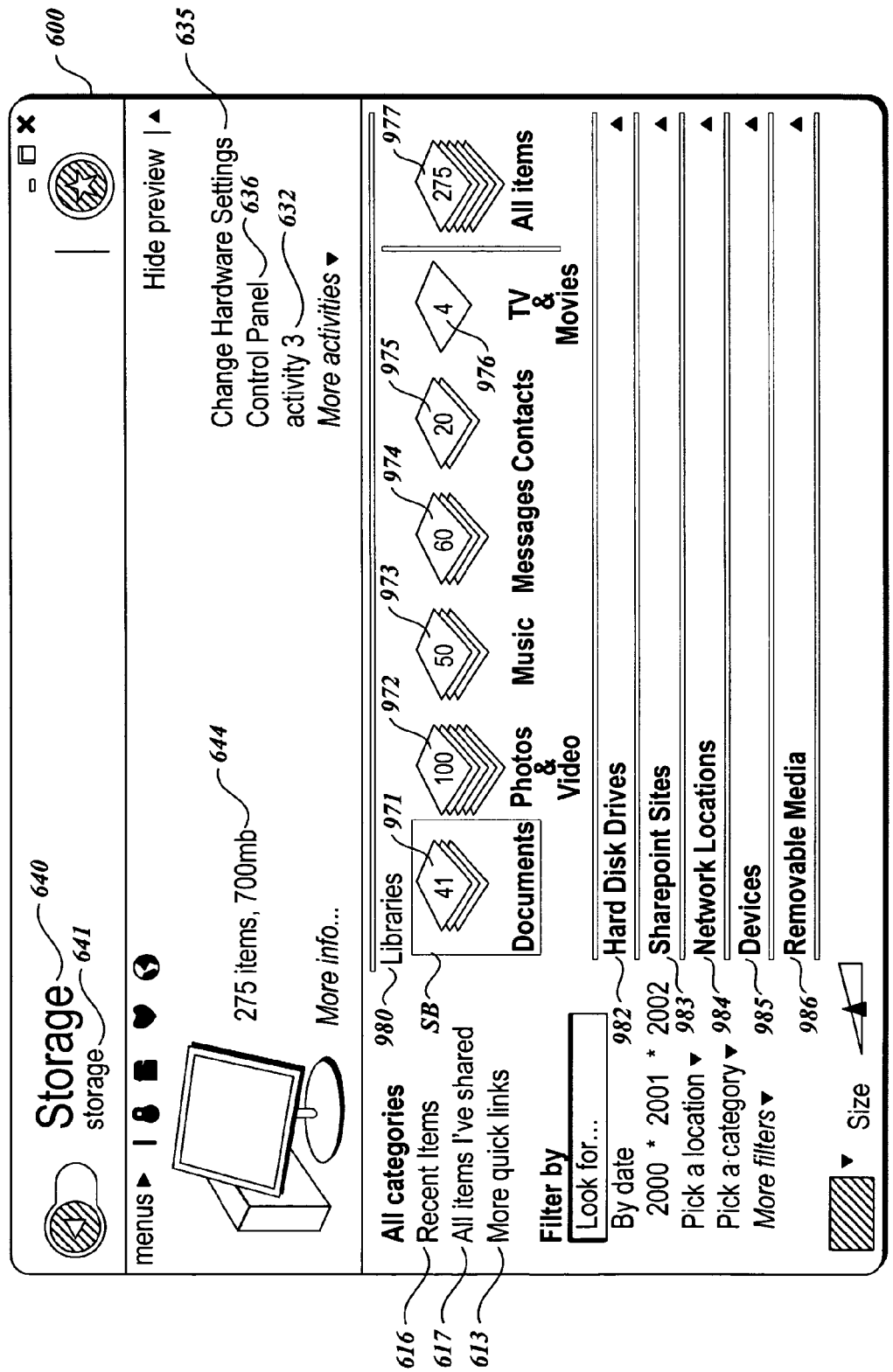
FIG. 36 is a diagram illustrative of a screen display in which a collection of various available libraries are shown.

FIG. 36 is a diagram illustrative of a screen display in which a collection of available libraries are shown. As shown in FIG. 36, the libraries include a documents library 971, a photos and video library 972, a music library 973, a messages library 974, a contacts library 975, and a TV and movies library 976, as well as an all items library 977. The all items library 977 is shown to include 275 items, which is the total number of items from all of the other libraries combined. The information line 644 indicates a total of 275 items, which take up a total of 700 MB of memory. It should be noted that the documents library 971 is the library that was described above with respect to FIG. 10.

Figure 37:
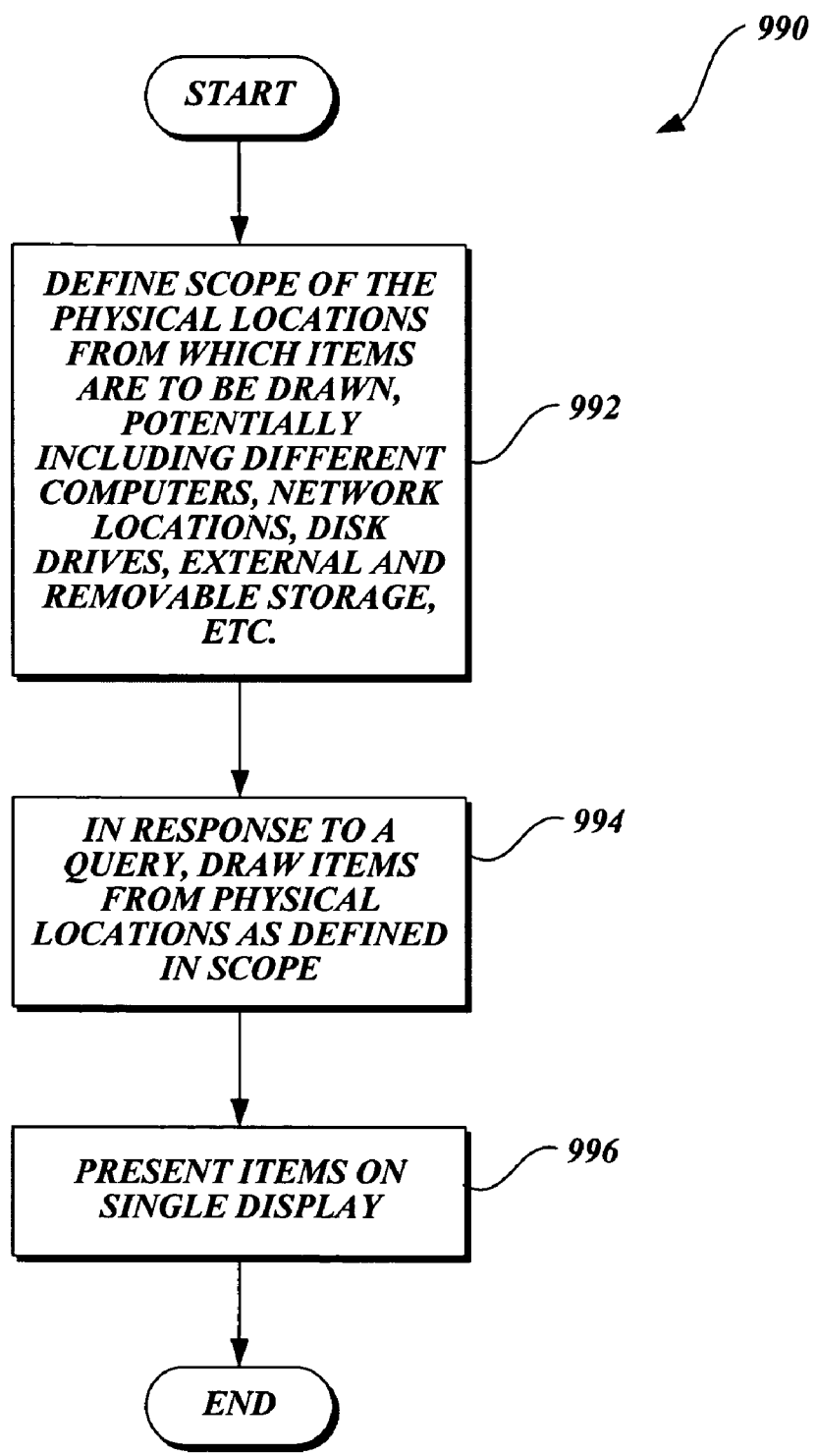
FIG. 37 is a flow diagram illustrative of a routine for defining the scope of a virtual folder collection.

FIG. 37 is a flow diagram illustrative of a routine 990 for defining the scope of a virtual folder collection. As will be described in more detail below, a virtual folder system is able to represent items from multiple physical locations (e.g., different hard drives, different computers, different networks locations, etc.) so that to a user, all of the items are readily accessible. For example, a user can be presented with music files from multiple physical locations on a single display, and manipulate the files all at once.

As shown in FIG. 37, at a block 992, a scope is defined for the physical locations from which items are to be drawn. At a block 994, in response to a query, the items are drawn from the physical locations as defined in the scope. At a block 996, all of the items drawn by the query are presented on a single display.

Figure 38:
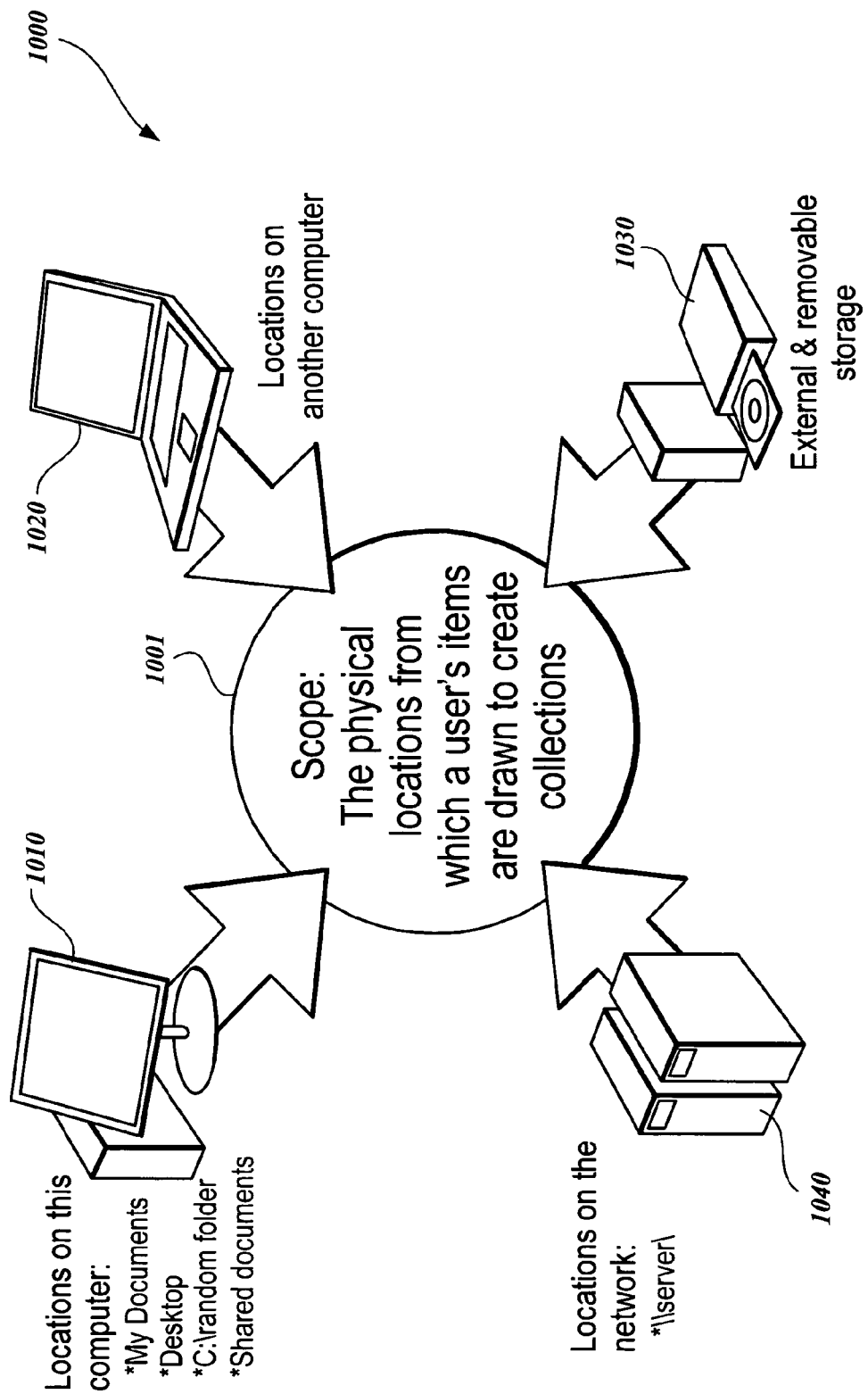
FIG. 38 is a block diagram illustrative of the various sources which may form the scope of a virtual folder collection.

FIG. 38 is a block diagram illustrative of the various sources which may form the scope of a virtual folder collection. As shown in FIG. 38, the system 1000 may include a present computer 1010, an additional computer 1020, external and removable storage 1030, and locations on a network 1040. The overall scope 1001 is described as including all of the physical locations from which a user's items are drawn to create collections. The scope may be set and modified by a user. As noted above, other figures have illustrated that items may come from different physical locations, such as FIG. 34 showing different documents coming from a server and a My Documents folder on a present computer, and in FIG. 18 showing physical folders that are physically stored in multiple locations.

Figure 39:
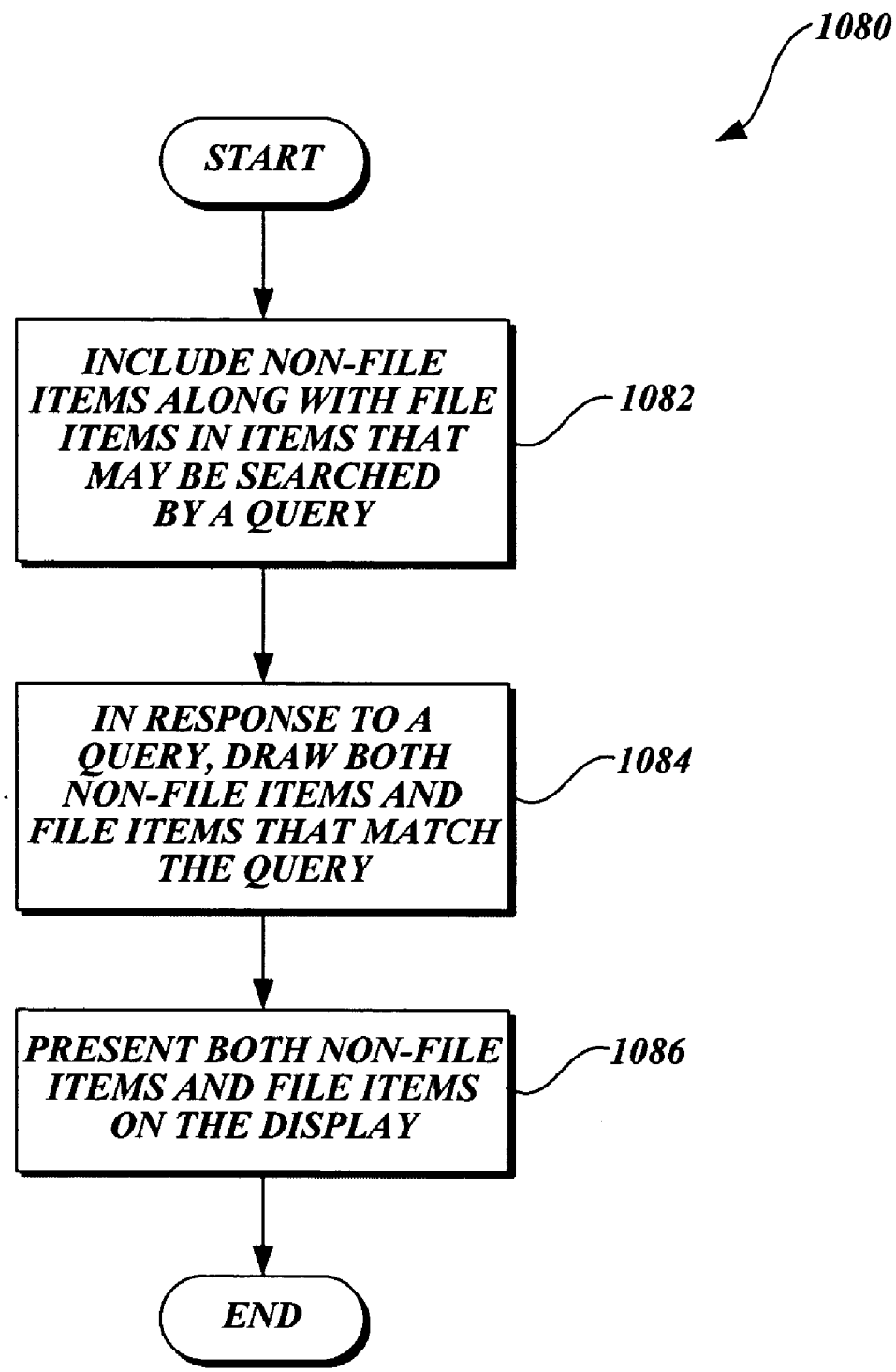
FIG. 39 is a flow diagram illustrative of a routine for including non-file items in a virtual folder collection.

FIG. 39 is a flow diagram illustrative of a routine 1080 for including non-file items in a virtual folder collection. Non-file items are contrasted with file items that are typically located in a physical file storage. Examples of non-file items would be things like e-mails, or contacts. As shown in FIG. 39, at a block 1082 a database is utilized to include non-file items along with file items that may be searched by a query. At a block 1084, in response to a query, both non-file items and file items are drawn to match the query. At a block 1086, both the non-file items and the file items that matched the query are presented on the display.

Figure 40:
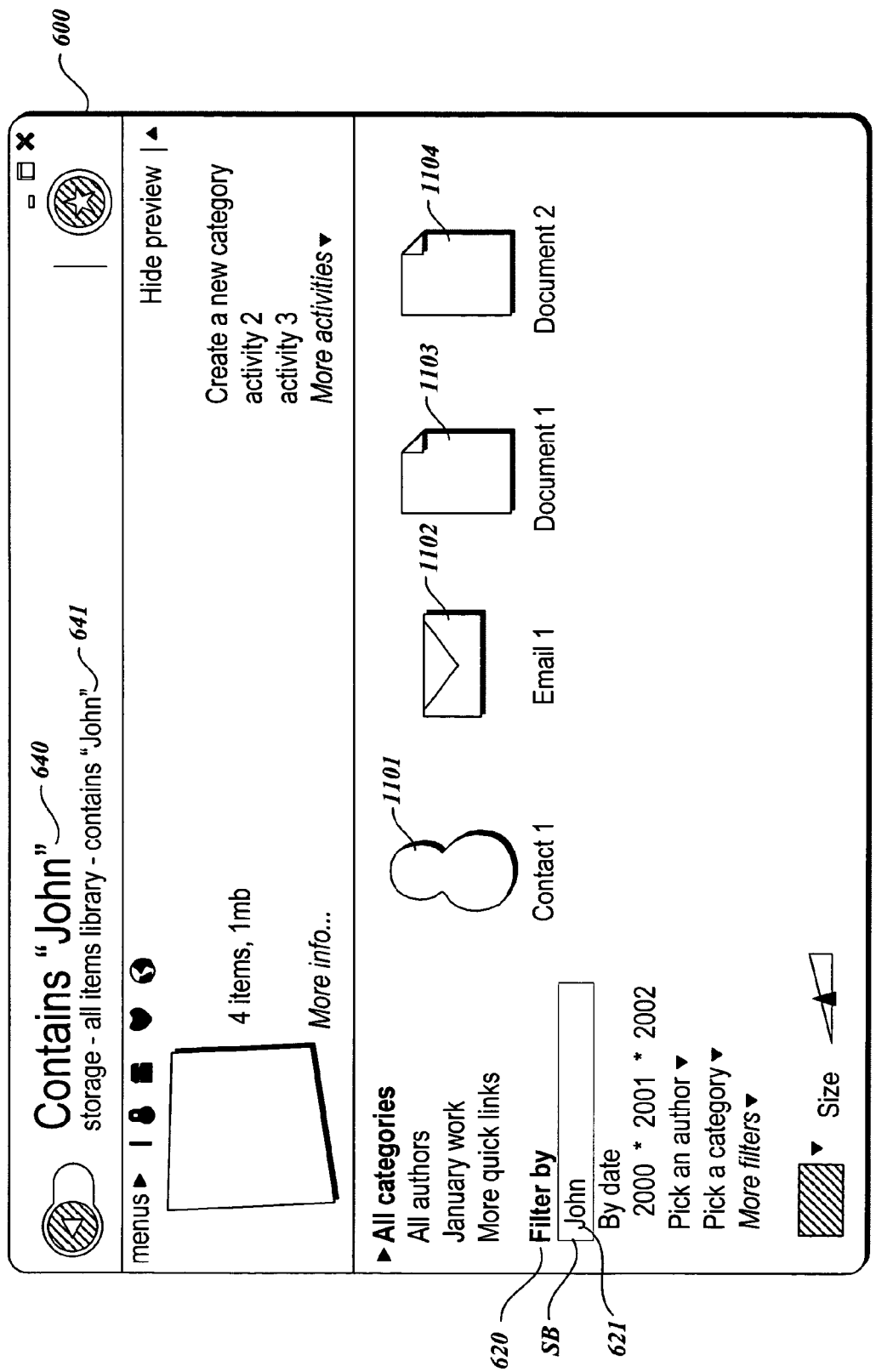
FIG. 40 is a diagram illustrative of a screen display showing various non-file items included in a virtual folder.

FIG. 40 is a diagram illustrative of a screen display showing various non-file items. As shown in FIG. 40, the items have been filtered to those that include "John". The items are shown to include a contact item 1101, an e-mail item 1102, and document items 1103 and 1104. The contact item 1101 and e-mail item 1102 are non-file items. The present system allows such non-file items to be included with regular file items, such that they can be organized and manipulated as desired by a user. As was described above with respect to FIG. 2, such non-file items may be contained entirely within the relational database 230, which otherwise includes information about the properties of files.

As will be discussed in more detail below, the present invention provides the ability to share out virtual folders which may be static or dynamic. The sharing of static and dynamic lists allows a user to share selected items. A sharee is granted permission to the items in the list, and as the list is changed, the permissions are updated so that the sharee continues to have access to the current items of the list.

Figure 41:
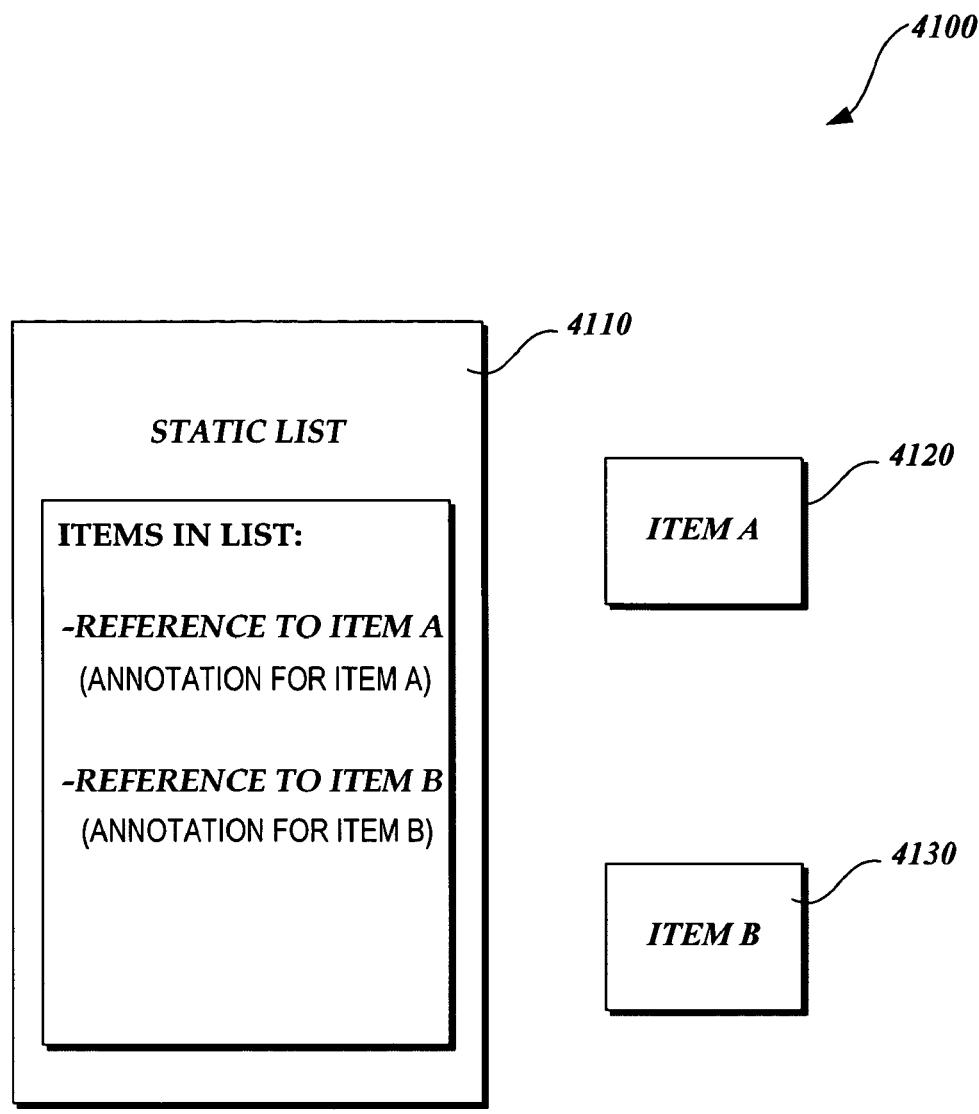
FIG. 41 is a block diagram illustrative of a memory system including a static list and a set of referenced items.

FIG. 41 is a block diagram illustrative of a memory system 4100 including a static list and a set of referenced items. The memory system 4100 includes a memory location 4110 which holds a static list, a memory location 4120 which holds an Item A, and a memory location 4130 which holds an Item B. The static list at the memory location 4110 includes a reference to the Item A, as well as an annotation for the Item A, and a reference to the Item B, as well as an annotation for the Item B. These annotations are not part of the actual items, but belong to the list. Some examples of types of static lists are a shopping list, a music play list, and a slide show of pictures.

Figure 42:
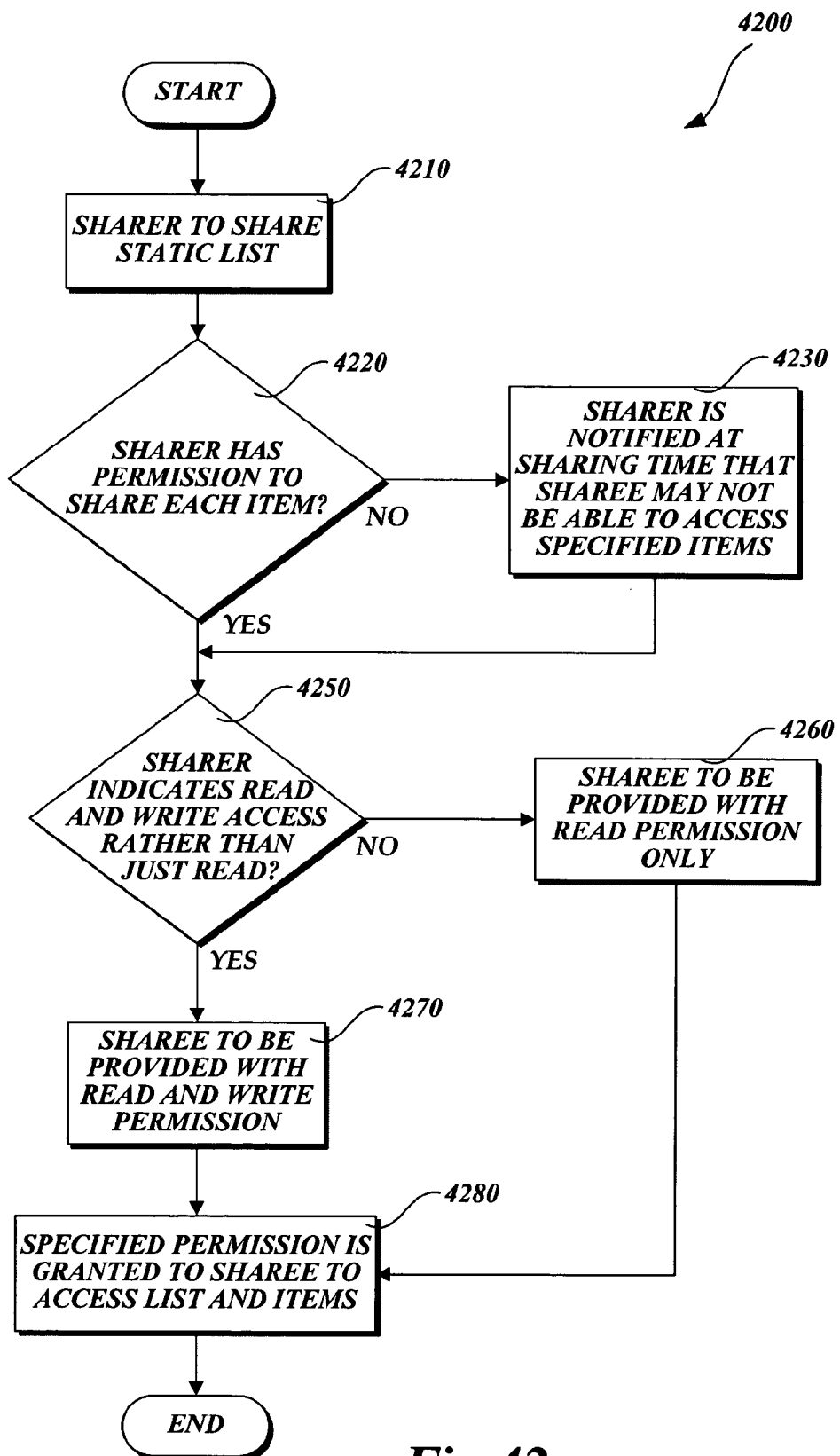
FIG. 42 is a flow diagram illustrative of a routine for sharing a static list.

FIG. 42 is a flow diagram illustrative of a routine 4200 for sharing a static list. At a block 4210, the sharer indicates that the static list should be shared. At a decision block 4220, a determination is made as to whether the sharer has permission to share each item. If some of the items cannot be shared, then the routine continues to a block 4230, where the sharer is notified at the sharing time that the sharee may not be able to access the noted items. If each of the items can be shared, then the routine continues to a decision block 4250.

In the process of determining whether the sharer has permission to share each item, in one embodiment the list itself is the first item that the permission is determined for. In other words, the first step is to determine whether the sharer has permission to share the list itself. If the sharer does not have permission to share the list, then the sharer is notified that they do not have permission to share the list and the routine ends. If the sharer does have permission to share the list, then a determination is made for each of the items that are referenced by the list as to whether the sharer has permission to share each of the items. If the sharer does not have permission to share a particular item, then the sharer is notified that that item can not be shared. At the end of the process, for the set of items that the sharer does have permission to share, the routine continues to block 4250.

At decision block 4250, a determination is made as to whether the sharer has indicated that the sharee should be provided with read and write access as opposed to just read access. If the sharer indicated that read and write access should not be provided, then the routine continues to a block 4260 where the sharee is provided with read permission only. If the sharer indicated that the sharee should have read and write access, then the routine continues to a block 4270, where the sharee is provided with read and write permission. At block 4280, the designated access is granted to the sharee to the static list itself, as well as any items that are referenced in the static list. The sharee is then able to remotely access the static list and its referenced items from the sharer's computer.

Figure 43:
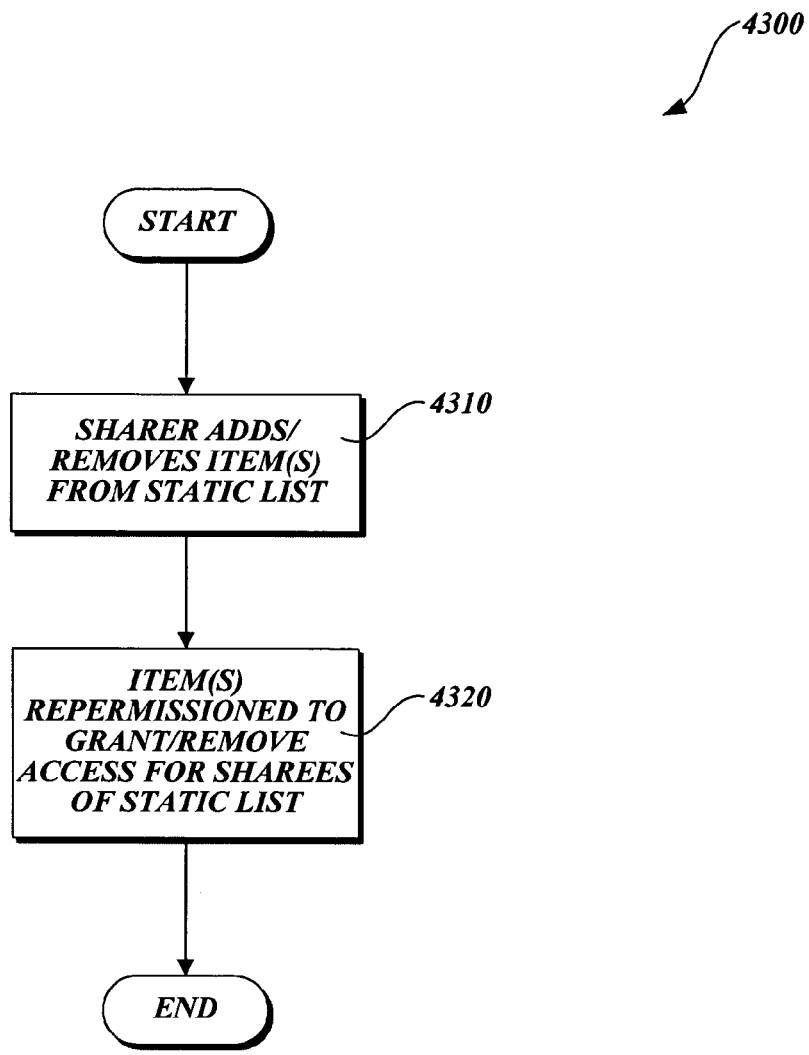
FIG. 43 is a flow diagram illustrative of a routine for re-permissioning items that are removed/added from a static list.

FIG. 43 is a flow diagram illustrative of a routine 4300 for re-permissioning items that are added/removed from a static list. At a block 4310, the sharer adds or removes items from the static list. At a block 4320, the items are re-permissioned to grant or remove access for sharees of the static list. As an example, if the sharer removed a picture from the list, then the sharee would also lose permission to this picture. Alternatively, if the sharer added a song to a play list, the sharee would be granted access to this song. In an alternate embodiment, the items may also be dynamically permissioned as they come and go from the static list, since the actual definition of the static list lives in the database and can be monitored as it changes.

Figure 44:
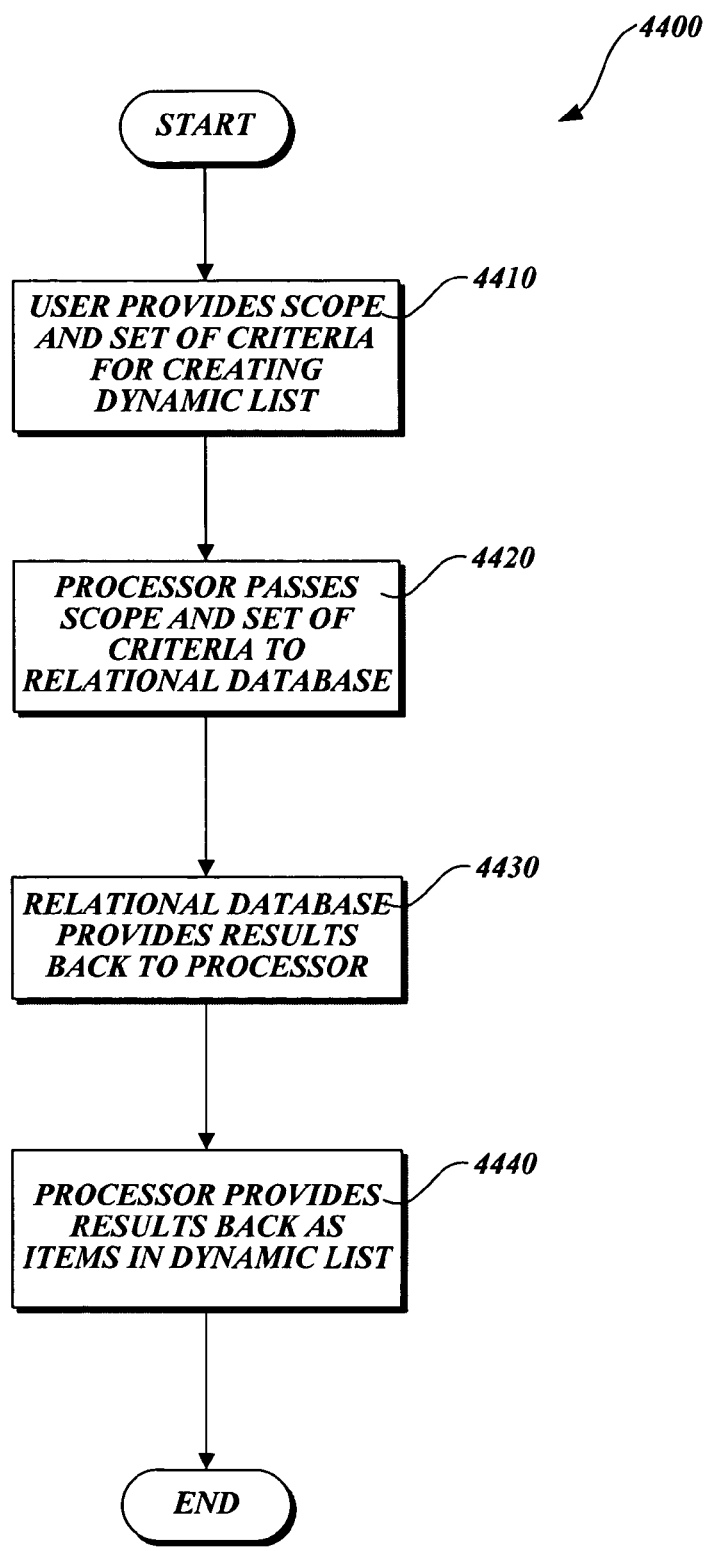
FIG. 44 is a flow diagram illustrative of a routine for creating a dynamic list.

FIG. 44 is a flow diagram illustrative of a routine 4400 for creating a dynamic list. At a block 4410, a user provides a scope and a set of criteria for creating the dynamic list. At a block 4420, the processor passes the scope and set of criteria to a relational database. At a block 4430, the relational database provides results back to the processor. At a block 4440, the processor provides results back as items in the dynamic list.

As described in more detail above with respect to FIG. 10, certain virtual folders such as libraries rely on dynamic lists for their creation. For example, a user would typically go to their document library to find their documents. The document library is a type of dynamic list. The scope for the list may be set to be the data storage that is available on a local machine, or as another example may include data stored on all of the machines on a network.

Figure 45:
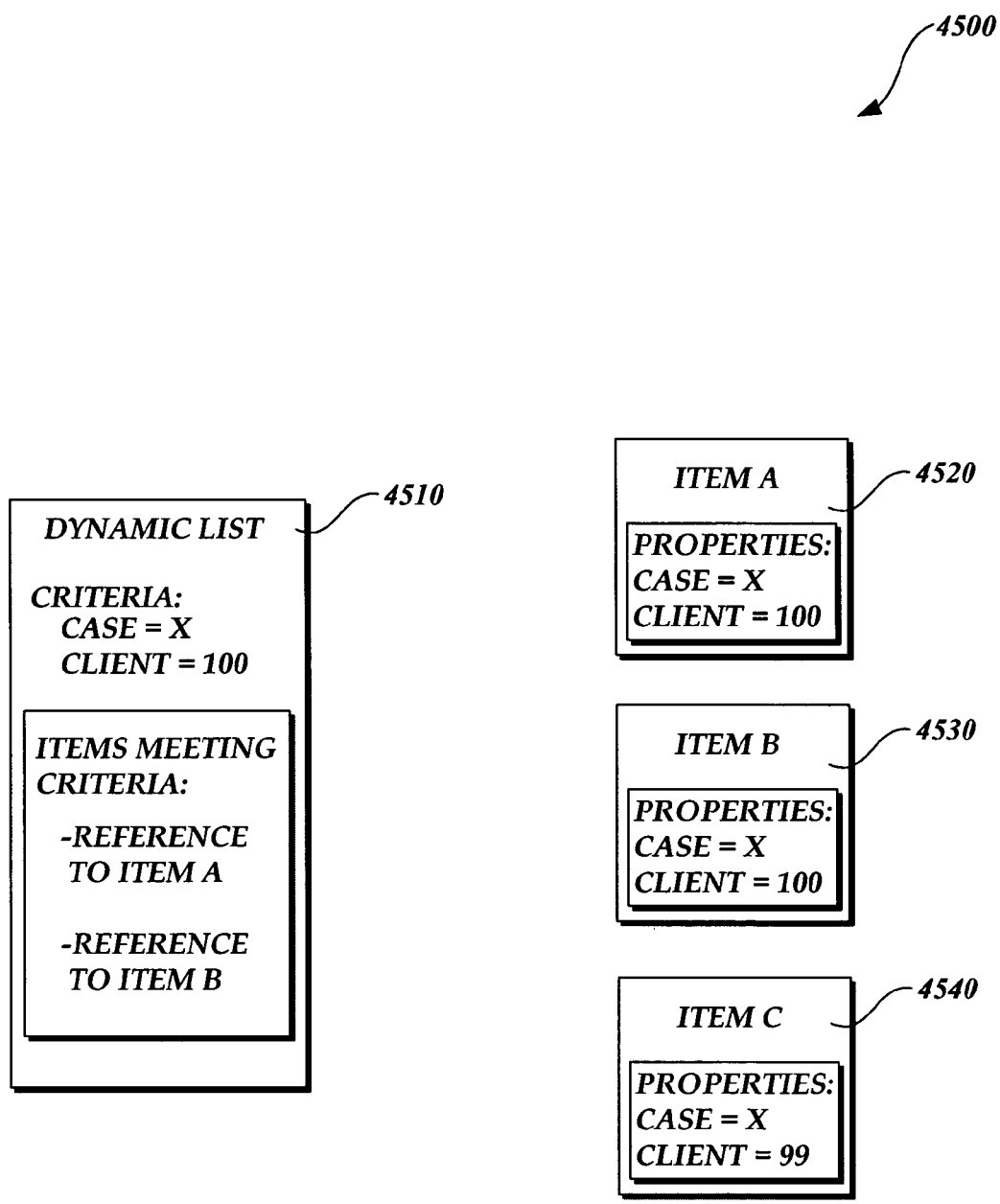
FIG. 45 is a block diagram illustrative of a memory system including a dynamic list and a set of referenced items.

FIG. 45 is a block diagram illustrative of a memory system 4500 including a dynamic list and a set of referenced items. The memory system 4500 includes a memory location 4510 which holds a dynamic list, a memory location 4520 which holds an Item A, a memory location 4530 which holds an Item B, and a memory location 4540 which holds an Item C. The dynamic list that is stored at the memory location 4510 has a scope to include all of the memory system 4500 and has criteria including case=X and client=100. The referenced items which meet the criteria include a reference to the Item A and a reference to the Item B. The Item A that is stored at the memory location 4520 has properties of case=X and client=100 and the Item B that is stored at the memory location 4530 has properties of case=X and client=100. The Item C that is stored at the memory location 4540 has properties of case=X and client=99. Since the property of the client=99 of the Item C does not match the criteria of the dynamic list that is stored at the memory location 4510, the Item C is not referenced in the list.

Figure 46:
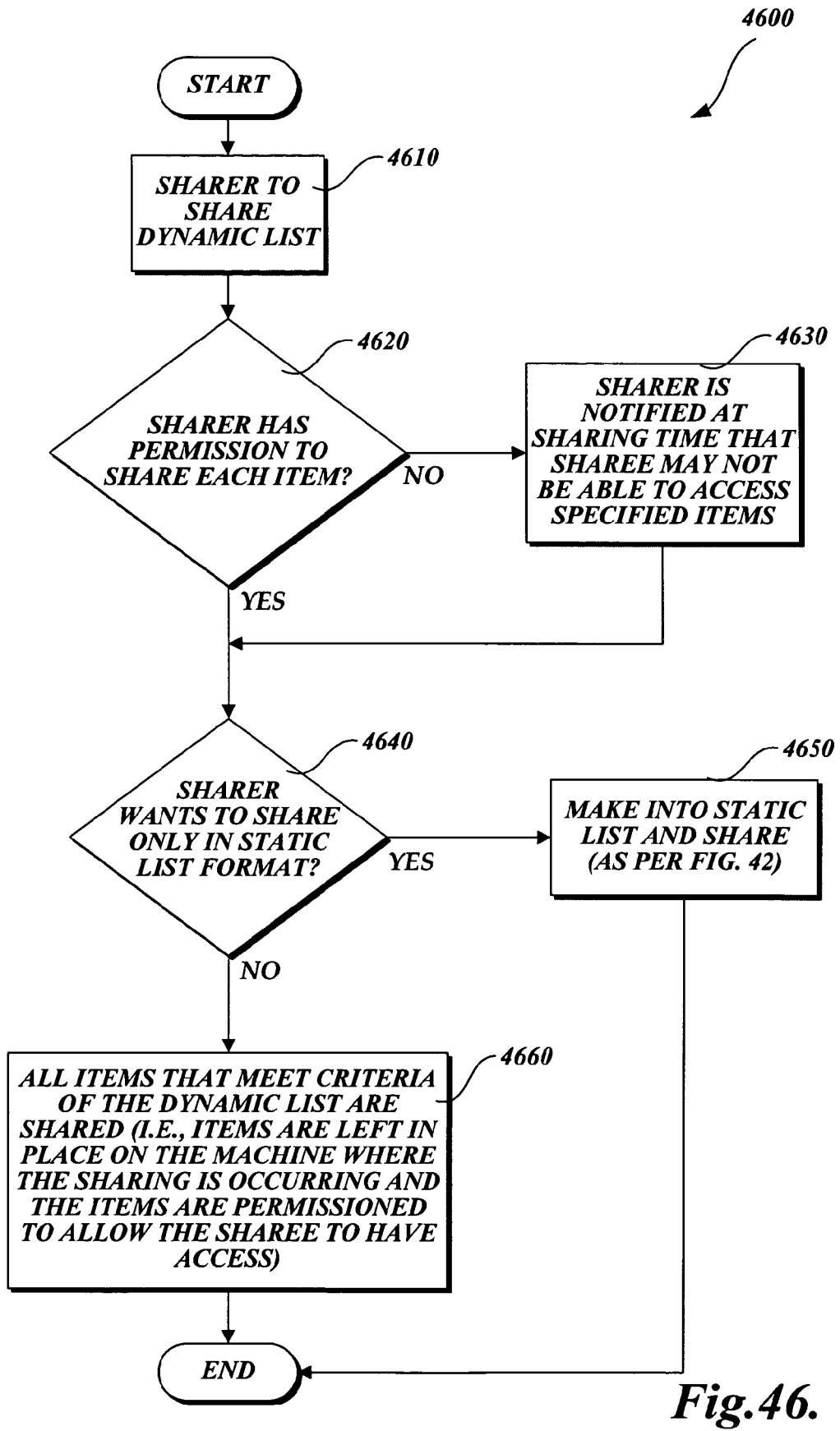
FIG. 46 is a flow diagram illustrative of a routine for sharing a dynamic list.

FIG. 46 is a flow diagram illustrative of a routine 4600 for sharing a dynamic list. At a block 4610, a sharer indicates that the dynamic list is to be shared. At a decision block 4620, a determination is made as to whether the sharer has permission to share each of the items on the list. If some of the items cannot be shared, then the routine continues to a block 4630 where the sharer is notified at the sharing time that the sharee may not be able to access the noted items. If each of the items can be shared, then the routine continues to a decision block 4640.

In the process of determining whether the sharer has permission to share each item, in one embodiment the list itself is the first item that the permission is determined for. In other words, the first step is to determine whether the sharer has permission to share the list itself. If the sharer does not have permission to share the list, then the sharer is notified that they do not have permission to share the list and the routine ends. If the sharer does have permission to share the list, then a determination is made for each of the items that are referenced by the list as to whether the sharer has permission to share each of the items. If the sharer does not have permission to share a particular item, then the sharer is notified that that item can not be shared. At the end of the process, for the set of items that the sharer does have permission to share, the routine continues to decision block 4640.

At decision block 4640, a determination is made as to whether the sharer wants to share the items only in the static list format. In other words, a determination is made as to whether the sharer wants to share the current items in the form of a static list rather than a dynamic list. If a static list is to be shared, then the routine continues to a block 4650 where a static list that represents what is currently in the dynamic list is generated and that static list is shared as described above with respect to FIG. 42. If the sharer does not want to only share in static list form, then the routine continues to a block 4660.

At block 4660, all of the items that meet the criteria of the dynamic list are shared. This means that the items are left at their respective storage places on the machine where the sharing is occurring and the items are permissioned to allow the sharee to have access to the items. At the conclusion of this process, the sharee is able to remotely access the list and its referenced items from the sharer's computer.

Figure 47:
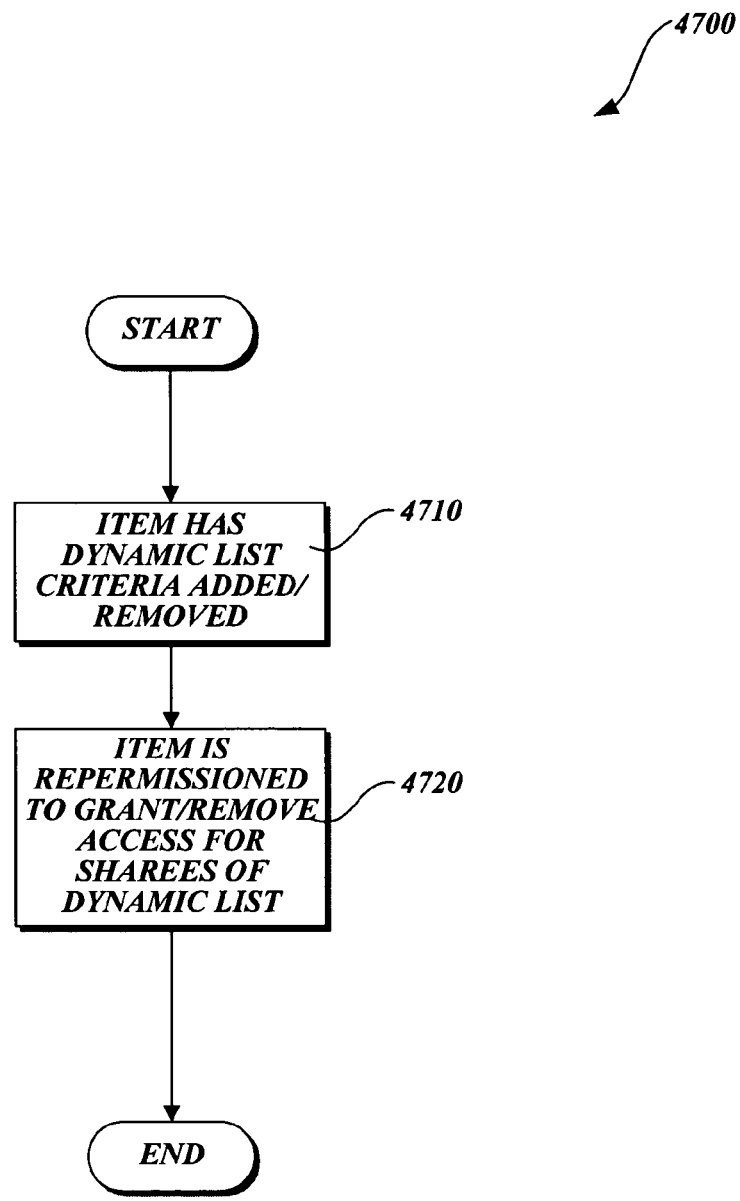
FIG. 47 is a flow diagram illustrative of a routine for re-permissioning items that are removed/added from a dynamic list.

FIG. 47 is a flow diagram illustrative of a routine 4700 for re-permissioning items that are removed or added from a dynamic list. At a block 4710, an item has a property change such that it meets or no longer meets the dynamic list criteria. At a block 4720, the item is re-permissioned to appropriately grant or remove access for sharees of the dynamic list. In other words, if an item that is currently on the dynamic list has its property change such that it no longer meets the criteria of the dynamic list, then this item is re-permissioned to remove access for sharees of the dynamic list. In the same way, if any items that previously were not on the dynamic list have a property change such that they now fall into the scope and meet the criteria of the dynamic list, they are re-permissioned to grant access to the sharees of the dynamic list.

Figure 48:
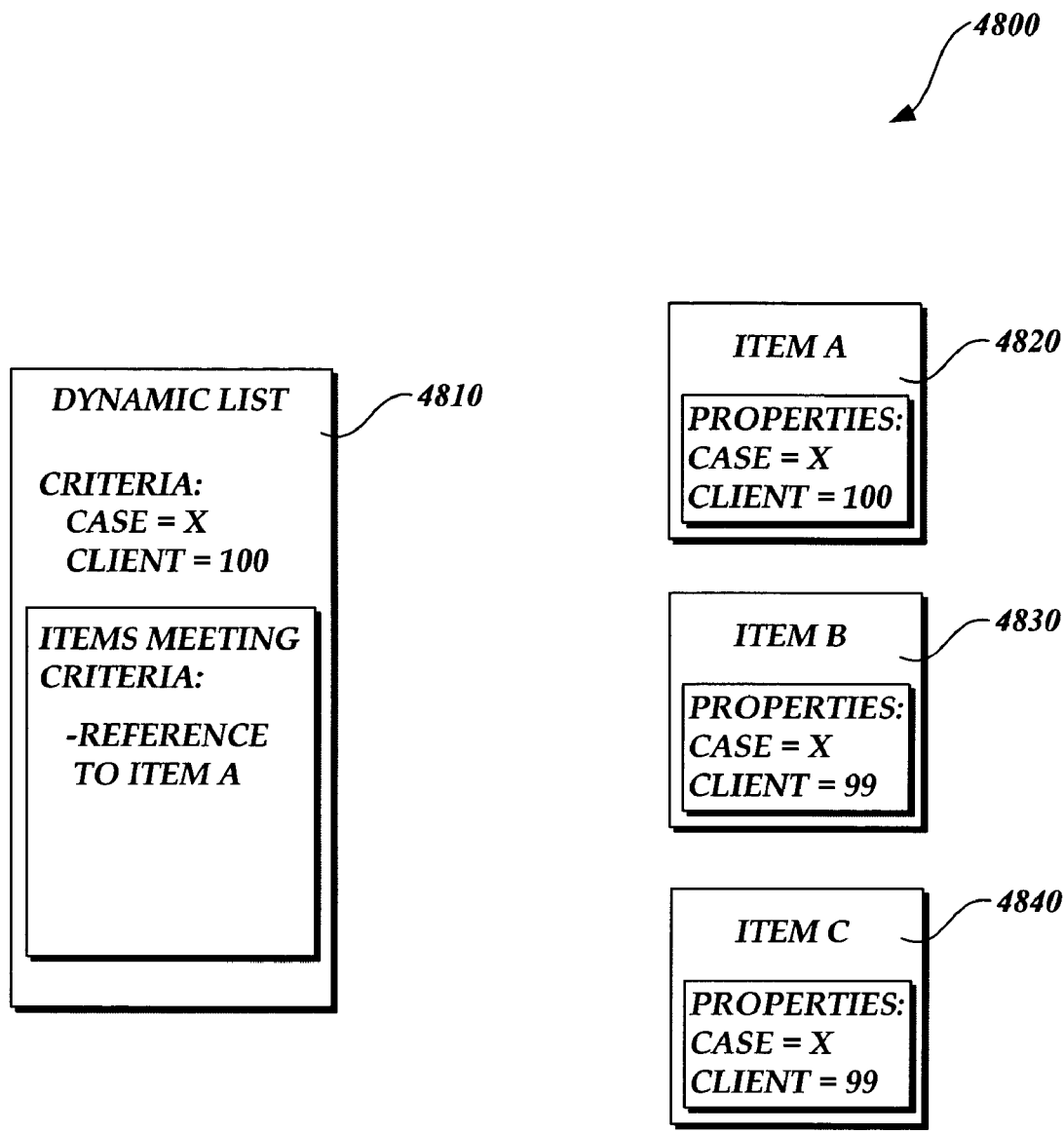
FIG. 48 is a block diagram illustrative of a memory system including a dynamic list from which an item has been removed.

FIG. 48 is a block diagram illustrative of a memory system 4800 including a dynamic list from which an item has been removed. The memory system 4800 includes a memory location 4810 which holds a dynamic list, a memory location 4820 which holds an Item A, a memory location 4830 which holds an Item B, and a memory location 4840 which holds an Item C. The memory system 4800 is similar to the memory system 4500 of FIG. 45. In the example of FIG. 48, the Item B at the storage location 4830 has had its client property changed such that the client=99. Because of this change, the Item B no longer meets the criteria of the dynamic list which requires that the client=100. Thus, the Item B has been removed from the dynamic list that is stored at the memory location 4810. Sharees of the dynamic list will thus no longer have permission to the Item B.

Figure 49:
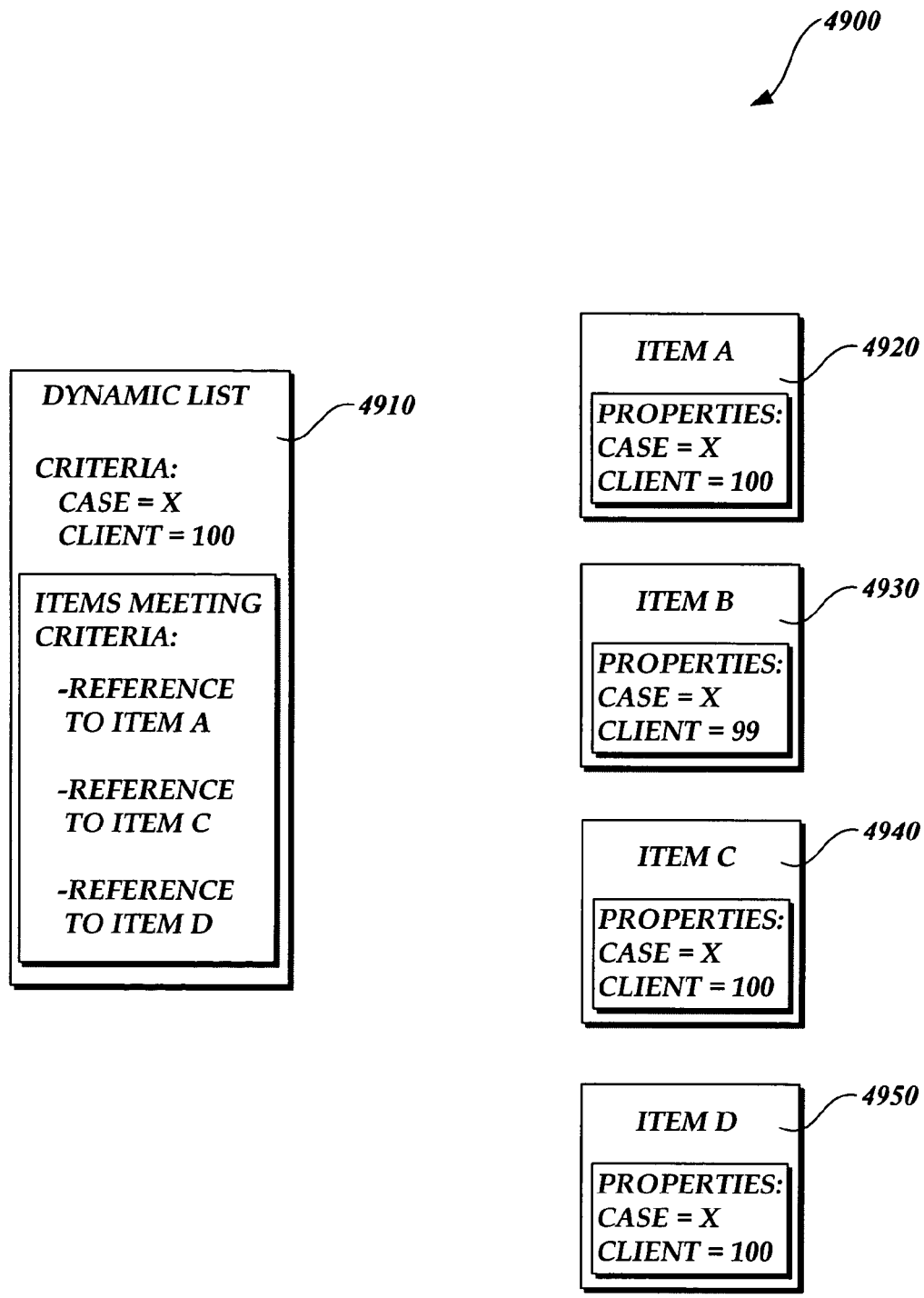
FIG. 49 is a block diagram illustrative of a memory system including a dynamic list to which items have been added.

FIG. 49 is a block diagram illustrative of a memory system 4900 including a dynamic list to which items have been added. The memory system 4900 includes a memory location 4910 which holds a dynamic list, a memory location 4920 which holds an Item A, a memory location 4930 which holds an Item B, a memory location 4940 which holds an Item C, and a memory location 4950 which holds a new Item D. Relative to the dynamic list at the memory location 4810 of FIG. 48, the dynamic list at the memory location 4910 of FIG. 49 is shown to have added references to Items C and D. This has occurred because the Item C at memory location 4940 and the new Item D at the memory location 4950 have had their client properties changed or set to be client=100. This change has caused the Items C and D to now meet the criteria of the dynamic list stored at memory location 4910, and the dynamic list thus now includes references to these items. This results in sharees of the dynamic list now being permissioned with access to the Items C and D.

Figure 50:
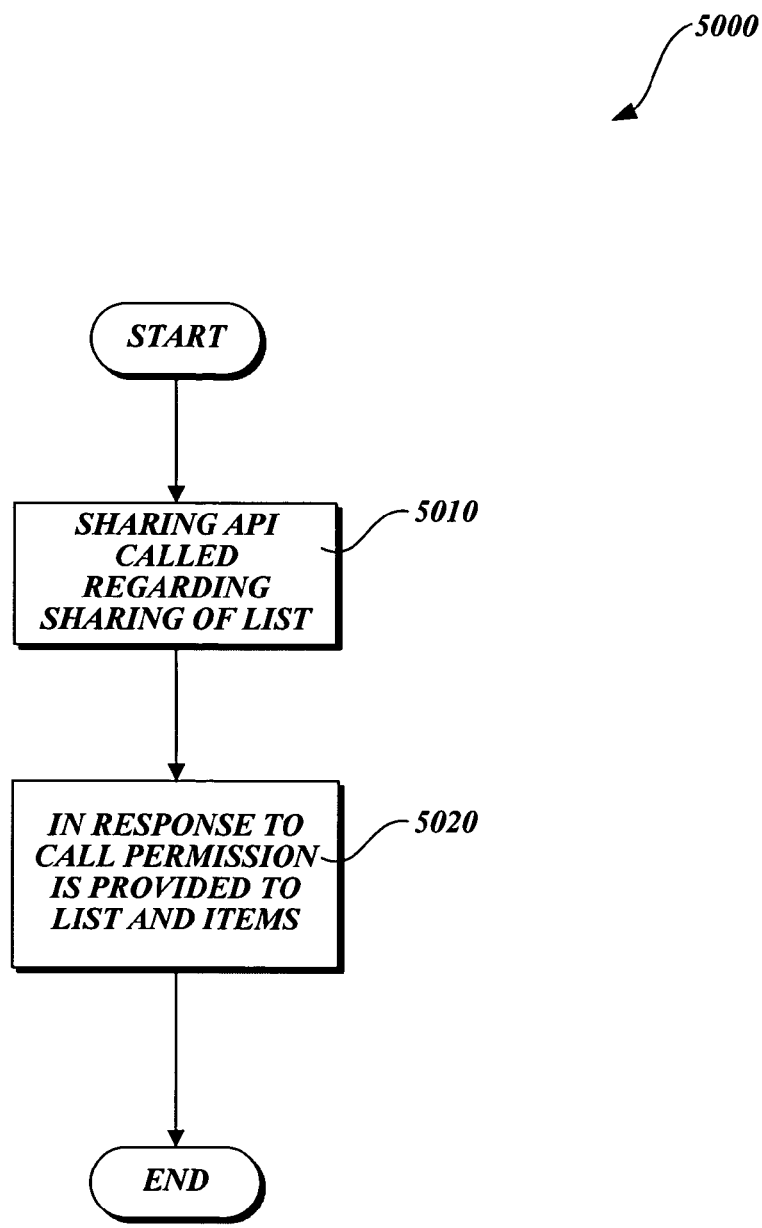
FIG. 50 is a flow diagram illustrative of a routine for calling a list sharing API.

FIG. 50 is a flow diagram of a routine 5000 for calling a sharing API. At a block 5010, a sharing API is called regarding the sharing of a list. At a block 5020, in response to the call permissions are provided to the list and the referenced items. As described above, both static and dynamic lists may be shared.

A programming interface may be utilized as part of the list sharing process. As will be described in more detail below with respect to FIGS. 51A-51L, a programming interface (or more simply, interface) such as that used in the list sharing process may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc., of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 51A:
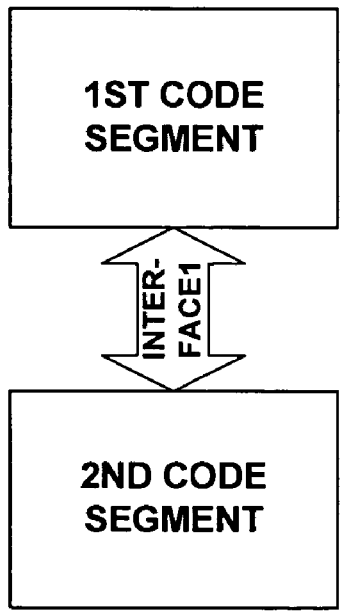
FIGS. 51A to 51L are block diagrams illustrative of various implementations of a programming interface that may be utilized in a list sharing system.
Figure 51B:
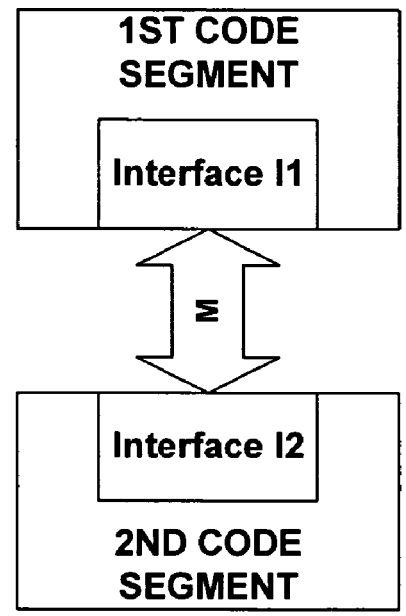

Notionally, a programming interface may be viewed generically, as shown in FIG. 51A or FIG. 51B. FIG. 51A illustrates an interface Interface1 as a conduit through which first and second code segments communicate. FIG. 51B illustrates an interface as comprising interface objects I1 and I2 (which may or may not be part of the first and second code segments), which enable first and second code segments of a system to communicate via medium M. In the view of FIG. 51B, one may consider interface objects I1 and I2 as separate interfaces of the same system and one may also consider that objects I1 and I2 plus medium M comprise the interface. Although FIGS. 51A and 51B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g., information placed in a buffer, file, etc., separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 51A and 51B, but they nonetheless perform a similar function to accomplish the same overall result. We will now briefly describe some illustrative alternative implementations of a programming interface.

Figure 51C:
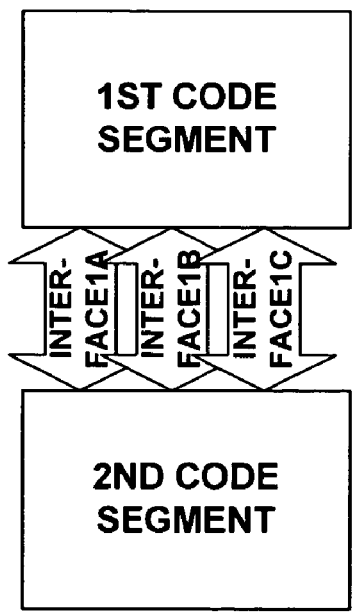
Figure 51D:
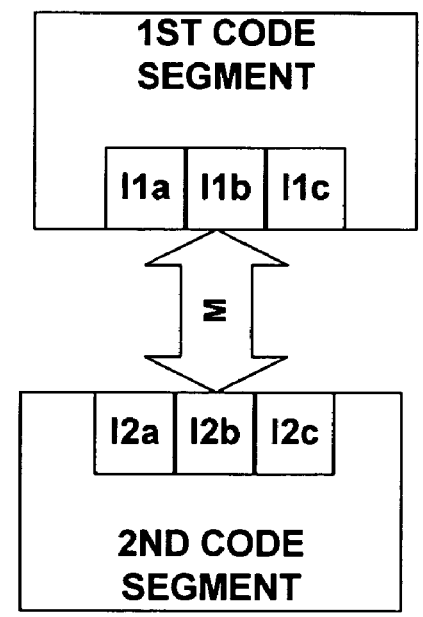

FIGS. 51C and 51D illustrate a factoring implementation. In accordance with a factoring implementation, a communication from one code segment to another may be accomplished indirectly by breaking the communication into multiple discrete communications. This is depicted schematically in FIGS. 51C and 51D. As shown, some interfaces can be described in terms of divisible sets of functionality. Thus, the interface functionality of FIGS. 51A and 51B may be factored to achieve the same result, just as one may mathematically provide 24, or 2 times 2 time 3 times 2. Accordingly, as illustrated in FIG. 51C, the function provided by interface Interface1 may be subdivided to convert the communications of the interface into multiple interfaces Interface 1A, Interface 1B, Interface 1C, etc., while achieving the same result. As illustrated in FIG. 51D, the function provided by interface I1 may be subdivided into multiple interfaces I1a, I1b, I1c, etc., while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. 51C and 51D, the functional spirit of interfaces Interface1 and I1 remain the same as with FIGS. 51A and 51B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 51E:
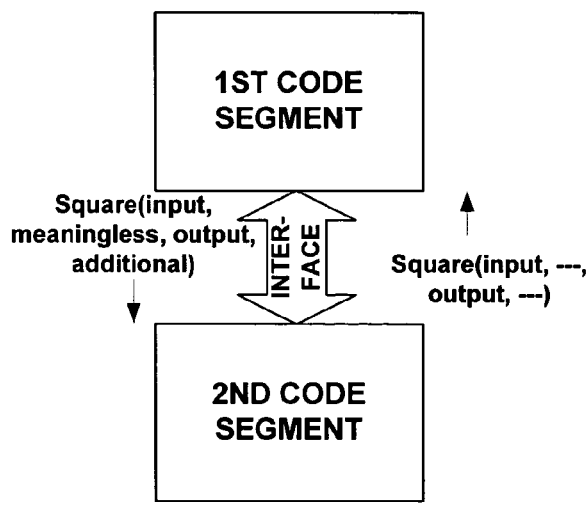
Figure 51F:
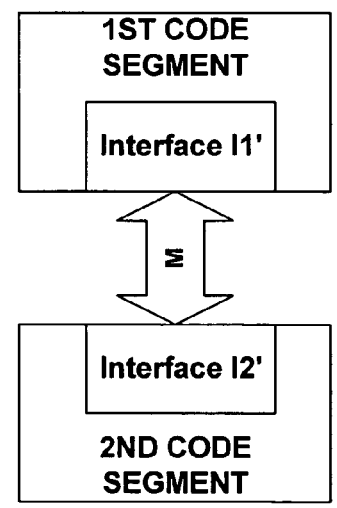

FIGS. 51E and 51F illustrate a redefinition implementation. In accordance with a redefinition implementation, in some cases, it may be possible to ignore, add or redefine certain aspects (e.g., parameters) of a programming interface while still accomplishing the intended result. This is illustrated in FIGS. 51E and 51F. For example, assume interface Interface1 of FIG. 51A includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 51E, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 51F, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Figure 51G:
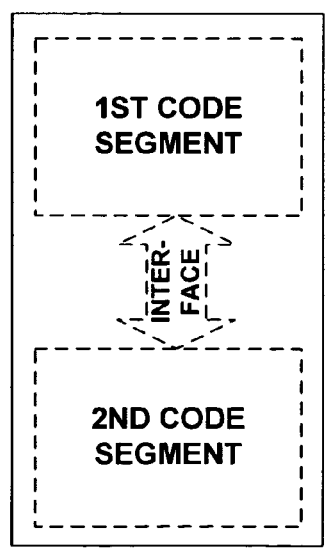
Figure 51H:
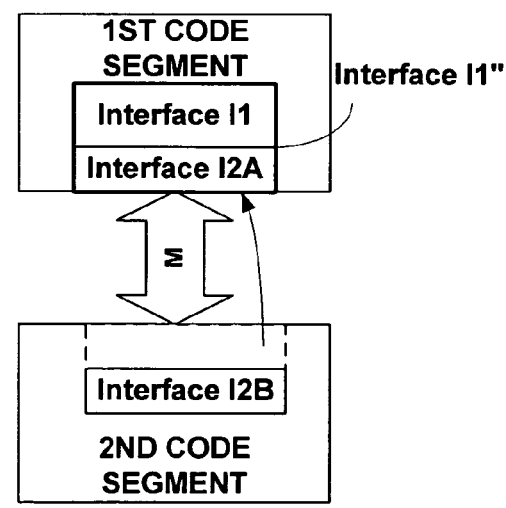

FIGS. 51G and 51H illustrate an inline coding implementation. In accordance with an inline coding implementation, it may also be feasible to merge some or all of the functionality of two separate code modules such that the "interface" between them changes form. For example, the functionality of FIGS. 51A and 51B may be converted to the functionality of FIGS. 51G and 51H, respectively. In FIG. 51G, the previous $1^{st}$ and $2^{nd}$ Code Segments of FIG. 51A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 51H, part (or all) of interface I2 from FIG. 51B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 51B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 51I:
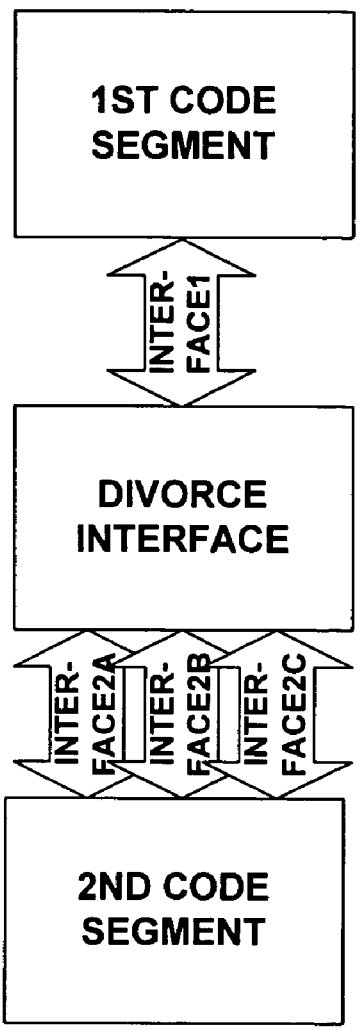
Figure 51J:
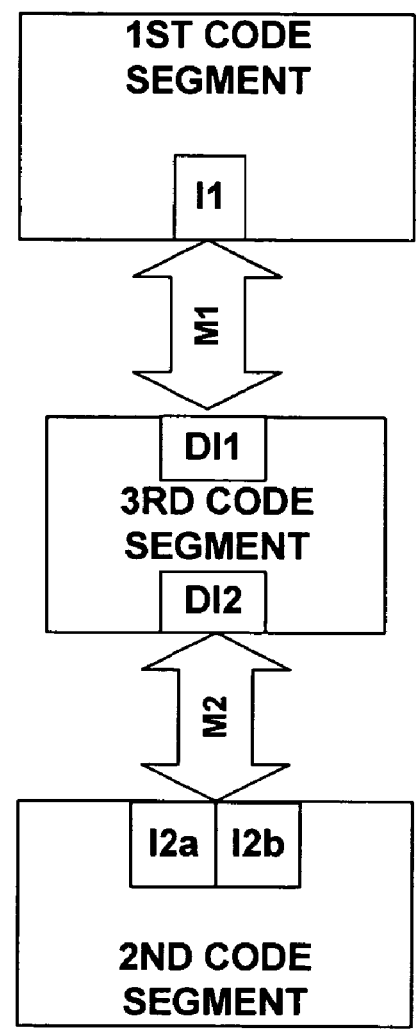

FIGS. 51I and 51J illustrate a divorce implementation. In accordance with a divorce implementation, a communication from one code segment to another may be accomplished indirectly by breaking the communication into multiple discrete communications. This is depicted schematically in FIGS. 51I and 51J. As shown in FIG. 51I, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 51J, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 51B to a new operating system, while providing the same or similar functional result.

Figure 51K:
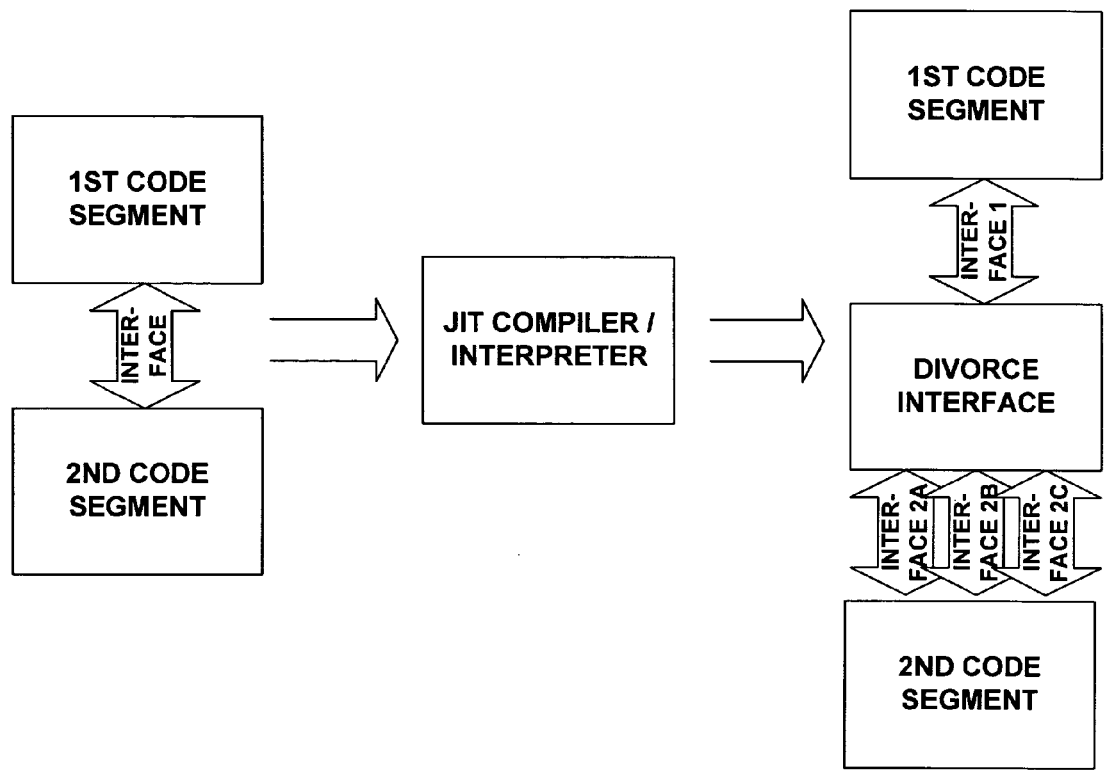
Figure 51L:
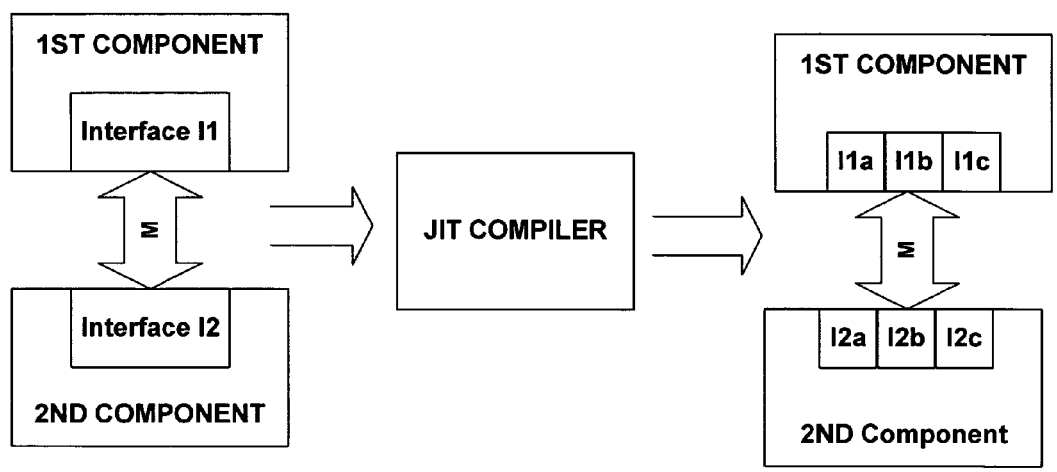

FIGS. 51K and 51L illustrate a rewriting implementation. In accordance with a rewriting implementation, yet another possible variant is to dynamically rewrite the code to replace the interface functionality with something else but which achieves the same overall result. For example, there may be a system in which a code segment presented in an intermediate language (e.g., Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 51K and 51L. As can be seen in FIG. 51K, this approach is similar to the divorce configuration described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 51L, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 51A and 51B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of designating items as available to share in a computer system between a sharer that makes items available and a sharee that views the items that were made available comprising:
    executing on a sharer's computer a query comprising a search criteria to identify a set of items that meet the search criteria;
    defining contents of one or more lists on the sharer's computer as the set of items that meet the search criteria, wherein the set of items includes files and folders;
    scanning for changes to the individual items within the set of items;
    upon detecting a change, dynamically updating the set of items based on changes to individual items within the set of items, wherein when a first item with in within the set of items has a property change such that the first item no longer satisfies the search criteria, the first item is removed from the set of items, and wherein when a second item that was not previously in the set of items has a property change such that the second item satisfies the search criteria, the second item is added to the set of items;
    making the contents of the one or more lists available for sharing with the sharee, thereby making results of said query available to the sharee; sharing at least a portion of the one or more folders lists with the sharee such that the sharee is provided with access to the set of items from a sharee's computer.

2. The method of claim 1, wherein when the sharer is unable to grant the access to the sharee, a notification is provided to the sharer.

3. The method of claim 1, wherein the sharer is able to limit a type of the access that the sharee has to the set of items.

4. The method of claim 3, wherein the type of the access to the items is limited to one of read and write and just read access.

5. The method of claim 1, wherein the method further comprises updating the set of items periodically.

6. The method of claim 1, wherein the contents of the one or more lists are references to each of the set of items.

7. One of more computer-storage media having computer-executable instructions embodied thereon that when executed by a computer perform a method of designating items to share in a computer system between a sharer that makes items available and a sharee that views the items that were made available, the method comprising:
    executing on a sharer's computer a query comprising a scope and a criteria, wherein the scope and the criteria are submitted through the sharer's computer;
    creating on the sharer's computer a dynamic list with a set of referenced items based on results of said query, wherein the set of referenced items include files and folders, wherein when a first item on the dynamic list has a property change such that it no longer meets the criteria of the query, the first item is removed from the dynamic list, and wherein when a second item that was not previously on the dynamic list has a property change such that the second item meets the criteria of the query, the second item is added to the dynamic list;
    defining contents of one or more folders on the sharer's computer based on the dynamic list;
    making the contents of the one or more folders available for sharing with the sharee, thereby making the results of said query available to the sharee; and
    sharing at least a portion of the one or more folders with the sharee such that the sharee is provided with access to the set of referenced items from a sharee's computer, wherein the sharee is provided with remote access to the referenced items from another computer.

8. The media of claim 7, wherein the sharer is able to limit a type of the access that the sharee has to the items.

9. The media of claim 7, wherein the method further includes periodically scanning items within the scope of the query for changes.

10. The media of claim 7, wherein said creating comprises defining within the dynamic list an annotation corresponding to at least one of the set of referenced items.

11. The media of claim 7, wherein the one or more folders are virtual folders.

12. The media of claim 7, wherein when the sharer is unable to grant the access to the sharee for an item, a notification is provided to the sharer.

13. A method of communicating between a sharer of a list and a sharee comprising:
- receiving, from the sharee, a call for accessing, on a computer of the sharer, items that are referenced on the list, wherein the list is based on results of a query with a scope and a criteria provided by the sharer, executed on a computer of the sharer, stored on a computer of the sharer, and wherein the scope defines at least a portion of a physical storage location;
- responsive to authorization received from the sharer, providing the sharee access to the items that are referenced on the list;
- updating the list after a period of time such that items that no longer meet the criteria or the scope of the query are removed from the list;
- receiving a new query with a new criteria and a new scope; and
- updating the list to include new items within the new scope that meet the new criteria.

14. The method of claim 13, wherein receiving, from the sharee, the call for accessing, on the computer of the sharer, the items that are referenced on the list comprises receiving the call via an API.

15. The method of claim 13, further comprising receiving a new query with a new criteria and a new scope and updating the list to include new items within the new scope that meet the new criteria.

16. The method of claim 13, further comprising:
- populating a virtual folder with the items that are referenced on the list
- receiving from the sharee, the call for accessing, on the computer of the sharer the virtual folder; and
- responsive to authorization received from the sharer, providing the sharee access to the virtual folder.

17. The method of claim 16, wherein the access to the items is limited to just read access.

18. The method of claim 13, wherein the period of time is short, thereby effectively dynamically updating the list.

* * * * *